United States Patent
Yao et al.

(10) Patent No.: US 8,340,061 B2
(45) Date of Patent: Dec. 25, 2012

(54) TRANSMISSION TERMINAL, RECEPTION TERMINAL, AND INFORMATION DISTRIBUTION SYSTEM

(75) Inventors: Taketsugu Yao, Osaka (JP); Toshihisa Nakai, Osaka (JP); Kiyoshi Fukui, Mie (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 430 days.

(21) Appl. No.: 12/458,795

(22) Filed: Jul. 22, 2009

(65) Prior Publication Data

US 2010/0027520 A1 Feb. 4, 2010

(30) Foreign Application Priority Data

Jul. 23, 2008 (JP) ................... 2008-189583

(51) Int. Cl.
*H04W 4/00* (2009.01)
(52) U.S. Cl. ............... 370/338; 370/395.1; 455/423; 713/189; 726/4; 726/14
(58) Field of Classification Search .......... 370/338, 370/395.1; 726/4, 14; 713/189; 455/423
See application file for complete search history.

(56) References Cited

U.S. PATENT DOCUMENTS

2002/0013922 A1* 1/2002 Gueguen ................. 714/751
2004/0132442 A1* 7/2004 Zimmermann et al. ...... 455/423
2004/0148396 A1* 7/2004 Meyer et al. .................. 709/227
2004/0213248 A1* 10/2004 Okuda et al. ............... 370/395.1

FOREIGN PATENT DOCUMENTS

| GB | 2357017 A | 6/2001 |
| JP | 2005-079975 A | 3/2005 |
| JP | 2007-235516 A | 9/2007 |
| WO | WO-2006/046720 A1 | 5/2006 |

* cited by examiner

*Primary Examiner* — Ricky Ngo
*Assistant Examiner* — Richard K Chang
(74) *Attorney, Agent, or Firm* — Rabin & Berdo, P.C.

(57) ABSTRACT

A transmission terminal includes an information generation unit, a transmission unit, a delivery management unit, and a reception unit. The information generation unit generates information that is to be transmitted to a destination reception terminal. The transmission unit transmits information that the information generation unit has generated. The delivery management unit manages transmission of information. The reception unit receives information that the destination reception terminal transmits. Furthermore, the information generation unit generates or receives transmission information that is to be transmitted to the destination reception terminal and generates redundant information for the destination reception terminal to restore the transmission information. The delivery management unit causes the information generation unit to generate, and causes the transmission unit to retransmit, the redundant information when the reception unit has not received a successful reception reply from the destination reception terminal.

37 Claims, 33 Drawing Sheets

TRANSMISSION TERMINAL, RECEPTION TERMINAL, AND INFORMATION DISTRIBUTION SYSTEM

CROSS-REFERENCE TO RELATED APPLICATION

This application claims priority under 35 USC 119 from Japanese Patent Application No. 2008-189583 filed on Jul. 23, 2008, the disclosure of which is incorporated by reference herein.

BACKGROUND OF THE INVENTION

1. Field of the Invention

The present invention relates to a transmission terminal that transmits information, a reception terminal that receives that information, and an information distribution system that includes these terminals.

2. Description of the Related Art

In recent years, home wireless networks have become widespread. As wireless network systems that are currently becoming widespread, there are wireless LANs, whose purpose is to connect computer devices such as personal computers to the Internet. Henceforth, as wireless network systems that will newly become widespread in homes, digital information home appliance network systems and sensor network systems are expected.

These networks will cooperate with each other, so that services such as, for example, controlling an air conditioner to conserve its power on the basis of a detailed spatial temperature distribution gathered by a temperature sensor or advising a user through a television receiver of an abnormality in his/her body detected by a biosensor will become possible.

The issue with such home wireless network systems is that a third party can easily illegally acquire personal information that is inside the home and can illegally access devices that are inside the home because home wireless network systems exchange information wirelessly. For example, there is concern that information corresponding to the privacy of an individual that has been detected by a biosensor may be intercepted and concern over harassment such as switching the power of a television receiver ON and OFF from the outside. Thus, it is believed that information encryption and access control (device authentication) will become increasingly important in future home wireless network systems.

Here, a case will be supposed where various devices equipped with a wireless communication function have extremely limited computing capability and memory capacity in comparison to a computer device or the like. In a communication network using such wireless terminal devices, what becomes an issue is how wireless terminal devices that are to be newly added to the network system (wireless terminal devices in which key information for authentication has not been set beforehand) and the network to which those wireless terminal devices are to be added set key information for encryption and authentication securely. As long as the wireless terminal devices and the network can set this initial key information (below, called an "initial key") securely, they can securely communicate between arbitrary wireless communication terminals and can also perform updating of the key information securely.

As methods of securely setting the initial key, various methods exist, such as, for example, methods where a user manually sets the initial key, methods that utilize a wired connection to deliver the key, and methods that utilize wireless communication. Among these, in methods that utilize wireless communication to perform setting of the initial key, it is necessary to prevent a third party from intercepting the wireless communication and illegally acquiring the key information.

As those methods, for example, a method that uses infrared communication, which has directionality and is difficult to intercept, to deliver the key and a method that delivers the key by non-contact communication that can only be read nearby using an RFID tag (a wireless ID tag) or the like are conceivable. However, these methods require separate interfaces in the wireless terminals when the terminals are not equipped with the above-described infrared or RFID interfaces.

As methods of securely realizing the sharing of an initial key utilizing wireless communication without having to utilize separate interfaces and even if a third party present in the surrounding area were to intercept the wireless communication, techniques based on public key encryption techniques represented by Diffie-Hellman key exchange, for example, are known. However, sometimes these systems become a burden on wireless communication terminals that have limited computing capability. Further, sometimes installing a public key encryption operation algorithm just for sharing this initial key becomes a burden on wireless communication terminals that have limited memory capacity.

In relation to the above issue, as a technology whose purpose is "to reduce the total cost of a system and to lessen the burden on a manager by making it possible to securely perform initial registration of a user only at a fixed base station and to distribute an encryption key for use in communication", there has been proposed an encryption key distributing method and a wireless network system (see Japanese Patent Publication Laid-open (JP-A) No. 2005-79975) where: "An output-variable configuration base station 101 that includes the function of lowering its wireless output to set a small initial registration area 102 is disposed in a system. When there is a request for initial registration from a wireless terminal 103, this fixed base station 101 lowers its wireless output to set the small initial registration area 102, and, in this state, the fixed base station 101 registers the wireless terminal that made the request for registration and distributes an encryption key to that wireless terminal. Thereafter, the fixed base station 101 returns its wireless output to normal to set a communicable area 105 and performs communication with the wireless terminal."

In the technology described in JP-A No. 2005-79975, the fixed base station 101 lowers its wireless output to set the small initial registration area 102 and performs key distribution in that area It becomes difficult for an intercepting terminal located in a range far from this initial registration area to reliably intercept the encryption key because the bit error rate becomes high, so the security of key distribution rises.

However, in the technology described in JP-A No. 2005-79975, it is not clear whether or not the intercepting terminal mistakes the received bits.

Moreover, the range in which the fixed base station can lower its wireless output relies on the function of the wireless terminal, so sometimes the fixed base station cannot lower its wireless output to the extent that it can perform key distribution securely.

For that reason, there have been desired a transmission terminal, a reception terminal and an information distribution system that can, even if wireless output reduction is limited, transmit information such that there are more bit errors in an intercepting terminal and improve the degree of security of information transmission.

For this reason, there has been proposed a novel and improved important information transmission system where only wireless terminal devices that can acquire information with a certain probability can continue communication under a restricted communication environment and which system is capable of preventing interception by other unauthorized wireless terminal devices (see JP-A No. 2007-235516). However, further improvement of the security level is demanded with respect to this system also.

SUMMARY OF THE INVENTION

The present invention provides a system where the potential for a legitimate reception terminal to successfully receive information and for an intercepting terminal to fail to receive information and to provide a system and a terminal with which wireless key delivery can be realized more securely.

A transmission terminal includes an information generation unit, a transmission unit, a delivery management unit, and a reception unit. The information generation unit generates information that is to be transmitted to a destination reception terminal. The transmission unit transmits information that the information generation unit has generated. The delivery management unit manages transmission of information. The reception unit receives information that the destination reception terminal transmits. Furthermore, the information generation unit generates redundant information, which is used for the destination reception terminal to restore transmission information. The delivery management unit causes the information generation unit to generate, and causes the transmission unit to retransmit, the redundant information when the transmission terminal determines that the destination reception terminal has not be able to receive the successful redundant information from the transmission terminal.

According to the transmission terminal pertaining to the present invention, the transmission terminal transmits the redundant information to share the transmission information with the destination reception terminal, so in comparison to a case where the transmission terminal transmits only the transmission information, there become more bit errors in an intercepting terminal usually present in a position far from the destination reception terminal, and the transmission terminal can exhibit effects that are the same as a technique where the transmission terminal lowers its transmission output to transmit information.

Further, the amount of operations that an intercepting terminal takes in order to identify the transmission information is determined by the amount of the redundant information with respect to the bit error rate at the intercepting terminal, so the degree of security of the transmission information can be presented.

BRIEF DESCRIPTION OF THE DRAWINGS

Embodiments of the present invention will be described in detail based on the following figures, wherein.

DETAILED DESCRIPTION OF THE INVENTION

Embodiment 1

The present embodiment is configured to estimate the bit error rate of a reception terminal on the basis of the radio wave propagation characteristic of an environment that has been measured beforehand and increase and deliver an information amount of transmission information to the extent that bit errors occur based on an arbitrary bit error rate (e.g., the bit error rate of the reception terminal) as a reference.

Thus, the embodiment makes it easier to generate bit errors in an intercepting terminal whose error rate is higher than the above-described bit error rate and, as a result, ensures that only an intended reception terminal can restore the correct transmission information.

Figure 1:
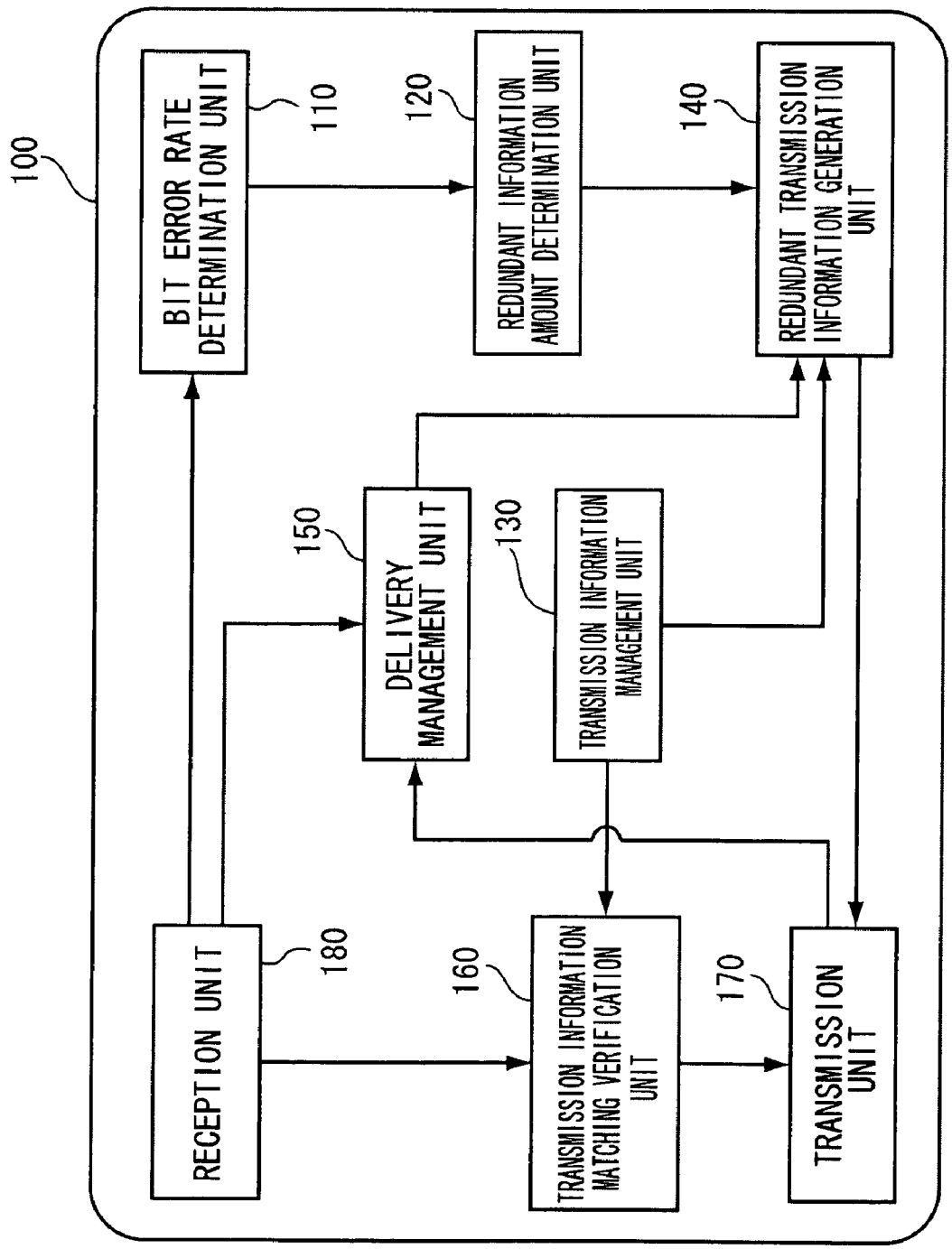
FIG. 1 is a functional block diagram of a transmission terminal 100 pertaining to embodiment 1.

FIG. 1 is a functional block diagram of a transmission terminal 100 pertaining to embodiment 1. The transmission terminal 100 is equipped with a bit error rate determination unit 110, a redundant information amount determination unit 120, a transmission information management unit 130, a redundant transmission information generation unit 140, a delivery management unit 150, a transmission information matching verification unit 160, a transmission unit 170 and a reception unit 180.

The bit error rate determination unit 110 determines a bit error rate that becomes a reference of security in embodiment 1.

As the method of determining the bit error rate that becomes a reference, for example, an initial value may be set in the bit error rate determination unit 110 beforehand, or the bit error rate determination unit 110 may be notified of the bit error rate by another device, or the bit error rate determination unit 110 may understand the radio wave propagation characteristic of the utilization environment beforehand and determine the bit error from a result of having estimated the bit error rate from the reception signal strength of a later-described reception terminal 200.

Here, the third example, where the bit error rate determination unit 110 determines the bit error rate that becomes a reference from a result of having estimated the bit error rate from the reception signal strength of the reception terminal 200, will be described.

The bit error determination unit 110 estimates the bit error rate of the reception terminal 200 from reception signal strength information of the reception terminal 200 obtained from the reception unit 180 and the radio wave propagation characteristic of the utilization environment that the bit error rate determination unit 110 has understood beforehand.

The bit error rate determination unit 110 may use, as is, the bit error rate that has been estimated, or, for example, when the bit error rate that it has estimated is lower than a predetermined reference value, the bit error rate determination unit 110 may use that reference value instead of the bit error rate that it has estimated.

The bit error rate determination unit 110 outputs the bit error rate that it has finally determined to the redundant information amount determination unit 120.

The redundant information amount determination unit 120 receives the reference bit error rate that the bit error rate determination unit 110 has determined and determines into how much redundant information it should convert and transmit information (transmission information) that is to be transmitted to the reception terminal 200. This redundant information comprises, for example, random numbers unrelated to the transmission information and is generated in order to increase the amount of the transmission information. Further, the redundant information may also be, for example, information for restoring information (transmission information) of a large source that has been generated using a secret sharing scheme such as (k, n) threshold secret sharing.

For example, when the reference bit error rate that the bit error rate determination unit 110 has determined is 0.001, then it is anticipated that there is a high possibility that a bit error of 1 bit will occur in the reception terminal 200 with respect to 1000 bits of transmission information.

In order to increase the probability to generate 1 bit error 10 times with respect to the reception terminal 200 whose bit error rate is 0.001, then it suffices for the transmission terminal 100 to extend 1000 bits of transmission information to 10000 bits of redundant transmission information, and transmit to the reception terminal 200.

When the transmission terminal 100 is to transmit 200 bits of redundant information in regard to a single transmission, then the transmission terminal 100 performs transmission 50 times (=10000/200).

Further, for example, when the reference bit error rate is 0.001, in order to transmit 128 bits of redundant information in regard to a single transmission and generate a bit error of 1 bit, then there is a way to set the transmission count to about 177 because the probability of mistaking 1 bit in the 128 bits of redundant information becomes $_{128}C_1 \times (0.001) \times (1-0.001)^{127} \approx 0.113$.

In the above description, the redundant information amount determination unit 120 calculated the transmission count by the probability of mistaking only 1 bit in the 128 bits of redundant information.

This is because when the bit error rate is low with respect to the number of transmission bits, the probability of mistaking 1 bit becomes the highest, so it is supposed that an attacker will devise an attack on the assumption that the probability of mistaking 1 bit is the highest.

Thus, an example has been described where the redundant information amount determination unit 120 calculates the transmission count on the basis of the probability of mistaking only 1 bit rather than on the probability of mistaking more than 1 bit.

The redundant information amount determination unit 120 outputs the transmission count that it has determined and the bit length of the redundant information to the redundant transmission information generation unit 140.

The transmission information management unit 130 manages the transmission information that the transmission terminal 100 wants to send secretly to the reception terminal 200. The transmission information management unit 130 outputs the transmission information that it manages to the redundant transmission information generation unit 140 and the transmission information matching verification unit 160.

The redundant transmission information generation unit 140 generates the aforementioned redundant transmission information from the transmission count and the bit length of the redundant information that it has received from the redundant information amount determination unit 120 and the transmission information that it has received from the transmission information management unit 130.

The configuration of the redundant transmission information and the procedure by which the redundant transmission information generation unit 140 generates the redundant transmission information will be described in after-mentioned FIG. 2 to FIG. 5.

Further, when the redundant transmission information generation unit 140 receives a message requesting transmission of an $i^{th}$ (i=1, 2, ..., n) packet of redundant transmission information from the delivery management unit 150, then the redundant transmission information generation unit 140 generates the $i^{th}$ packet of redundant transmission information and outputs the $i^{th}$ packet of redundant transmission information that it has generated to the transmission unit 170.

Even if the redundant transmission information generation unit 140 is already outputting the $i^{th}$ packet of redundant transmission information to the transmission unit 170, when the redundant transmission information generation unit 140 receives a message requesting transmission of the $i^{th}$ packet of redundant transmission information, then the redundant transmission information generation unit 140 recreates, and outputs to the transmission unit 170, new redundant transmission information (redundant information ri for restoring the transmission information).

However, in relation to the $n^{th}$ packet of redundant information, when the transmission information has already been determined, it is uniquely specified, so it is not insofar as this.

Figure 2:
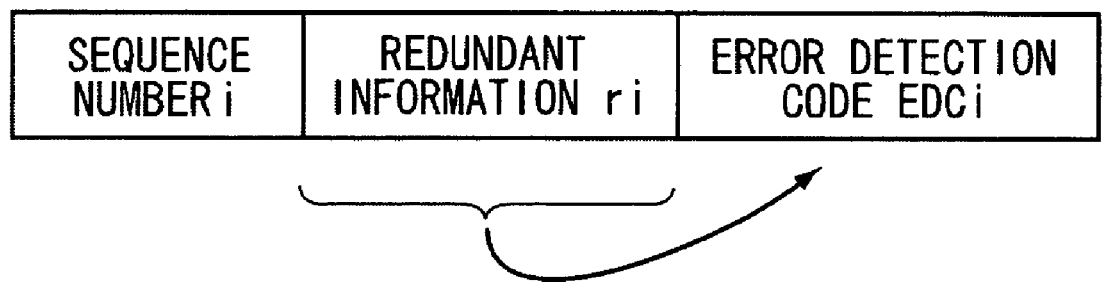
FIG. 2 is a diagram showing the configuration of redundant transmission information.

FIG. 2 is a diagram showing the configuration of the redundant transmission information.

The redundant transmission information is configured by: a sequence number i that represents what number the information is in the transmission count that has been determined; redundant information ri for restoring the transmission information; and an error detection code EDCi that has been calculated using at least the redundant information ri as a target.

As the error detection code, for example, CRC (Cyclic Redundancy Check) can be used, but the error detection code is not limited to this.

Hereinafter, when information is called "redundant transmission information", sometimes this will mean information where redundant transmission information has been divided into individual transmission units as in FIG. 2 and sometimes this will generically mean redundant transmission information before division.

In particular, when information is called "$i^{th}$ packet of redundant transmission information" or the like, this will mean information that has been divided into individual transmission units as in FIG. 2.

Various methods are conceivable for generating the redundant information for restoring the transmission information, but here, the following three methods will be described.

(Generation Method 1: EXOR Operation)

Figure 3:
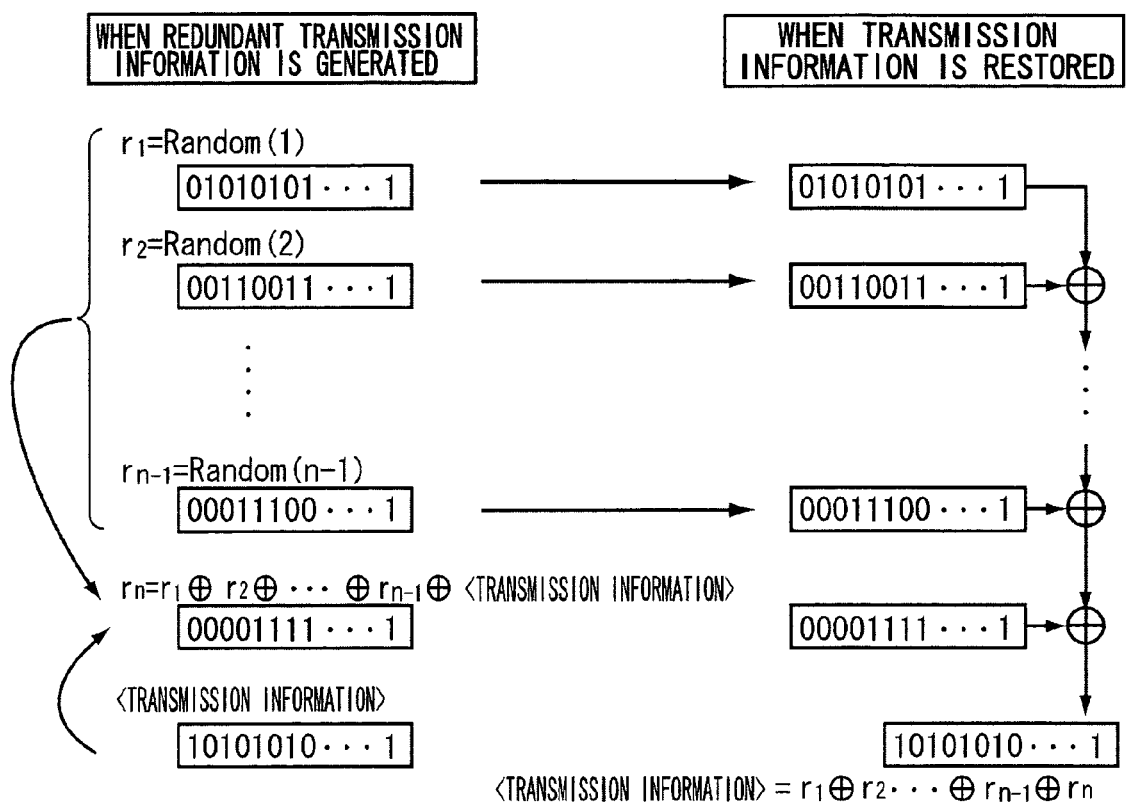
FIG. 3 is an explanatory diagram of a technique of transmitting the redundant transmission information using an exclusive OR operation.

FIG. 3 is a diagram describing a technique of generating the redundant transmission information using an exclusive OR operation. Assuming that i represents the transmission count and that Random(i) represents random numbers for generating the $i^{th}$ packet of redundant information, then the redundant transmission information generation unit 140 generates the redundant information ri $\{i=1, 2, \ldots, n\}$ for restoring the transmission information as in the following expression (1).

$$r_i = \text{Random}(i) \ (1 \leq i \leq n-1)$$

$$r_n = r_1 \oplus r_2 \oplus \ldots \ r_{n-1} \oplus \langle \text{Transmission Information} \rangle \ (i=n) \quad \text{Expression (1):}$$

It will be noted that the bit lengths of the redundant information ri for restoring the transmission information and the transmission information are the same.

In this case, only a terminal that knows all n-number of the redundant information can restore the correct transmission information using the following expression (2).

$$\langle \text{Transmission Information} \rangle = r_n = r_1 \oplus r_2 \oplus \ldots r_{n-1} \oplus r_n \quad \text{Expression (2):}$$

(Generation Method 2: EXOR Operation and Scrambling Function)

Figure 4:
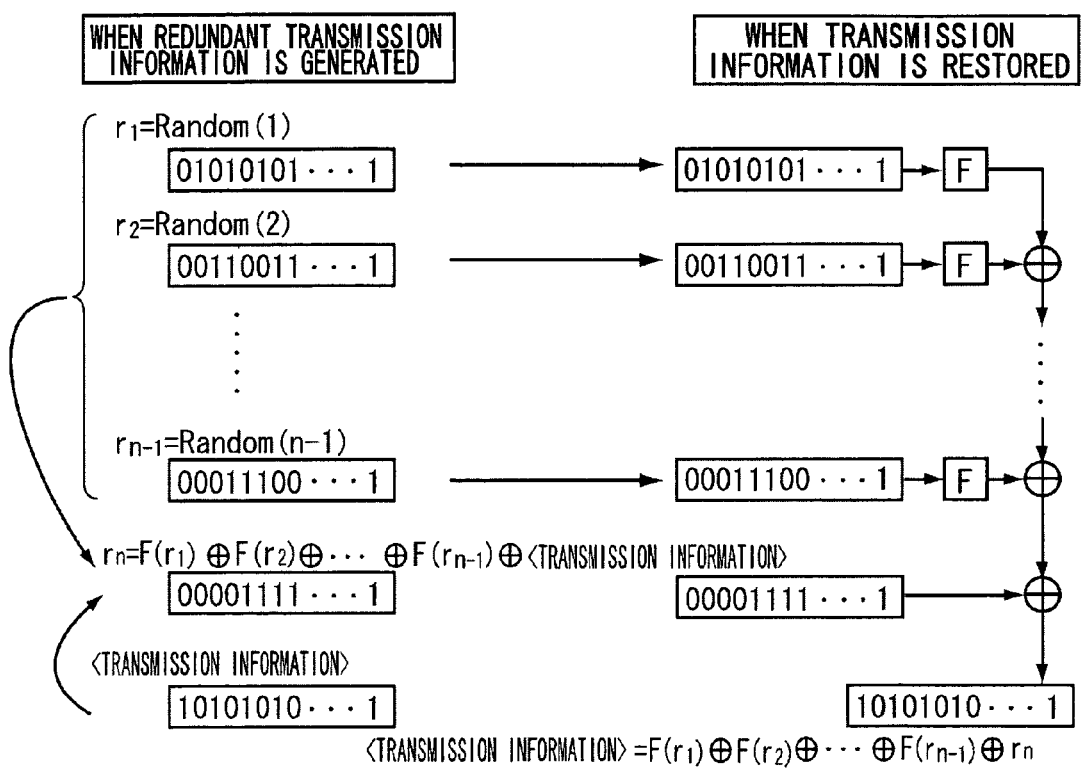
FIG. 4 is a diagram describing a technique of transmitting the redundant transmission information using the exclusive OR operation and a scrambling function.

FIG. 4 is a diagram describing a technique of transmitting the redundant transmission information using the exclusive OR operation and a scrambling function.

Assuming that i represents the transmission count, that Random(i) represents random numbers for generating the $i^{th}$ packet of redundant information and that F( ) represents a scrambling function, then the redundant transmission information generation unit 140 generates the redundant information ri $\{i=1, 2, \ldots, n\}$ for restoring the transmission information as in the following expression (3).

$$r_i = \text{Random}(i) \ (1 \leq i \leq n-1)$$

$$r_n = F(r_1) \oplus F(r_2) \oplus \ldots F(r_{n-1}) \oplus \langle \text{Transmission Information} \rangle \ (i=n) \quad \text{Expression (3):}$$

It will be noted that the output of the scrambling function F and the bit length of the transmission information are the same.

Further, the scrambling function F is a function that satisfies the property that the output bit row is randomly reversed 1 bit or more when the input bit row is reversed 1 bit. For example, a random number generator, a hash function and a one-way function can be used.

In this case also, similar to the aforementioned EXOR operation, only a terminal that knows all n-number of packets of the redundant information ri can restore the correct transmission information using the following expression (4).

$$\langle \text{Transmission Information} \rangle = F(r_n) = F(r_1) \oplus F(r_2) \oplus \ldots F(r_{n-1}) \oplus r_n \quad \text{Expression (4):}$$

(Generation Method 3: EXOR Operation and Scrambling Function (Superposed))

Figure 5:
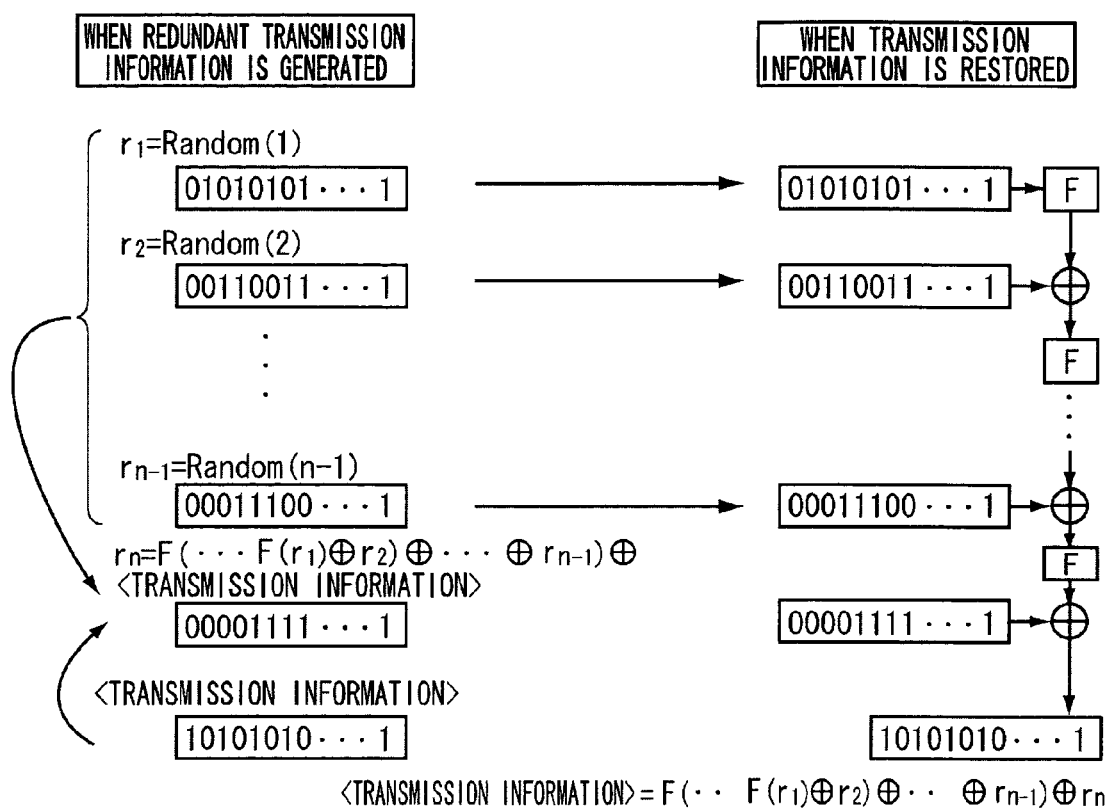
FIG. 5 is a diagram describing a technique of transmitting the redundant transmission information superposedly using the exclusive OR operation and the scrambling function.

FIG. 5 is a diagram describing a technique of transmitting the redundant transmission information superposedly using the exclusive OR operation and the scrambling function.

Assuming that i represents the transmission count, that Random(i) represents random numbers for generating the $i^{th}$ packet of redundant information and that F( ) represents a scrambling function, then the redundant transmission information generation unit 140 generates the redundant information ri $\{i=1, 2, \ldots, n\}$ for restoring the transmission information as in the following expression (5).

$$r_i = \text{Random}(i) \ (1 \leq i \leq n-1)$$

$$r_n = F(\ldots F(F(r_1) \oplus r_2) \oplus \ldots \oplus r_{n-1}) \oplus \langle \text{Transmission Information} \rangle \ (i=n) \quad \text{Expression (5):}$$

It will be noted that the output of the scrambling function F and the bit length of the transmission information are the same.

Further, the scrambling function F is a function that satisfies the property that the output bit row is randomly reversed 1 bit or more when the input bit row is reversed 1 bit. For example, a random number generator, a hash function and a one-way function can be used.

In this case also, similar to the aforementioned two methods, only a terminal that knows all n-number of packets of the redundant information ri can restore the correct transmission information using the following expression (6).

$$\langle \text{Transmission Information} \rangle = F(\ldots F(F(r_1) \oplus r_2) \oplus \ldots \oplus r_{n-1}) \oplus r_n \quad \text{Expression (6):}$$

When the delivery management unit 150 receives notification from the transmission unit 170 that the transmission unit 170 has transmitted the $i^{th}$ packet of redundant transmission information, then the delivery management unit 150 verifies whether or not the $i^{th}$ packet of redundant transmission information has been delivered to the reception terminal 200.

When the delivery management unit 150 is notified by the transmission unit 170 that the transmission unit 170 has transmitted the $i^{th}$ packet of redundant transmission information, then the delivery management unit 150 starts a timer.

When the delivery management unit 150 receives a successful reception reply message with respect to the $i^{th}$ packet of redundant transmission information from the reception unit 180 within a prescribed amount of time, then the delivery management unit 150 judges that the $i^{th}$ packet of redundant transmission information has been delivered without error to the reception terminal 200 and outputs, to the redundant transmission information generation unit 140, a request for the redundant transmission information generation unit 140 to deliver the $(i+1)^{th}$ packet of redundant transmission information.

On the other hand, when the delivery management unit 150 does not receive a successful reception reply message with respect to the $i^{th}$ packet of redundant transmission information from the reception unit 180 within the prescribed amount of time and time runs out, then the delivery management unit 150 judges that the $i^{th}$ packet of redundant transmission information has been erroneously delivered to the reception terminal 200 or that packet loss has occurred and again outputs, to the redundant transmission information generation unit 140, a request for the redundant transmission information generation unit 140 to transmit the $i^{th}$ packet of redundant transmission information.

The transmission information matching verification unit 160 verifies whether or not the reception terminal 200 has restored the correct transmission information.

As the method by which the transmission information matching verification unit 160 verifies whether or not the reception terminal 200 has restored the correct transmission information, the transmission information matching verification unit 160 can, for example, use two-way authentication using a challenge-response system.

When the transmission information matching verification unit 160 verifies whether or not the reception terminal 200 has acquired the correct transmission information, the transmission information matching verification unit 160 generates, and outputs to the transmission unit 170, challenge information.

Then, when the transmission information matching verification unit 160 receives response information with respect to the challenge information from the reception unit 180, the transmission information matching verification unit 160 uses that response information to verify whether or not the reception terminal 200 has acquired the correct transmission information.

Further, the transmission information matching verification unit 160 receives challenge information that has been generated by its transmission information matching verification partner from the reception unit 180 and generates, and outputs to the transmission unit 170, response information with respect to the challenge information that it has received.

ID information (unique address information), random numbers, or values where those have been converted using transmission information may also be included in the challenge information and the response information exchanged in this process.

The transmission unit 170 delivers the $i^{th}$ packet of redundant transmission information that it has received from the redundant transmission information generation unit 140. Further, at the same time, the transmission unit 170 notifies the delivery management unit 150 that it has transmitted the $i^{th}$ packet of redundant transmission information.

When the transmission unit 170 transmits the redundant transmission information, the transmission unit 170 controls its transmission output power to the transmission output power level that it used when it measured the radio wave propagation characteristic of the environment beforehand.

When there is no particular prior condition in regard to setting the transmission output power, the transmission unit 170 may, for example, set its transmission output power to a minimum transmission output power and transmit the redundant transmission information.

Further, the transmission unit 170 transmits, to the transmission information matching verification partner, various information for transmission information matching verification that it has received from the transmission information matching verification unit 160.

The reception unit 180 outputs reception signal strength information of the reception terminal 200 to the bit error rate determination unit 110.

When the reception unit 180 is notified by another device of bit error rate information, then the reception unit 180 may also output that bit error rate as is to the bit error rate determination unit 110.

Further, the receiving unit 180 outputs, to the delivery management unit 150, a redundant transmission information successful reception reply message that it has received from the reception terminal 200.

Further, the reception unit 180 outputs, to the transmission information matching verification unit 160, various information for transmission information matching verification that it has received from the transmission information matching verification partner.

The bit error rate determination unit 110, the redundant information amount determination unit 120, the transmission information management unit 130, the redundant transmission information generation unit 140, the delivery management unit 150 and the transmission information matching verification unit 160 can be configured by hardware such as a circuit device that realizes the functions of these units or can be configured by a processing unit such as a CPU (Central Processing Unit) or a microcomputer and software that realizes those functions.

The configuration of the transmission terminal 100 has been described above.

Next, the configuration of the reception terminal 200 will be described.

Figure 6:
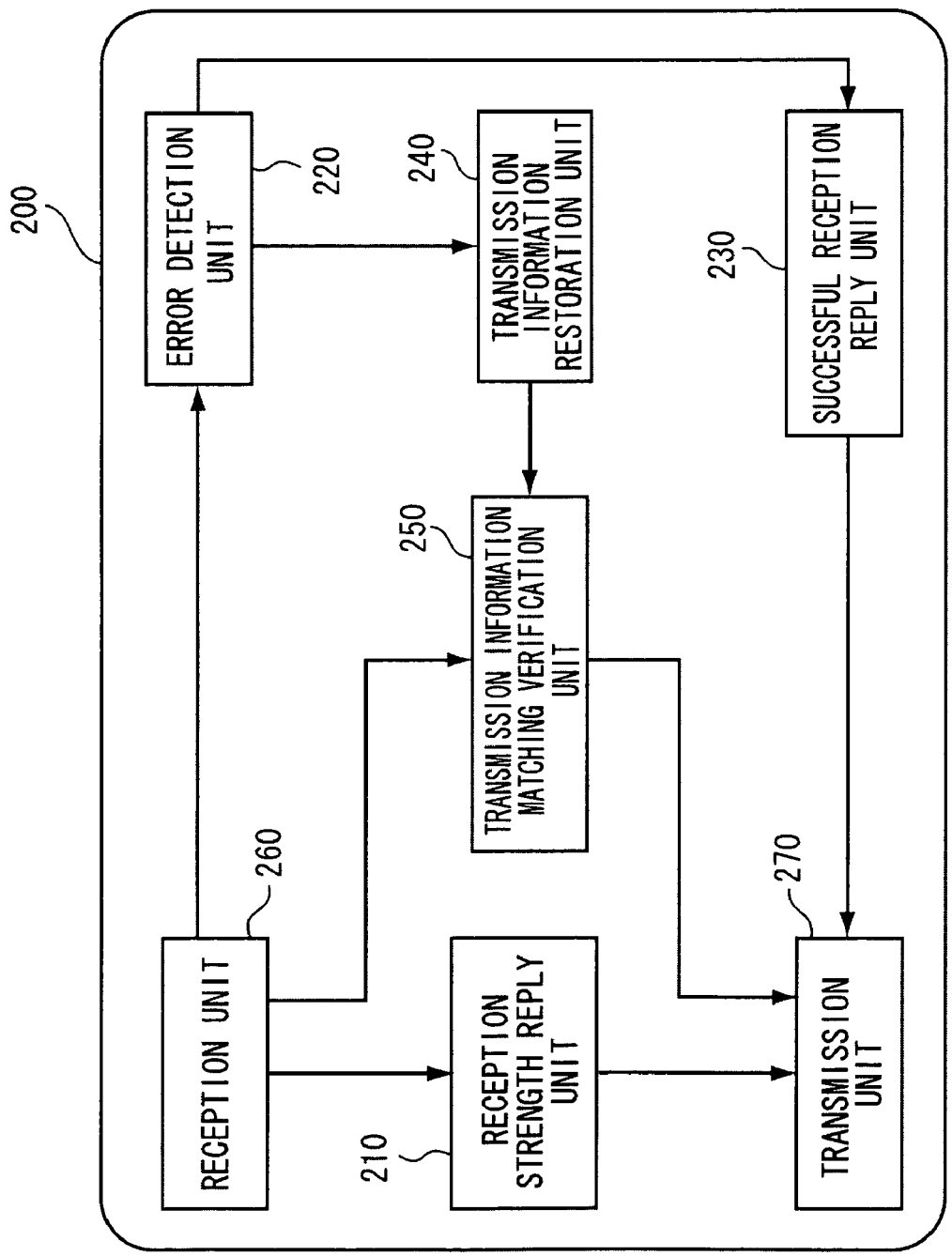
FIG. 6 is a functional block diagram of a reception terminal 200 pertaining to embodiment 1.

FIG. 6 is a functional block diagram of the reception terminal 200 pertaining to embodiment 1.

The reception terminal 200 is equipped with a reception strength replying unit 210, an error detection unit 220, a successful reception replying unit 230, a transmission information restoration unit 240, a transmission information matching verification unit 250, a reception unit 260 and a transmission unit 270.

The reception strength replying unit 210 acquires the reception strength of the signal that it has received from the transmission terminal 100 and notifies the transmission terminal 100, via the transmission unit 270, of information of the reception signal strength that it has acquired.

The error detection unit 220 detects whether or not there is a bit error in the redundant transmission information that it has received from the reception unit 260.

The error detection unit 220 extracts the sequence number i, the redundant information ri for restoring the transmission information, and the error detection code EDCi from the redundant transmission information that it has received from the reception unit 260 and checks whether or not there are bit errors in the redundant information ri for restoring the transmission information.

When there are no bit errors in the $i^{th}$ packet of redundant information ri, then the error detection unit 220 outputs the sequence number i and a message indicating that there are no bit errors to the successful reception replying unit 230 and outputs the sequence number i and the redundant information ri to the transmission information restoration unit 240.

When the successful reception replying unit 230 receives the sequence number i and the message indicating that there are no bit errors from the error detection unit 220, then the successful reception replying unit 230 judges that the reception terminal 200 has correctly received the $i^{th}$ packet of redundant information ri and outputs a successful reception reply message to the transmission unit 270.

When the transmission information restoration unit 240 receives the sequence number i and the redundant information ri in which no bit errors have been detected from the error detection unit 220, then the transmission information restoration unit 240 executes an operation for restoring the transmission information.

The method of restoring the transmission information differs depending on the method of generating the redundant information in the redundant transmission information generation unit 140 of the transmission terminal 100. For example, there are the methods shown in FIGS. 3 to 5, but the method of restoring the transmission information is not limited to these.

The transmission information restoration unit 240 outputs the transmission information that it has restored to the transmission information matching verification unit 250.

The transmission information matching verification unit 250 verifies whether or not the transmission information that it has received from the transmission information restoration unit 240 is the correct transmission information of the transmission terminal 100.

When the transmission information matching verification unit 250 verifies whether or not the reception terminal 200 has acquired the correct transmission information, the transmission information matching verification unit 250 can, for example, use two-way authentication using a challenge-response scheme.

The reception unit 260 outputs, to the error detection unit 220, the redundant transmission information that has been transmitted from the transmission terminal 100.

Further, in order to measure the power strength of the signal that it has received from the transmission terminal 100, the reception unit 260 outputs the signal that has been received to the reception strength replying unit 210.

Further, the reception unit 260 outputs, to the transmission information matching verification unit 250, various information for matching verification of the transmission information that it has received from the transmission terminal 100.

The transmission unit 270 transmits the reception signal strength information that it has received from the reception strength replying unit 210 to the transmission terminal 100.

Further, the transmission unit 270 replies to the transmission terminal 100 with the successful reception reply message that it has received from the successful reception replying unit 230.

Further, the transmission unit 270 transmits, to the transmission terminal 100, various information for transmission information matching verification that it has received from the transmission information matching verification unit 250.

The reception strength replying unit 210, the error detection unit 220, the successful reception replying unit 230, the transmission information restoration unit 240 and the transmission information matching verification unit 250 can be configured by hardware such as a circuit device that realizes the functions of these units or can be configured by a processing unit such as a CPU or a microcomputer and software that realizes those functions.

The configuration of the reception terminal 200 has been described above.

Next, the operation of an information distribution system that comprises the transmission terminal 100 and the reception terminal 200 will be described.

Figure 7:
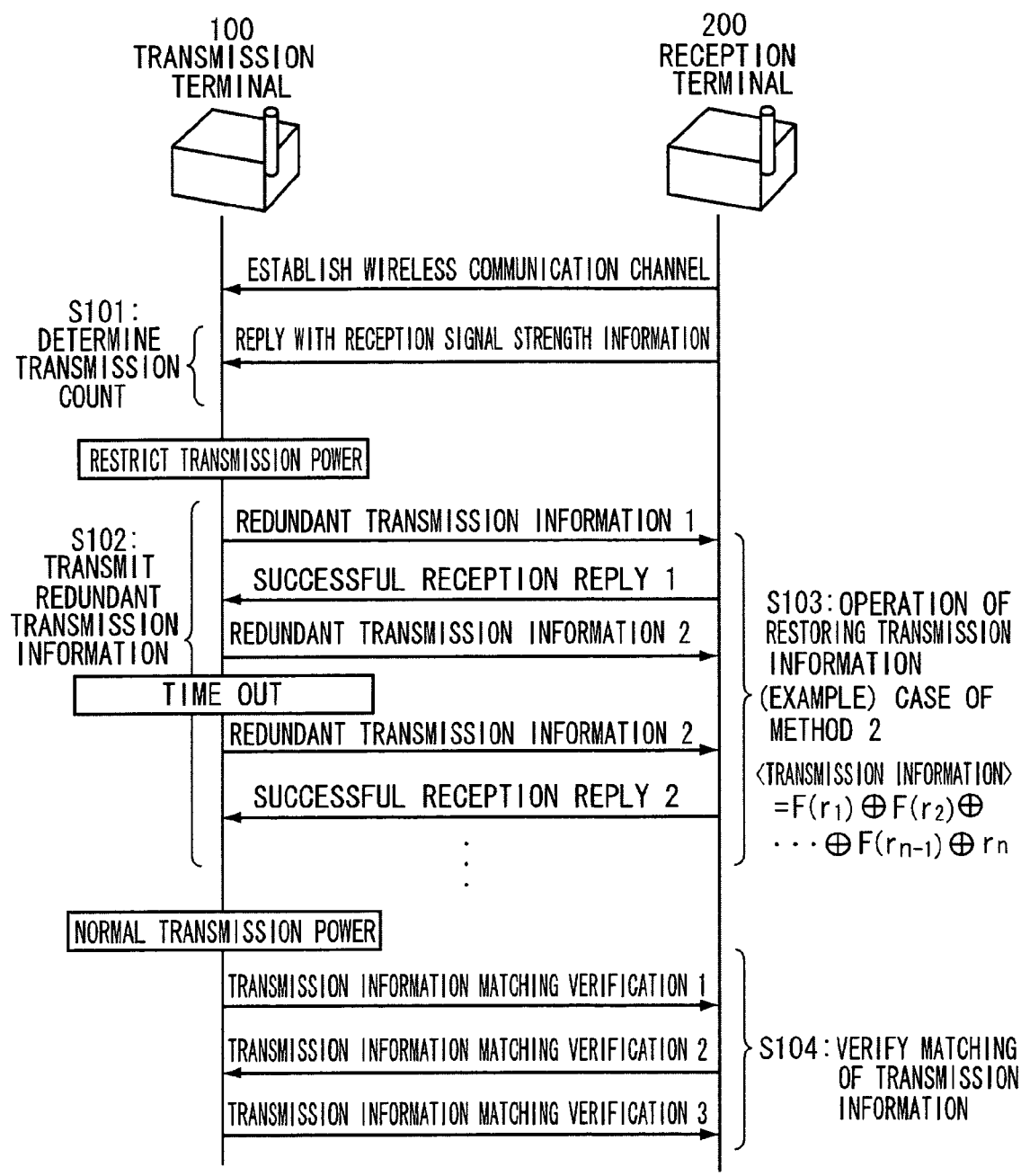
FIG. 7 is a communication sequence diagram of an information distribution system that comprises the transmission terminal 100 and the reception terminal 200.

FIG. 7 is a communication sequence diagram of the information distribution system that comprises the transmission terminal 100 and the reception terminal 200. Below, each of the steps in FIG. 7 will be described.

(S101: Set the Transmission Count)

(1) The reception strength replying unit 210 of the reception terminal 200 measures the strength of the signal that it has received from the transmission terminal 100 and replies to the transmission terminal 100 with information of the reception signal strength that it has measured.

(2) The bit error rate determination unit 110 of the transmission terminal 100 estimates the bit error rate of the reception terminal 200 from the reception signal strength information for which there has been a reply from the reception terminal 200 and the radio wave propagation characteristic of the utilization environment that it has understood beforehand. The bit error rate determination unit 110 outputs, to the redundant information amount determination unit 120, the bit error rate that it has determined on the basis of the bit error rate that it has estimated.

(3) The redundant information amount determination unit 120 of the transmission terminal 100 determines into how much of an information amount it should increase and transmit the transmission information and outputs the transmission count that it has determined and the bit length of the redundant information to the redundant transmission information generation unit 140.

(S102: Transmit the Redundant Transmission Information)

(1) The redundant transmission information generation unit 140 of the transmission terminal 100 generates, and transmits to the reception terminal 200, the first packet of redundant transmission information. At the same time, the delivery management unit 150 starts the timer.

(2) The error detection unit 220 of the reception terminal 200 checks whether or not there are bit errors in the redundant information included in the redundant transmission information.

When no bit errors have been detected, then the error detection unit 220 judges that the reception terminal 200 has correctly received the first packet of redundant information and outputs the redundant information that the reception terminal 200 has correctly received to the transmission information restoration unit 240. Further, the error detection unit 220 replies, via the successful reception replying unit 230, to the transmission terminal 100 with a successful reception reply message.

When the error detection unit 220 has detected a bit error, then the error detection unit 220 does not issue a reply.

(3) When the delivery management unit 150 of the transmission terminal 100 has received a successful reception reply message from the reception terminal 200 within the prescribed amount of time, then the delivery management unit 150 judges that the first packet of redundant information has been correctly delivered and requests the redundant transmission information generation unit 140 to generate the second packet of redundant transmission information.

On the other hand, when the delivery management unit 150 has not received a successful reception reply message from the reception terminal 200 within the prescribed amount of time and time has run out, then the delivery management unit 150 judges that the first packet of redundant information has not been correctly delivered and requests the redundant transmission information generation unit 140 to regenerate (redo) the first packet of redundant transmission information.

(4) The information distribution system repeats the aforementioned operations of (1) to (3) with respect to the redundant transmission information of the determined transmission count.

(S103: Restore the Transmission Information)

(1) The transmission information restoration unit 240 of the reception terminal 200 restores the transmission information. The method of restoring the transmission information differs depending on the method of generating the redundant information in the redundant transmission information generation unit 140 of the transmission terminal 100. For example, there are the methods shown in FIGS. 3 to 5, but the method of restoring the transmission information is not limited to these. The transmission information restoration unit 240 outputs the transmission information that it has restored to the transmission information matching verification unit 250.

(S104: Verify Matching of the Transmission Information)

(1) The transmission information matching verification unit 160 of the transmission terminal 100 generates challenge information and transmits the challenge information that it has generated to the reception terminal 200 via the transmission unit 170 (key matching command 1).

(2) The reception unit 260 of the reception terminal 200 outputs the challenge information that it has received to the transmission information matching verification unit 250.

The transmission information matching verification unit 250 generates response information with respect to the challenge information that it has received and its own challenge information and transmits these to the transmission terminal 100 via the transmission unit 270 (key matching command 2).

(3) The reception unit 180 of the transmission terminal 100 outputs the response information and the challenge information that it has received to the transmission information matching verification unit 160. The transmission information matching verification unit 160 checks whether or not the reception terminal 200 has acquired the correct transmission information.

Further, the transmission information matching verification unit 160 generates response information with respect to the challenge information and transmits the response information that it has generated to the reception terminal 200 via the transmission unit 170 (key matching command 3).

(4) The reception unit 260 of the reception terminal 200 outputs the response information that it has received to the transmission information matching verification unit 250. The transmission information matching verification unit 250 checks whether or not the transmission information that it has received from the transmission information restoration unit 240 is the correct transmission information of the transmission terminal 100.

The operation of the information distribution system that comprises the transmission terminal 100 and the reception terminal 200 has been described above.

Next, the effects that the transmission terminal 100 and the reception terminal 200 exhibit will be described.

First, there will be described the reception terminal 200 replying with a successful reception reply message only when the reception terminal 200 has correctly received the redundant transmission information.

When the transmission terminal 100 has transmitted the redundant transmission information, there are four patterns as to whether or not the reception terminal 200 and an intercepting terminal will respectively mistake bits.

Figure 8:
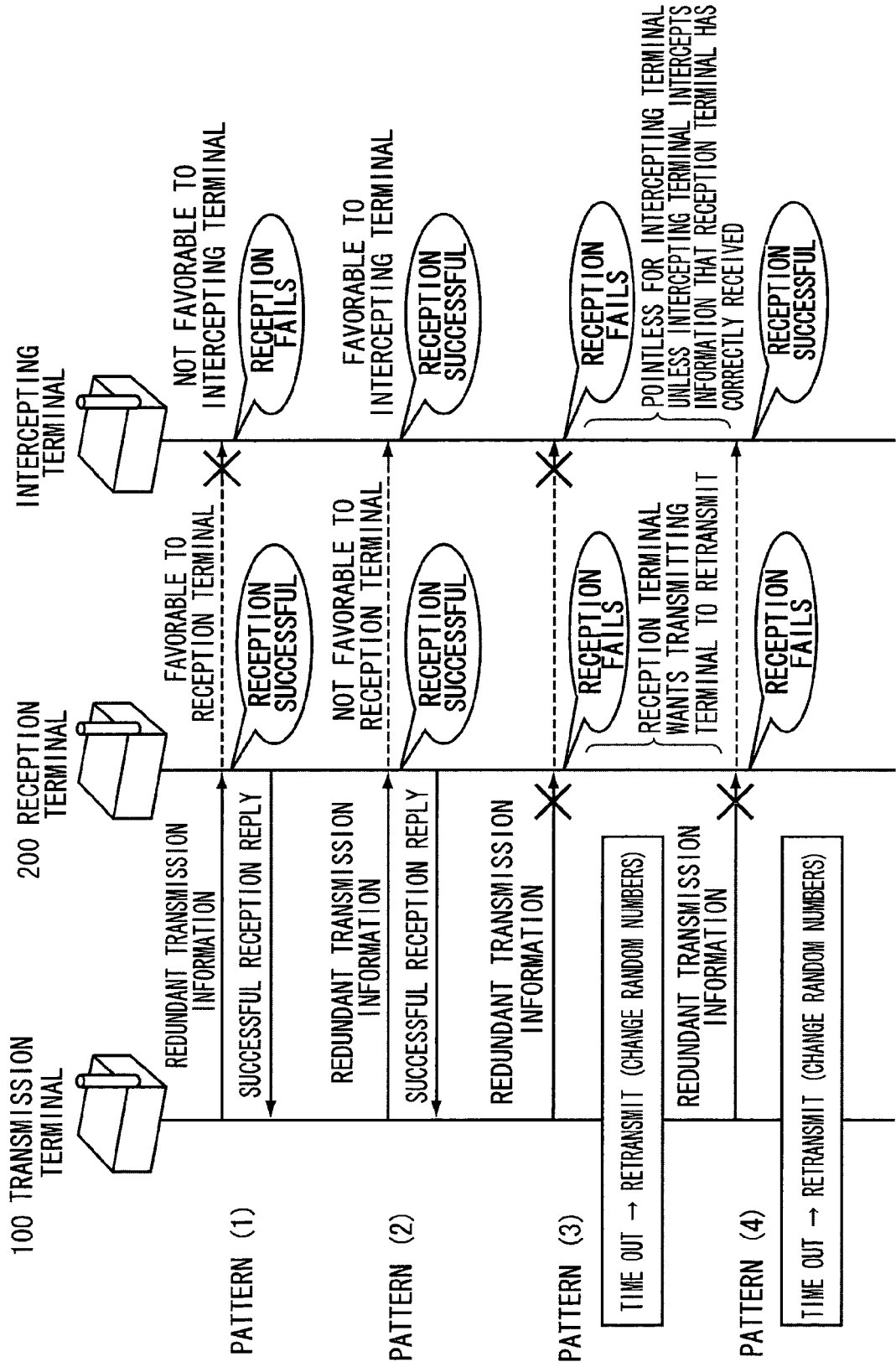
FIG. 8 is a diagram showing four patterns as to whether or not the reception terminal 200 and an intercepting terminal succeed at reception the redundant transmission information.

FIG. 8 is a diagram showing four patterns as to whether or not the reception terminal 200 and an intercepting terminal will successfully receive the redundant transmission information.

In order for only the reception terminal 200 to restore the correct transmission information, as shown in pattern (1) in FIG. 8, it is preferable for the situation to be one where the reception terminal 200 will correctly receive the redundant transmission information without mistaking the bits and where the intercepting terminal will mistake bits.

In embodiment 1, increasing and transmitting, in the reference bit error ratio, an information amount of transmission information to the extent that a bit error occurs has been described, but it is assumed that when the reference bit error rate is the same as the bit error rate of the reception terminal 200, there is the potential for bit errors to occur in the reception terminal 200.

In embodiment 1, as an approach for when bit errors have occurred in the reception terminal 200, the reception terminal 200 is configured to reply to the transmission terminal 100 with a successful reception reply message only when the reception terminal 200 has correctly received the redundant transmission information without mistaking the bits and to not reply to the transmission terminal 100 when the reception terminal 200 has mistaken the bits.

This method will be described next in FIG. 9.

Figure 9:
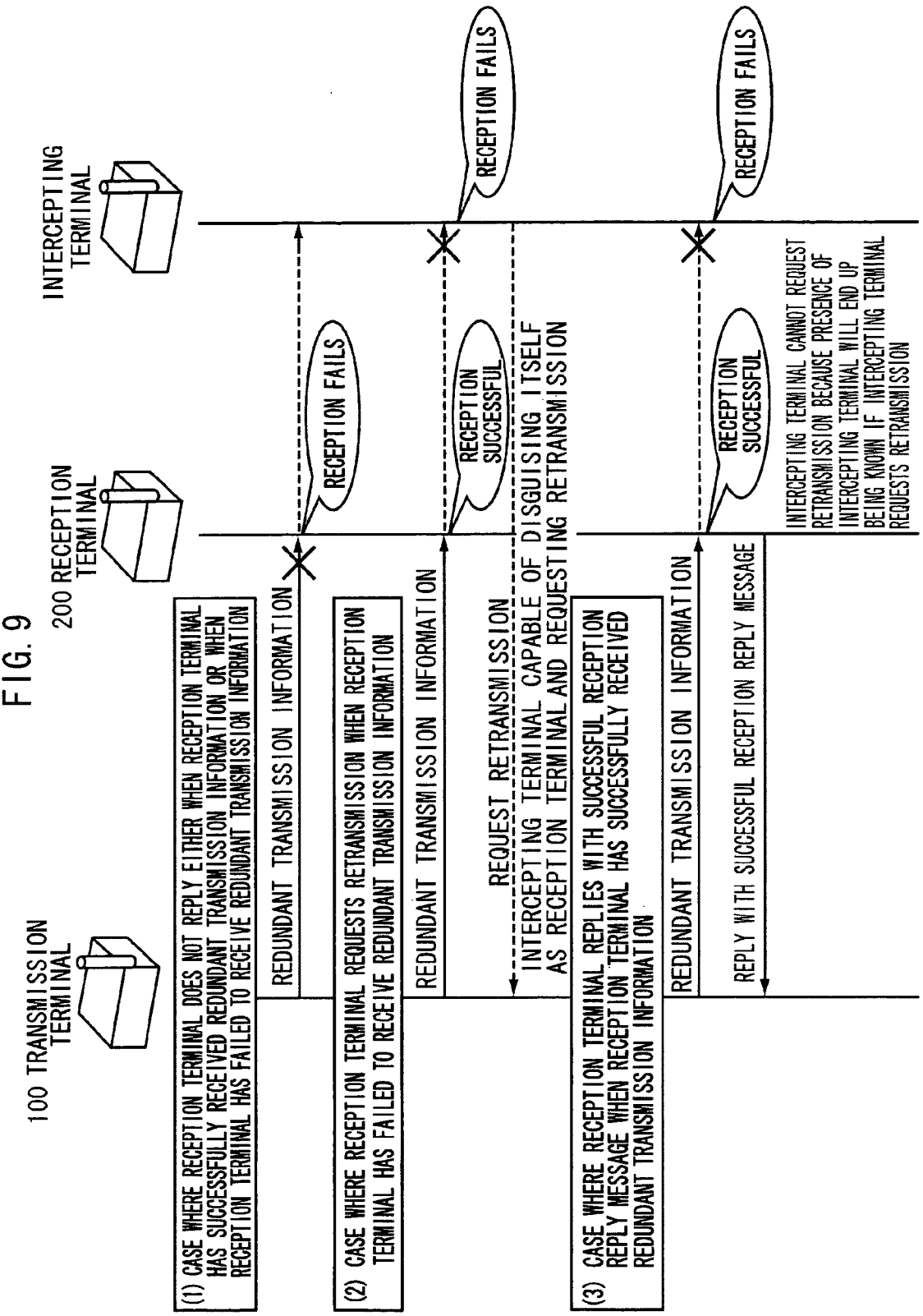
FIG. 9 is a diagram showing three approaches when the reception terminal 200 has failed to receive the redundant transmission information.

FIG. 9 is a diagram showing three approaches when the reception terminal 200 has failed to receive the redundant transmission information. Below, each of these approaches will be described.

(1) Case where the reception terminal does not reply either when the reception terminal has successfully received the redundant transmission information or when the reception terminal has failed to receive the redundant transmission information:

In this case, the transmission terminal 100 cannot detect whether or not the reception terminal 200 has correctly received the redundant transmission information, so the transmission terminal 100 does not know which packet of redundant transmission information it should retransmit, and the reception terminal 200 cannot restore the correct transmission information.

(2) Case where the reception terminal requests retransmission when the reception terminal has failed to receive the redundant transmission information:

In this case, even when the reception terminal 200 has failed to receive the redundant transmission information, the reception terminal 200 requests retransmission, so the transmission terminal 100 can detect whether or not the reception terminal 200 has correctly received the redundant transmission information.

However, a retransmission request when the reception terminal 200 has failed to receive the redundant transmission information can be forged by the intercepting terminal.

For example, even when the preferable situation shown in pattern (1) in FIG. 8 occurs, it is possible for the intercepting terminal to disguise itself as the reception terminal 200 and reply to the transmission terminal 100 with a retransmission request message.

Thus, the preferable situation where "the reception terminal 200 will correctly receive the redundant transmission information without mistaking the bits and where the intercepting terminal will mistake bits" ends up being destroyed.

(3) Case where the reception terminal replies with a successful reception reply message when the reception terminal has successfully received the redundant transmission information:

In this case, when the preferable situation shown in pattern (1) in FIG. 8 has occurred, in order for the intercepting terminal to destroy this preferable situation, it is necessary to not allow the reception terminal 200 to reply with a successful reception reply message. However, resources are needed in order for the intercepting terminal to disrupt this, so it is difficult.

Further, because there is also the potential for the presence of the intercepting terminal itself to end up being known because of this disruptive attack, there is the advantage that it becomes difficult for the intercepting terminal to carry out an attack.

Thus, in embodiment 1, the technique in FIG. 9 (3) is used.

The effect of the reception terminal 200 replying with a successful reception reply message only when the reception terminal 200 has correctly received the redundant transmission information has been described above.

Next, the amount of operations of restoring the transmission information will be described.

By intercepting S104 (Verify Matching of the Transmission Information) in FIG. 7, the intercepting terminal can acquire a combination of plaintext and ciphertext when it has used the correct transmission information as a key.

Thus, when there are few bit errors in the redundant transmission information that the intercepting terminal has actually received, there is the potential for the intercepting terminal to end up identifying the transmission information by a few number of trials through a brute force attack.

On the other hand, by increasing the preferable situation (where only the intercepting terminal will mistake bits) shown in pattern (1) in FIG. 8, the number of trials through a brute force attack that the intercepting terminal needs until it identifies the transmission information can be raised to an unrealistic level in terms of the amount of calculation.

For example, it will be assumed that the redundant information included in the redundant transmission information is x bits and that bit error in the redundant information of the intercepting terminal in the preferable situation of pattern (1) in FIG. 8 is e bit, where $e \leq x$.

In this case, the number of all possible patterns that are verified by the intercepting terminal to identify the correct redundant information from the incomplete redundant information including bit errors can be denoted as $_xC_e$. Moreover, in the method of generating the redundant transmission information by the EXOR operation shown in FIG. 3, when the intercepting terminal fails to receive the redundant transmission information a times, then the number of all possible patterns that are verified by the intercepting terminal to identify the correct transmission information from the reconstructed incomplete transmission information including bit errors can be denoted as $_xC_1 + _xC_2 + \ldots _xC_{ea}$, where $ea \leq x$.

Further, in the case of the redundant transmission information generating method that combines the EXOR operation and the scrambling function shown in FIG. 4 and FIG. 5, the number of all possible patterns of the correct transmission information can both be denoted as $_xC_e^a$, where $_xC_e^a \leq 2^x$.

Finally, the assertion of security based on the reference bit error rate will be described.

As mentioned above, the number of trials through a brute force attack that the intercepting terminal needs until it identifies the transmission information can be defined by the method of generating the redundant information.

Thus, supposing a reference bit error rate, when it is assumed that an intercepting terminal which has that bit error rate is present, there is the advantage that the information distribution system can clearly determine how much of an information amount, and by how many of a transmission count, it needs to send in order to bring the number of trials through a brute force attack that that intercepting terminal needs until it identifies the transmission information to an unrealistic level in terms of the amount of calculation.

There are two methods of setting the reference bit error rate: a method where the reference bit error rate is matched to the bit error rate of the reception terminal 200 and a method where the bit error rate is arbitrarily set. Overviews of these methods are respectively shown in FIG. 10 and FIG. 11.

Figure 10:
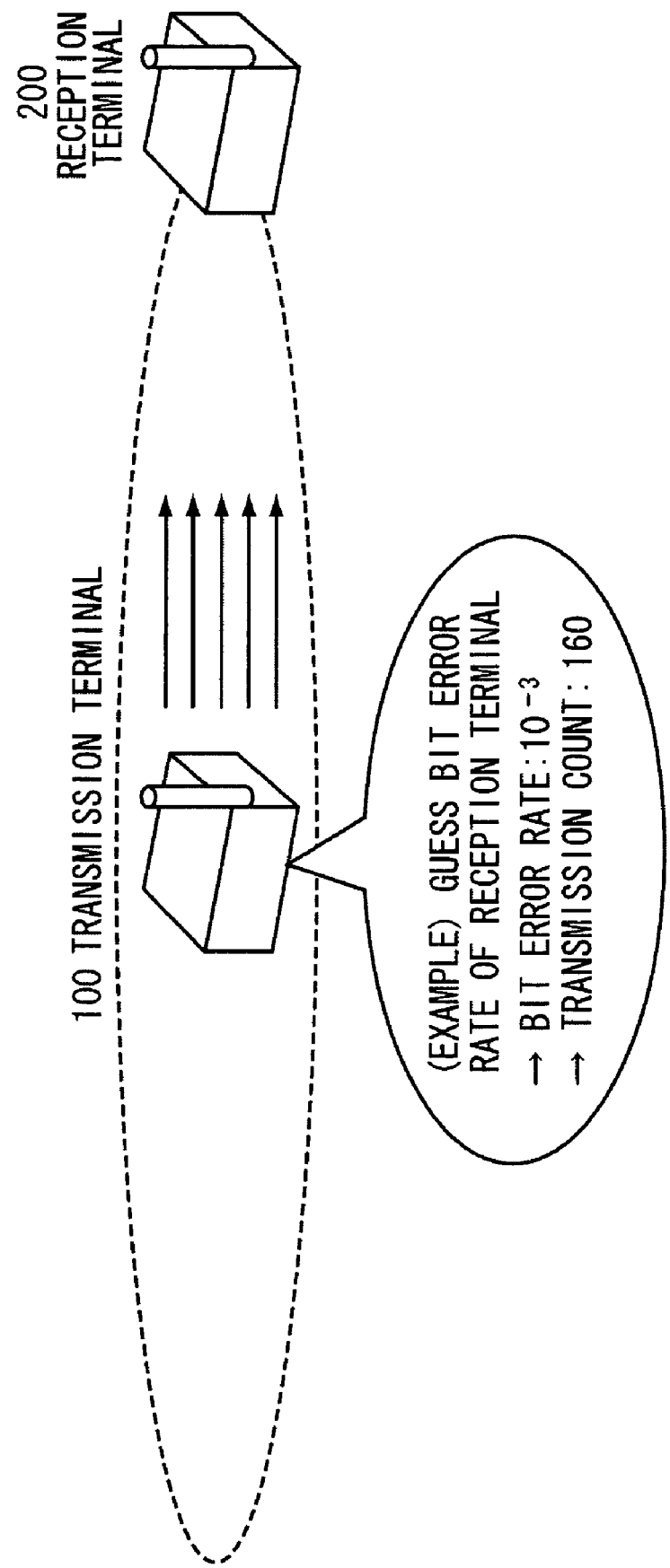
FIG. 10 is a diagram describing a case where a reference bit error rate is matched to the bit error rate of the reception terminal 200.

FIG. 10 is a diagram describing a case where the reference bit error rate is matched to the bit error rate of the reception terminal 200.

In this case, it can be asserted that "when the bit error rate of the intercepting terminal corresponds to the bit error rate of the reception terminal 200, then the potential for the intercepting terminal to need the number of trials through a brute force attack corresponding to ○○ in order to identify the transmission information that the reception terminal 200 has restored is high."

Figure 11:
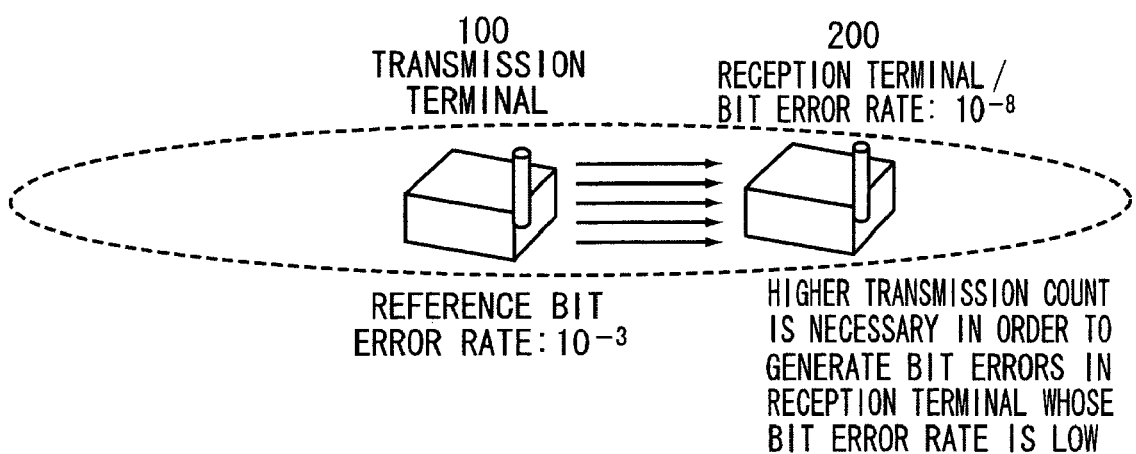
FIG. 11 is a diagram describing a case where the reference bit error rate is arbitrarily set.

FIG. 11 is a diagram describing a case where the reference bit error rate is arbitrarily set.

In this case, it can be asserted that "when the bit error rate of the intercepting terminal corresponds to ΔΔ, then the potential for the intercepting terminal to need the number of trials through a brute force attack corresponding to ○○ in order to identify the transmission information that the reception terminal 200 has restored is high."

In order to generate more bit errors in the reception terminal 200 whose bit error rate is extremely low, naturally it is necessary for the transmission terminal 100 to transmit even more of the redundant transmission information.

Thus, the information distribution system can also perform differentiation such that when the result of having estimated the bit error rate of the reception terminal 200 is larger than a certain reference, then an arbitrary bit error rate is set by the former method shown in FIG. 10, and when the result of having estimated the bit error rate of the reception terminal 200 is smaller than the certain reference, then a reference bit error rate is set by the latter method shown in FIG. 11.

As described above, according to embodiment 1, the transmission terminal 100 estimates the bit error rate of the reception terminal 200 on the basis of the radio wave propagation characteristic of the environment that has been measured beforehand and increases and transmits the information amount of the transmission information to the extent that it mistakes the bits by the reference bit error rate (e.g., the bit error rate of the reception terminal 200).

Thus, the probability that bit errors will occur in an intercepting terminal whose error rate is higher than the reference bit error rate can be raised.

As a result, it becomes possible to raise the probability that only the reception terminal 200 will restore the correct transmission information.

Further, according to embodiment 1, it becomes possible to assert a reference of security as to how much of the number of trials through a brute force attack the intercepting terminal needs in order to identify the transmission information.

Further, according to embodiment 1, because the transmission terminal 100 increases and transmits the information amount of the transmission information, the potential for the bit error rate when considered by all of the information that it has transmitted to become higher in comparison to the bit error rate when the transmission terminal 100 transmits one packet of transmission information (whose information amount is small) singly is high.

For that reason, even when there is a limit on the function of controlling the transmission output strength of the transmission terminal, the transmission terminal 100 can exhibit effects that are the same as the transmission terminal 100 controlling its transmission output strength in terms of the bit error rate of all of the information that the transmission terminal 100 transmits becoming higher.

Embodiment 2

In the present embodiment, instead of estimating the bit error rate of the reception terminal 200 using the radio wave propagation characteristic as in embodiment 1, the transmission terminal 100 actually delivers the redundant transmission information a prescribed number of times and estimates the bit error rate of the reception terminal 200 from the error count at that time.

The information distribution system pertaining to embodiment 2 is, as in embodiment 1, configured by the transmission terminal 100 and the reception terminal 200. The reception terminal 200 is generally the same as the reception terminal 200 in embodiment 1, so only the transmission terminal 100 will be described.

Figure 12:
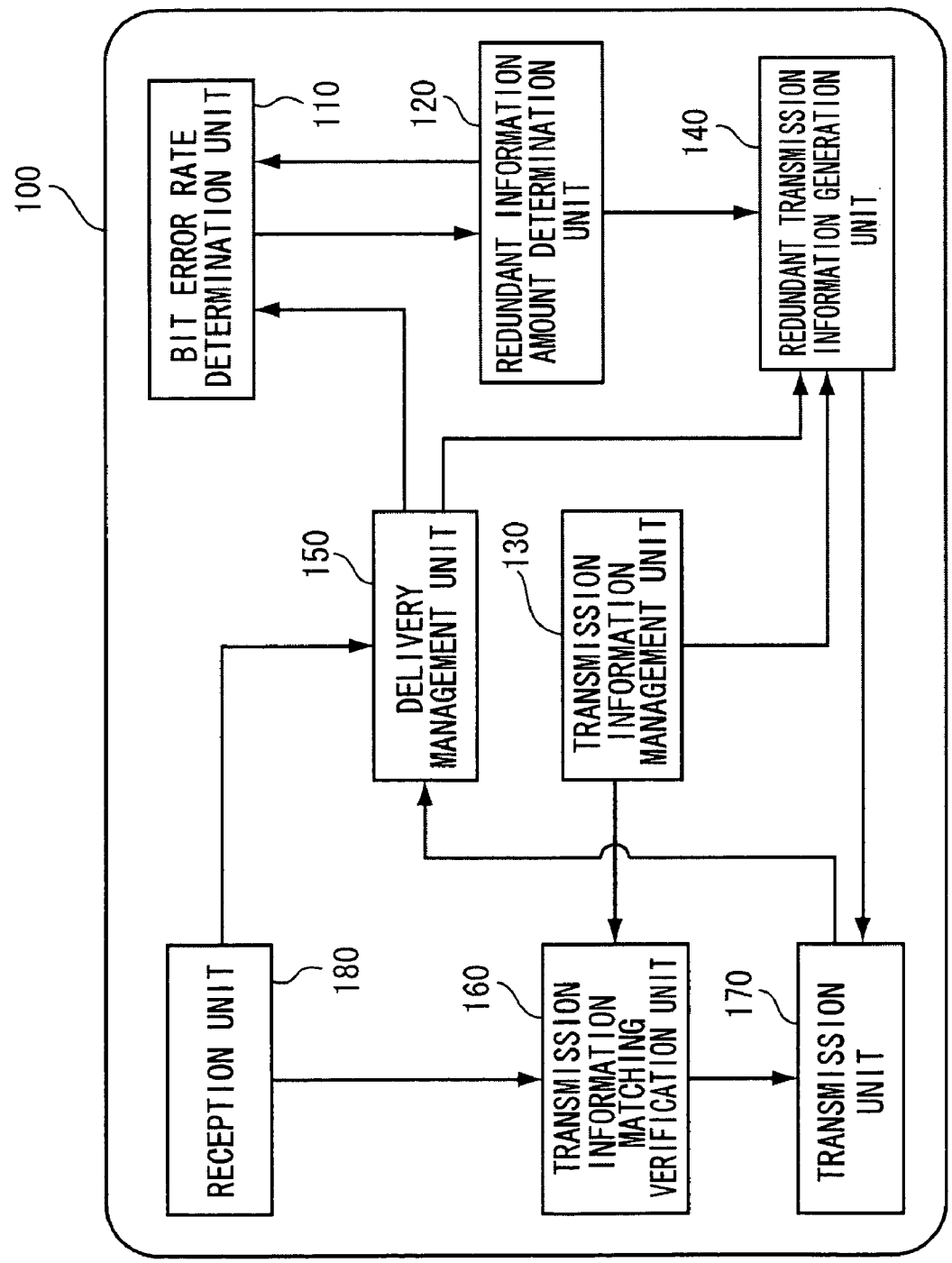
FIG. 12 is a functional block diagram of the transmission terminal 100 pertaining to embodiment 2.

FIG. 12 is a functional block diagram of the transmission terminal 100 pertaining to embodiment 2.

Here, only the redundant information amount determination unit 120, the redundant transmission information generation unit 140, the delivery management unit 150 and the bit error rate determination unit 110, whose operations differ from those in the functional block of the transmission terminal 100 that was described in FIG. 1 of embodiment 1, will be described.

The redundant information amount determination unit 120 basically has the same operation as that of the redundant information amount determination unit 120 of embodiment 1 but differs in the following respect.

First, the redundant information amount determination unit 120 determines a prescribed transmission count and the bit length of the redundant information, outputs the bit length of the redundant information that it has determined to the bit error rate determination unit 110, and outputs the transmission count and the bit length of the redundant information that it has determined to the redundant transmission information generation unit 140.

The redundant information amount determination unit 120 later receives, from the bit error rate determination unit 110, a reference bit error rate that has been estimated on the basis of information of how many times the redundant transmission information of the prescribed count has actually been mistaken.

Additionally, the redundant information amount determination unit 120 finally determines into how much of an information amount it should increase and transmit the transmission information.

For example, the redundant information amount determination unit 120 determines, and outputs to the redundant transmission information generation unit 140, 100 and 128 bits respectively as the prescribed transmission count and the bit length of the redundant information.

When the redundant information amount determination unit 120 later receives a bit error rate of 0.001 from the bit error rate determination unit 110 and wishes to determine 177 for the transmission count and 128 bits for the bit length of the redundant information, then the redundant information amount determination unit 120 outputs the remaining transmission count of 77 and the bit length of 128 bits of the redundant information to the redundant transmission information generation unit 140.

On the other hand, when the transmission count that the redundant information amount determination unit 120 wishes to determine has fallen below the prescribed count that the redundant information amount determination unit 120 has already outputted to the redundant transmission information generation unit 140, then the redundant information amount determination unit 120 outputs, to the redundant transmission information generation unit 140, a message indicating that there is no remaining transmission count and the bit length of 128 bits of the redundant information.

The redundant transmission information generation unit 140 basically has the same operation as that of the redundant transmission information generation unit 140 of embodiment 1 but differs in that it twice receives the transmission count and the bit length of the redundant information from the redundant information amount determination unit 120. That is, the first time is when it transmits the redundant transmission information in order to estimate the bit error rate, and the second time is when it transmits the remaining redundant transmission information.

During the second time, when the redundant transmission information generation unit 140 has received a message indicating that there is no remaining transmission count, then the redundant transmission information generation unit 140 generates, and outputs to the transmission unit 170, the n (prescribed count determined by the redundant information amount determination unit 120+first) packet of redundant transmission information that becomes the final packet of redundant transmission information.

The delivery management unit 150 basically has the same operation as that of the delivery management unit 150 of embodiment 1 but differs in the following respect.

The delivery management unit 150 counts the number of times it receives notification from the transmission unit 170 that the transmission unit 170 has transmitted the redundant transmission information and the number of times that the redundant transmission information has not been correctly delivered to the reception terminal 200 (the number of times that time has run out) and outputs the information that it has counted (the total transmission count and the error count) to the bit error rate determination unit 110.

The bit error rate determination unit 110 determines a bit error rate that becomes a reference of security in embodiment 2.

First, the bit error rate determination unit 110 estimates the bit error rate of the reception terminal 200 from the bit length of the redundant information that it has received from the redundant information amount determination unit 140 and the count information (the total transmission count and the error count) that it has received from the delivery management unit 150.

For example, when the bit error rate determination unit 110 has received 200 bits as the bit length of the redundant information, 120 as the total transmission count and 20 as the error count, then the bit error rate determination unit 110 assumes that bit error is only 1 bit and estimates that the bit error rate=$20/(200\times120)\approx0.00083$.

The bit error rate determination unit 110 may use, as is, the bit error rate that it has estimated, or, for example, when the bit error rate that it has estimated is lower than a predetermined reference value, the bit error rate determination unit 110 may use that reference value instead of the bit error rate that it has estimated.

The bit error rate determination unit 110 outputs the bit error rate that it has finally determined to the redundant information amount determination unit 120.

The configuration of the transmission terminal 100 has been described above.

Next, the operation of the information distribution system will be described.

Figure 13:
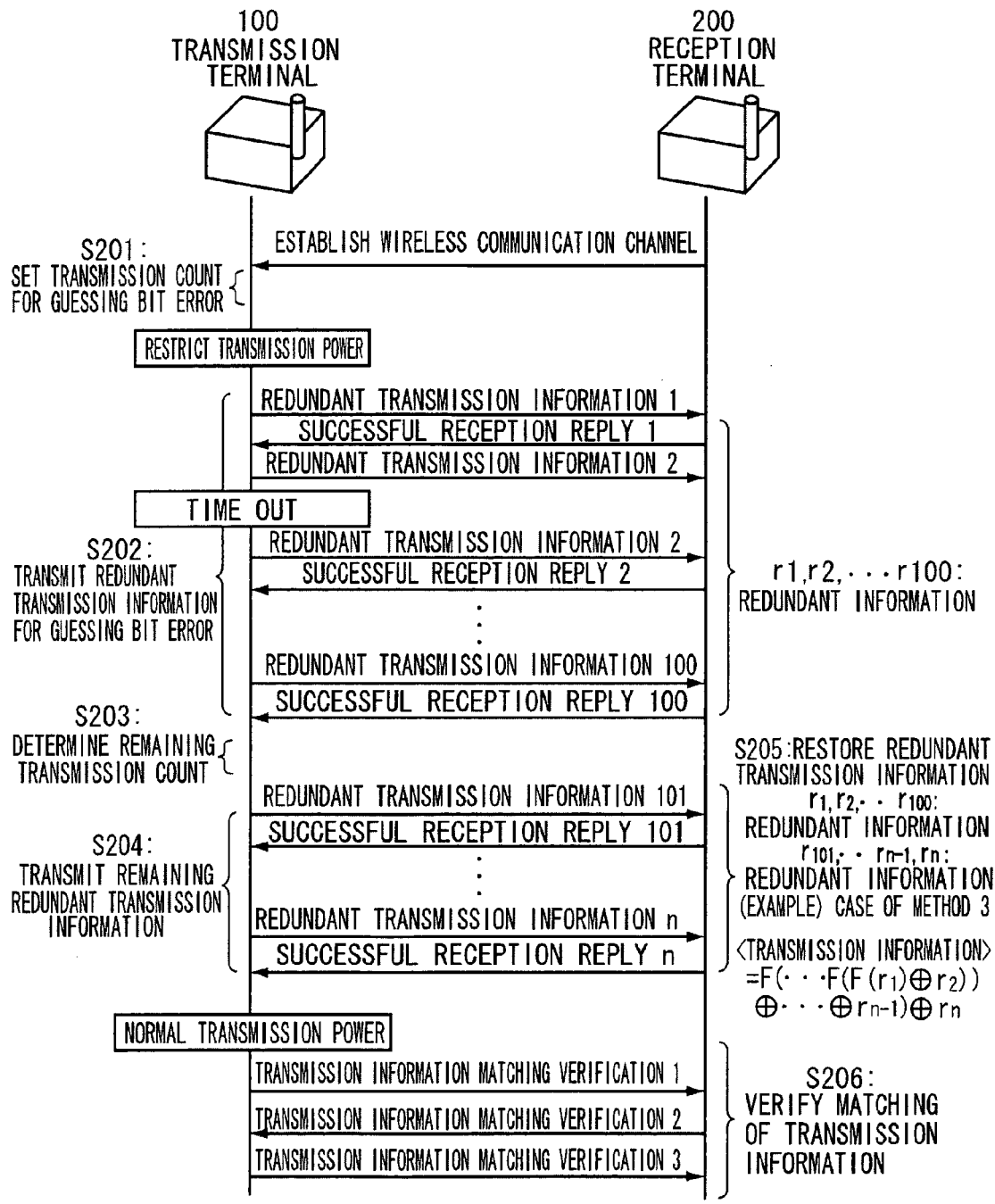
FIG. 13 is a communication sequence diagram of the information distribution system pertaining to embodiment 2.

FIG. 13 is a communication sequence diagram of information distribution system. Below, each of the steps in FIG. 13 will be described.

(S201: Set the Transmission Count for Estimating the Bit Error Rate)

(1) The redundant information amount determination unit 120 of the transmission terminal 100 determines the bit length of the redundant information and the transmission count for estimating the bit error rate of the reception terminal 200, outputs the bit length of the redundant information that it has determined to the bit error rate determination unit 110, and outputs the transmission count and the bit length of the redundant information that it has determined to the redundant transmission information generation unit.

(S202: Transmit the Redundant Transmission Information for Estimating the Bit Error Rate)

(1) The redundant transmission information generation unit 140 of the transmission terminal 100 generates, and transmits to the reception terminal 200, the first packet of redundant transmission information. At the same time, the delivery management unit 150 starts the timer.

(2) The error detection unit 220 of the reception terminal 200 checks whether or not there are bit errors in the redundant information included in the redundant transmission information.

When no bit errors have been detected, then the error detection unit 220 judges that the reception terminal 200 has correctly received the first packet of redundant information and outputs the redundant information that the reception terminal 200 has correctly received to the transmission information restoration unit 240. Further, the error detection unit 220 replies, via the successful reception replying unit 230, to the transmission terminal 100 with a successful reception reply message.

When the error detection unit 220 has detected a bit error, then it does not issue a reply.

(3) When the delivery management unit 150 of the transmission terminal 100 has received a successful reception reply message from the reception terminal 200 within a prescribed amount of time, then the delivery management unit 150 judges that the first packet of redundant information has been correctly delivered and requests the redundant transmission information generation unit 140 to generate the second packet of redundant transmission information.

On the other hand, when the delivery management unit 150 has not received a successful reception reply message from the reception terminal 200 within the prescribed amount of time and time has run out, then the delivery management unit 150 judges that the first packet of redundant information has not been correctly delivered and requests the redundant transmission information generation unit 140 to regenerate (redo) the first packet of redundant transmission information.

(4) The information distribution system repeats the above operations with respect to the redundant transmission information of the determined transmission count.

The delivery management unit 150 of the transmission terminal 100 counts the total transmission count of the redundant transmission information and the number of times that the redundant transmission information was not correctly delivered to the reception terminal 200 (the number of times that time has run out).

The delivery management unit 150 of the transmission terminal 100 outputs the count information that it has counted (the total transmission count and the error count) to the bit error rate determination unit 110.

(S203: Set the Remaining Transmission Count)

(1) The bit error rate determination unit 110 of the transmission terminal 100 estimates the bit rate error of the reception terminal 200 from the bit length of the redundant information that it has received from the redundant information amount determination unit 120 and the count information (the total transmission count and the error count) that it has received from the delivery management unit 150.

The bit error rate determination unit 110 outputs, to the redundant information amount determination unit 120, the bit error rate that it has determined on the basis of the bit error rate that it has estimated.

(2) The redundant information amount determination unit 120 of the transmission terminal 100 determines into how much of an information amount it should increase and transmit the redundant information on the basis of the bit error rate that it has received from the bit error rate determination unit 110.

When the transmission count that the redundant information amount determination unit 120 has determined is larger than the transmission count that was already determined in S201, then the redundant information amount determination unit 120 judges that the transmission count that it determined in S201 has already been used up and outputs the remaining transmission count and the bit length of the redundant information to the redundant transmission information generation unit 140.

When the transmission count that has been determined is equal to or less than the transmission count that was already determined in S201, then the redundant information amount determination unit 120 judges that the transmission count that has been determined this time has already been used up and outputs a message indicating that there is no remaining transmission count and the bit length of the redundant information to the redundant transmission information generation unit 140.

(S204: Transmit the Remaining Redundant Transmission Information)

(1) This is basically the same operation as (S 102: Transmit the Redundant Transmission Information) of embodiment 1 but differs in that the redundant transmission information generation unit 140 of the transmission terminal 100 twice receives the transmission count and the bit length of the redundant information from the redundant information amount determination unit 120.

(S205: Restore the Transmission Information)

(1) This is basically the same operation as (S103: Restore the Transmission Information) of embodiment 1.

(S206: Verify Matching of the Transmission Information)

(1) This is basically the same operation as (S104: Verify Matching of the Transmission Information) of embodiment 1.

As described above, in embodiment 2, the transmission terminal 100 actually delivers the redundant transmission information a prescribed number of times and estimates the bit error rate of the reception terminal 200 from the remaining count at that time.

Consequently, in addition to embodiment 1, there is the further advantage that the transmission terminal 100 can estimate the bit error rate of the reception terminal 100 even without understanding the radio wave propagation characteristic of the environment beforehand.

Embodiment 3

In the present embodiment, there will be described a configuration and an operation that make it difficult for the intercepting terminal to identify the transmission information by including dummy information in the redundant transmission information.

In embodiment 3, the reception terminal 200 generates, and transmits to the transmission terminal 100, dummy redundant transmission information. Further, the reception terminal 200 transmits a successful reception reply and a resend request of that dummy information to the transmission terminal 100 as a dummy successful reception reply and a dummy resend request.

Thus, the intercepting terminal receives the dummy redundant transmission information and the dummy successful reception reply and resend request, and it becomes difficult for the intercepting terminal to discriminate which is true redundant transmission information, so it becomes difficult for the intercepting terminal to identify the transmission information.

Below, the configurations and operations of the transmission terminal 100 and the reception terminal 200 that realize transmission of the dummy information will be described.

Figure 14:
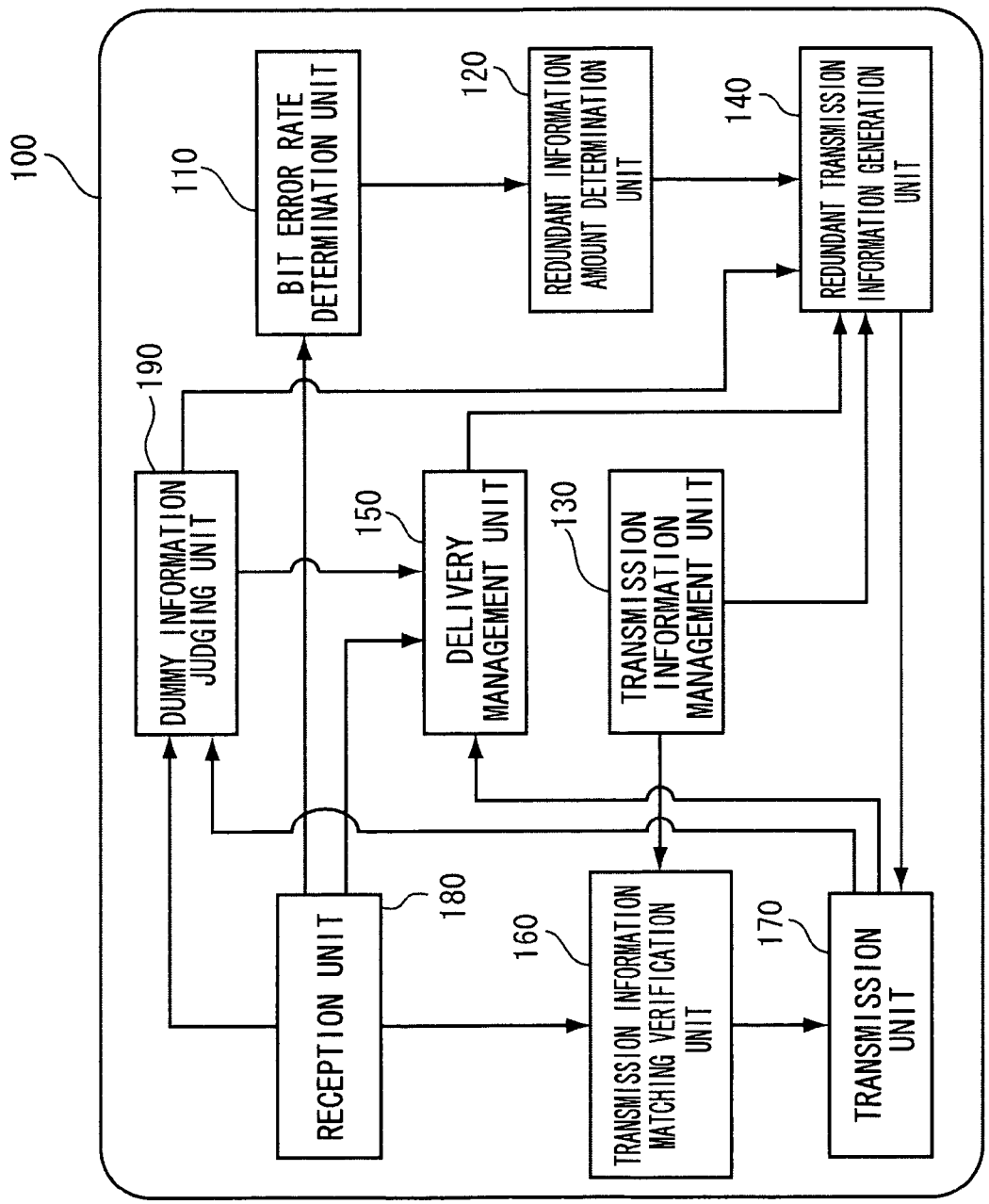
FIG. 14 is a functional block diagram of the transmission terminal 100 pertaining to embodiment 3.

FIG. 14 is a functional block diagram of the transmission terminal 100 pertaining to embodiment 3.

The transmission terminal 100 is, in addition to the configuration that was described in FIG. 1 of embodiment 1, equipped with a dummy information judgment unit 190.

Below, only the redundant transmission information generation unit 140, the delivery management unit 150, the dummy information judgment unit 190, the transmission unit 170 and the reception unit 180, whose operations differ from those in the internal configuration of the transmission terminal 100 described in embodiment 1, will be described.

The redundant transmission information generation unit 140 operates in basically the same manner as the redundant transmission information generation unit 140 described in embodiment 1 but differs in the following respect.

When the redundant transmission information generation unit 140 receives a redundant transmission information sequence number k from the dummy information judgment unit 190, then the redundant transmission information generation unit 140 judges that, even if it has received a request to transmit the $k^{th}$ packet of redundant transmission information from the delivery management unit 150, the $k^{th}$ packet of redundant transmission information is dummy redundant transmission information and does not output the $k^{th}$ packet of redundant transmission information to the transmission unit 170.

The delivery management unit 150 operates in basically the same manner as the delivery management unit 150 of embodiment 1 but differs in the following respect.

When the delivery management unit 150 receives the redundant transmission information sequence number k that has been judged to be dummy information from the dummy information judgment unit 190, then the delivery management unit 150 waits to receive, from the reception unit 180, a successful reception reply message with respect to the $k^{th}$ packet of redundant transmission information.

When the delivery management unit 150 receives a successful reception reply message from the reception unit 180, then the delivery management unit 150 judges that dummy processing of the $k^{th}$ packet of redundant transmission information has ended and outputs, to the redundant transmission information generation unit 140, a request for the redundant transmission information generation unit 140 to transmit the $(k+1)^{th}$ packet of redundant transmission information.

The dummy information judgment unit 190 judges whether or not the redundant transmission information is dummy information.

When the dummy information judgment unit 190 is notified by the transmission unit 170 that the transmission unit 170 has transmitted the $i^{th}$ packet of redundant transmission information, then the dummy information judgment unit 190 knows that the transmission terminal 100 has transmitted the $i^{th}$ packet of redundant transmission information.

On the other hand, when the dummy information judgment unit 190 is not notified by the transmission unit 170 that the $k^{th}$ packet of redundant transmission information has been transmitted, then the dummy information judgment unit 190 knows that the transmission terminal 100 has not transmitted the $k^{th}$ packet of redundant transmission information.

When the information that the dummy information judgment unit 190 has received from the reception unit 180 included a data format of the $k^{th}$ packet of redundant information, then the dummy information judgment unit 190 judges whether or not the $k^{th}$ packet of redundant transmission information is dummy information depending on whether or not the transmission terminal 10 has transmitted that information.

The dummy information judgment unit 190 outputs, to the redundant transmission information generation unit 140 and the delivery management unit 150, the sequence number k of the redundant transmission information that it has judged to be dummy information.

The transmission unit 170 operates in basically the same manner as the transmission unit 170 of embodiment 1 but it also notifies the dummy information judgment unit 190 that it has transmitted the $i^{th}$ packet of redundant transmission information.

The reception unit 180 operates in basically the same manner as the reception unit 180 of embodiment 1 but it also outputs, to the dummy information judgment unit 190, information in which an identifier of the transmission terminal 100 itself is set as a transmission source address.

The dummy information judgment unit 190 can be configured by hardware such as a circuit device that realizes the function of that unit or can be configured by a processing unit such as a CPU or a microcomputer and software that realizes that function.

The configuration of the transmission terminal 100 has been described above.

Next the configuration of the reception terminal 200 will be described.

Figure 15:
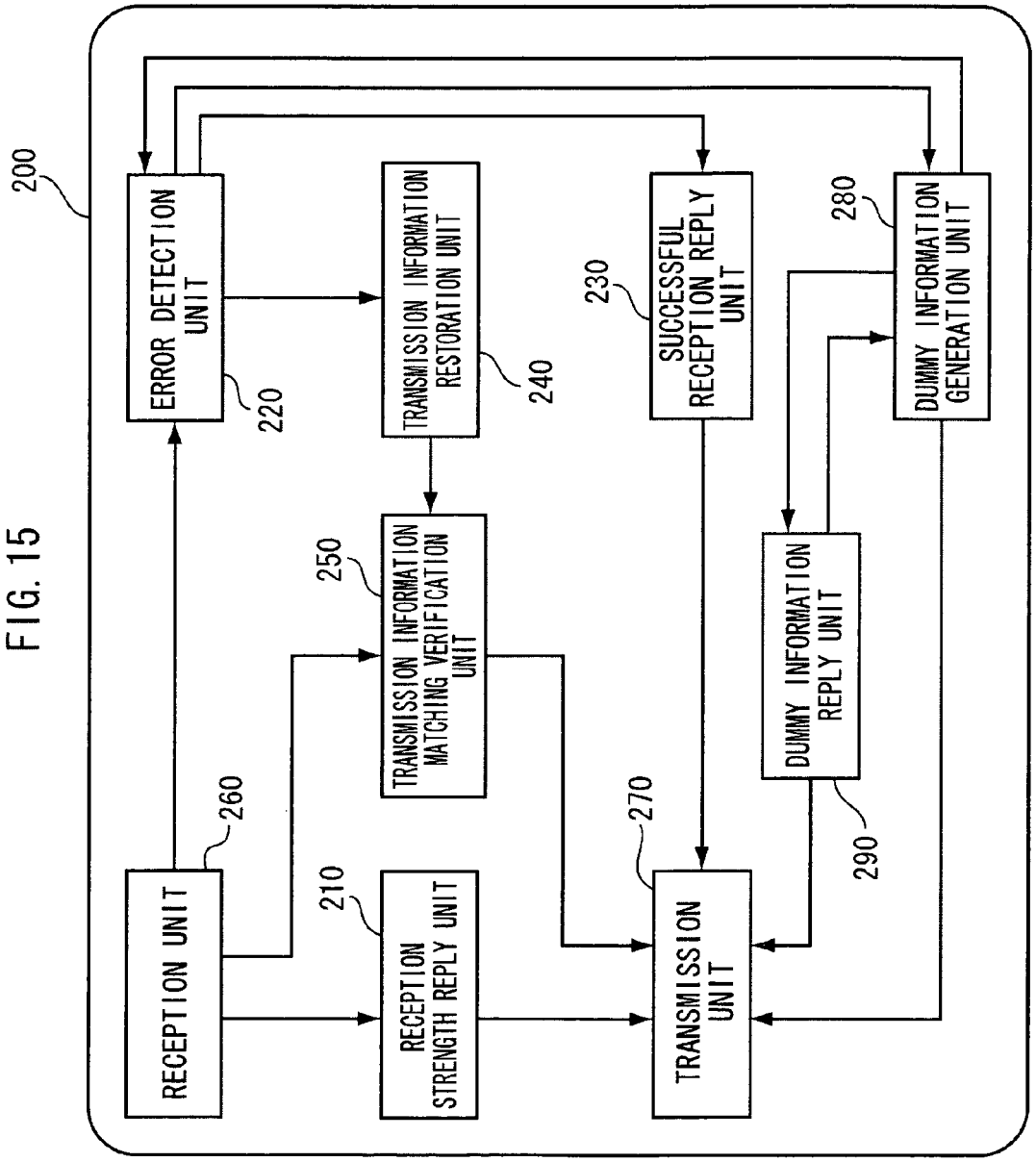
FIG. 15 is a functional block diagram of the reception terminal 200 pertaining to embodiment 3.

FIG. 15 is a functional block diagram of the reception terminal 200 pertaining to embodiment 3.

The reception terminal 200 is, in addition to the configuration that was described in FIG. 1 of embodiment 1, equipped with a dummy information generation unit 280 and a dummy information replying unit 290.

Below, only the error detection unit 220, the dummy information generation unit 280, the dummy information replying unit 290 and the transmission unit 270, whose operations differ from those in the internal configuration of the reception terminal 200 described in embodiment 1, will be described.

The error detection unit 220 operates in basically the same manner as the error detection unit 220 of embodiment 1 but differs in the following respect.

When the error detection unit 220 receives a dummy information sequence number k from the dummy information generation unit 280, then the error detection unit 220 abandons error detection processing relating to the redundant transmission information that has that sequence number k.

Further, the error detection unit 220 outputs a sequence number i to the dummy information generation unit 280 when there are no bit errors in the $i^{th}$ packet of redundant information that it has received.

The dummy information generation unit 280 regularly or irregularly generates redundant transmission information that becomes dummy information.

When the dummy information generation unit 280 receives the sequence number i of redundant information that it has received without bit errors from the error detection unit 220, then the dummy information generation unit 280 irregularly generates the $k^{th}$ ($=i+1$)$^{th}$ packet of redundant transmission information that becomes dummy information.

Further, when the dummy information generation unit 280 receives the sequence number k from the dummy information replying unit 290, then the dummy information generation unit 280 generates the $k^{th}$ packet of redundant transmission information that becomes dummy information.

The configuration of the redundant transmission information is as shown in FIG. 2.

The dummy information generation unit 280 outputs the $k^{th}$ packet of dummy redundant transmission information that it has generated to the transmission unit 270 and the dummy information replying unit 290.

When the dummy information replying unit 290 receives the sequence number k from the dummy information generation unit 280, then the dummy information replying unit 290 regularly or irregularly determines whether to redo delivery of the $k^{th}$ packet of redundant transmission information that becomes a dummy or reply with a dummy successful reception reply message with respect to the $k^{th}$ packet of redundant transmission information.

When the dummy information replying unit 290 redoes delivery of the $k^{th}$ packet of redundant transmission information, the dummy information replying unit 290 outputs the sequence number k to the dummy information generation unit 280 after the elapse of the timeout time that has been prescribed by the delivery management unit 150 of the transmission terminal 100.

On the other hand, when the dummy information replying unit 290 is replies with a dummy successful reception reply message with respect to the $k^{th}$ packet of redundant transmission information, then the dummy information replying unit 290 outputs a dummy successful reception reply message to the transmission unit 270.

The transmission unit 270 operates in basically the same manner as the transmission unit 270 of embodiment 1 but differs in the following respect.

When the transmission unit 270 receives dummy redundant transmission information from the dummy information generation unit 280, then the transmission unit 270 sets the transmission destination in an identifier of the reception terminal 200 itself, sets the transmission source in the identifier of the transmission terminal 100, and delivers the dummy redundant transmission information to the network.

Further, the transmission unit 270 transmits the dummy successful reception reply message that it has received from the dummy information replying unit 290 to the transmission terminal 100.

The dummy information generation unit 280 and the dummy information replying unit 290 can be configured by hardware such as a circuit device that realizes the functions of these units or can be configured by a processing unit such as a CPU or a microcomputer and software that realizes those functions.

The configuration of the reception terminal 200 has been described above.

Next, the operation of the information distribution system will be described.

Figure 16:
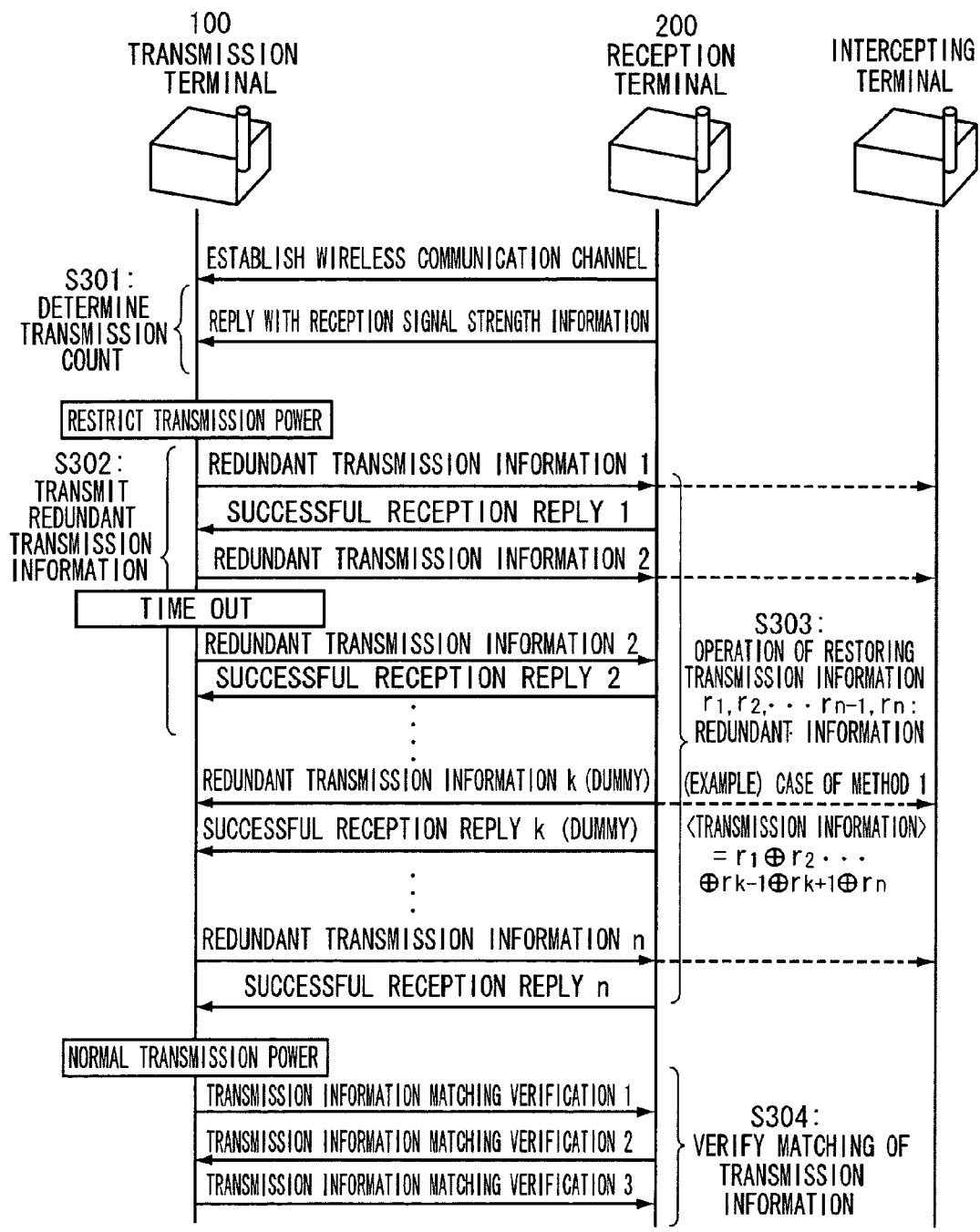
FIG. 16 is a communication sequence diagram of the information distribution system pertaining to embodiment 3.

FIG. 16 is a communication sequence diagram of the information distribution system pertaining to embodiment 3. Below, each of the steps in FIG 16 will be described.
(S301: Set the Transmission Count)
(1) This is basically the same operation as (S101: Set the Transmission Count) of embodiment 1.
(S302: Transmit the Redundant Transmission Information)
(1) The operation is basically the same as (S102: Transmit the Redundant Transmission Information) of embodiment 1, but the information distribution system also does the following operation.
(2) When the dummy information generation unit 280 of the reception terminal 200 is notified that reception of the $i^{th}$ packet of redundant transmission information was successful, then the dummy information generation unit 280 irregularly generates the $k^{th}$ ($=i+1$)$^{th}$ dummy redundant transmission information. The transmission unit 270 sets the transmission destination in the identifier of the reception terminal 200 itself, sets the transmission source in the identifier of the transmission terminal 100, and transmits the dummy redundant transmission information to the network.
(3) When the dummy information judgment unit 190 of the transmission terminal 100 receives the $k^{th}$ packet of redundant transmission information that it did not receive from the transmission unit 170 (that it itself did not transmit), then the dummy information judgment unit 190 judges the $k^{th}$ packet of redundant transmission information to be dummy information and notifies the redundant transmission information generation unit 140 and the delivery management unit 150 of the sequence number k.

When the redundant transmission information generation unit 140 receives the sequence number k that has been judged to be dummy information from the dummy information judgment unit 190, then the redundant transmission information generation unit 140 does not output the $k^{th}$ packet of redundant transmission information to the transmission unit 170.
(4) The dummy information replying unit 290 of the reception terminal 200 regularly or irregularly outputs the sequence number k to the dummy information generation unit 280 in order to pretend that it has failed to receive the $k^{th}$ packet of redundant transmission information that becomes a dummy and redoes delivery of the dummy redundant transmission information.

Or, the dummy information replying unit 290 transmits, to the network via the transmission unit 270, a dummy successful reception reply message with respect to the $k^{th}$ packet of redundant transmission information in order to pretend that it has successfully received the $k^{th}$ packet of redundant transmission information that becomes a dummy.
(5) When the delivery management unit 150 of the transmission terminal 100 receives the dummy successful reception reply message with respect to the $k^{th}$ packet of redundant transmission information that becomes a dummy, then the delivery management unit 150 judges that dummy processing of the $k^{th}$ packet of redundant transmission information has ended and outputs, to the redundant transmission information generation unit 140, a request for the redundant transmission information generation unit 140 to transmit the $k+1^{th}$ packet of redundant transmission information.
(S303: Restore the Transmission Information)
(1) This is basically the same operation as (S103: Restore the Transmission Information) of embodiment 1.
(S304: Verify Matching of the Transmission Information)
(1) This is basically the same operation as (S104: Verify Matching of the Transmission Information) of embodiment 1.

As described above, in embodiment 3, the reception terminal 200 pretends to be the transmission terminal 100 and transmits dummy redundant transmission information.

Thus, this makes it difficult for an attacker to identify the transmission information.

An attacker does not know how many packets of information of the packets of redundant information that have been sent n times are being utilized as dummy redundant information.

On the other hand, the transmission terminal 100 can itself judge that it is not transmission redundant transmission information, so the transmission terminal 100 can know of the existence of dummy redundant transmission information.

Further, the reception terminal 200 also pretends that it is the transmission terminal 100 and transmits dummy redundant transmission information, so the reception terminal 200 can know of the existence of dummy redundant transmission information.

Thus, both the transmission terminal 100 and the reception terminal 200 can judge which packets of information should be used for transmission information restoration operation among the packets of information that have been sent n times.

For example, it will be assumed that the redundant information included in the redundant transmission information is x bits and that bit error in the redundant information of the intercepting terminal in the preferable situation of pattern (1) in FIG. 8 is only 1 bit.

In this case, in the method of generating the redundant transmission information by the EXOR operation shown in FIG. 3, when the intercepting terminal fails to receive the redundant transmission information a times, then the number of all possible patterns that are verified by the intercepting terminal to identify the correct transmission information from the reconstructed incomplete transmission information including bit errors can be denoted as $_xC_1 + _xC_2 + \ldots _xC_{ea}$, where $ea \leq x$.

When dummy information is included in the redundant transmission information, an attacker cannot identify which packets of information of the packets of redundant information it has received are being utilized for restoration of the transmission information.

It will be assumed that n represents the transmission count, that h represents the number of packets of dummy redundant information and that a' represents the number of times that the intercepting terminal fails to receive the redundant transmission information.

At this time, in order for the intercepting terminal to identify the transmission information, the number of all possible patterns of the correct transmission information can be $(_xC_1 + _xC_2 + \ldots _xC_{ea'})$ with respect to different combinations of redundant information as $_nC_{n-h}$.

Further, even in the case of the redundant transmission information generating method that combines the EXOR operation and the scrambling function shown in FIG. 4 and FIG. 5, the number of all possible patterns of the correct transmission information can similarly be $_xC_e^{a'}$ with respect to different combinations of redundant information as $_nC_{n-h}$.

In embodiment 3, there has been described a configuration where the functional units pertaining to the dummy information have been added to the configuration of embodiment 1, but the same effects can also be exhibited when the functional units pertaining to the dummy information are added to the configuration of embodiment 2.

As described above, according to embodiment 3, by hiding, from the intercepting terminal, which packets of information of the packets of information that have been sent n times the intercepting terminal should utilize for transmission information restoration operation, this can make it difficult for the intercepting terminal to identify the transmission information.

Embodiment 4

In embodiments 1 to 3, a case has been described where there was one transmission terminal 100, but the technique of the present invention can also be applied to a case where there are a plurality of the transmission terminals 100.

In this case, it suffices as long as a communication terminal that wants to transmit information securely to the reception terminal 200 can securely share with each of the transmission terminals 100 the transmission information that the plural transmission terminals 100 transmit.

However, as in the present invention, a judgment method that the transmission terminals 100 are legitimate is separately needed. For example, a technique of trusting that a transmission source terminal of information received at a timing when a user presses down a button is a legitimate transmission terminal 100 is conceivable.

In embodiments 1 to 3, a case has been described where there was one reception terminal 200, but the technique of the present invention can also be applied to a case where there are a plurality of the reception terminals 200.

In this case, it suffices to configure the information distribution system such that the transmission terminal 100 delivers the next packet of redundant transmission information only when all of the plural reception terminals 200 have replied with a successful reception reply message.

However, a judgment method that the reception terminals 200 are legitimate is separately needed.

For example, a technique of trusting that a transmission source terminal of information received at a timing when a user presses down a button is a legitimate reception terminal 200 is conceivable.

In embodiments 1 to 3, an example has been described where the bit length of the information that the transmission terminal 100 intends to share with the reception terminal 200 and the bit length of the redundant information included in each packet of redundant transmission information are the same, but the invention is not limited to this.

For example, when the transmission terminal 100 intends to share 128 bits of information with the reception terminal 200, the transmission terminal 100 can transmit 256 bits of redundant information several times, and share 256 bits of information. Thereafter, the transmission terminal 100 and the reception terminal 200 utilize a 128-bit output compression function and share a 128 bits of information.

In embodiment 3, an example has been described where the reception terminal 200 transmits a dummy successful reception reply message with respect to dummy redundant transmission information, but the invention is not limited to this.

For example, as in the judgment method of judging dummy redundant transmission information, the transmission terminal 100 may disguise itself as the reception terminal 200, transmit a dummy successful reception reply message, and judge that the reception terminal 200 has received the dummy successful reception reply message.

Embodiment 5

In embodiments 1 to 4, the transmission terminal 100 and the reception terminal 200 have been described as being respectively equipped with a transmission unit and a reception unit.

Of these transmission units and reception units, interface portions that actually perform communication, such as, for example, antenna portions when performing wireless communication, may also be configured separately from the transmission terminal 100 and the reception terminal 200.

In this case, the transmission terminal 100 and the reception terminal 200 transmit information to and receive information from the other terminal via the interface portions by transmission and reception information between the interface portions.

Further, the transmission information may also be configured such that each of the functional units relating to the transmission information, such as the transmission information management unit 130, the redundant transmission information generation unit 140 and the delivery management unit 150, generates the transmission information itself, or may be configured such that any of these functional units receives information received from another communication terminal or the like and transmits the information to the reception terminal 200 as the transmission information.

In the following embodiments, a system is proposed which shares secret information securely on the assumption that the bit error rate of a communication channel between a transmission terminal or reception terminal and a communication terminal device (an intercepting terminal) of an illegal third party is larger than the bit error rate of a communication channel between a communication terminal device (a transmission terminal) that delivers information and a communication terminal device (a reception terminal) that receives the information. For instance, supposing a case where an attacker launches attacks on a home wireless network, it is reasonable to think that the attacker is present in a nearby house or outside the home because of the feasibility of attacks. When a transmission terminal delivers shared information to a nearby reception terminal in a home, there is a high probability that the bit error rate of the communication channel between the transmission terminal and an intercepting terminal generally having various obstacles such as walls interposed between them is greater than the bit error rate of the communication channel between the transmission terminal and the reception terminal. Therefore, in the following embodiments, it is possible to increase the probability that only the reception terminal can share the correct secret information with the transmission information, for example, in the above-described situation where the bit error rate of the reception terminal is lower than that of the intercepting terminal.

Embodiment 6

In embodiment 6, supposing a situation where the bit error rate of a communication channel between a transmission terminal and a reception terminal is sufficiently lower than a delivery information amount, the transmission terminal transmits a large amount of information to the reception terminal to thereby decrease the probability that an intercepting terminal having a high bit error rate acquires the correct information. Moreover, a judgment as to whether or not the reception terminal has correctly received the information that the transmission information has transmitted is made on the basis of a judgment as to whether or not a bit error is included in a reception reply that the reception terminal sends to the transmission terminal.

Figure 17:
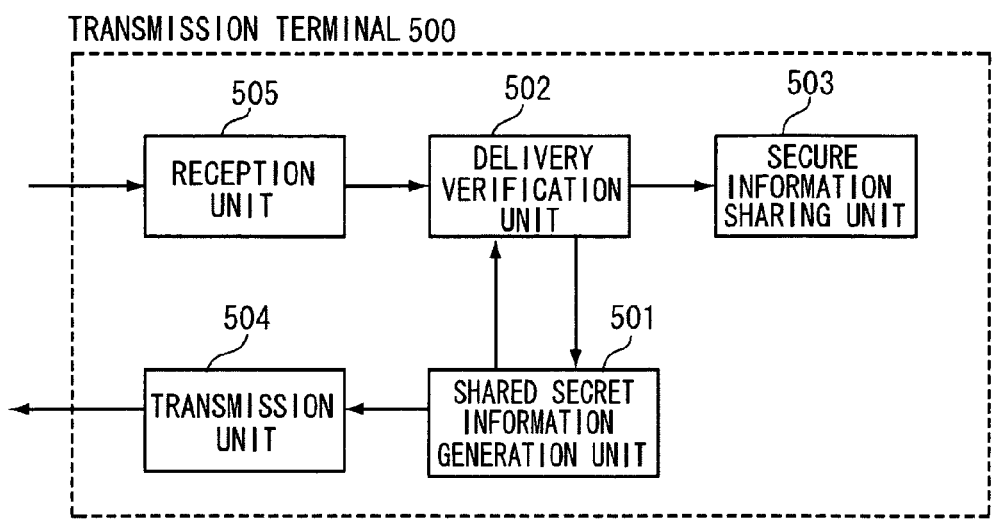
FIG. 17 is a block diagram showing the internal configuration of a transmission terminal 500 pertaining to embodiment 6.

FIG. 17 is a block diagram showing the internal configuration of a transmission terminal 500 pertaining to embodiment 6.

In FIG. 17, the transmission terminal 500 is equipped with a shared secret information generation unit 501, a delivery verification unit 502, a secret information sharing unit 503, a transmission unit 504, and a reception unit 505.

Figure 18:
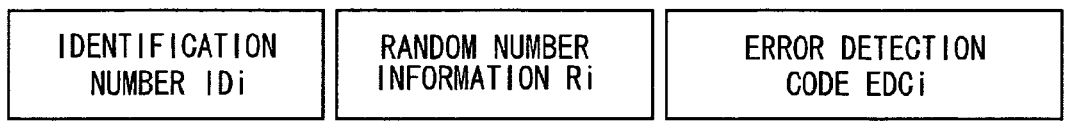
FIG. 18 is a diagram showing the configuration of shared secret information.

The shared secret information generation unit 501 generates more than one packets of shared secret information. The configuration example of the shared secret information is shown in FIG. 18. The shared secret information in FIG. 18 is configured by: random number information $R_i$; and an error detection code $EDC_i$ ($i \geq 1$). The shared secret information, as well as the redundant transmission information as mentioned in above embodiments, may include an identification number $ID_i$ for identifying the shared secret information, such as, for example, a sequence number. As the error detection code, for example, CRC (Cyclic Redundancy Check) can be used, but the error detection code is not limited to this. For example, an error correction code (ECC) with an error detection function may be used.

The random number information included in the shared secret information is not limited to the configuration where it is generated by the shared secret information generation unit 501. The random number information may be received from other configuration portions or other communication terminals. The shared secret information generation unit 501 transmits the generated or received shared secret information to the delivery verification unit 502 or the transmission unit 504. Moreover, the shared secret information generation unit 501 transmits the next packet of shared secret information to the delivery verification unit 502 and the transmission unit 504 upon receiving a transmission request message from the delivery verification unit 502. Here, the next packet of shared secret information basically refers to the new shared secret information that the shared secret information generation unit 501 generates, or that is newly received, but the shared secret information that has previously been transmitted to the delivery verification unit 502 and the transmission unit 504 may be transmitted again.

The delivery verification unit 502 verifies whether or not the shared secret information that it itself transmitted was able to be shared with other communication terminals. The delivery verification unit 502 also verifies whether or not a reception reply with respect to the shared secret information that it has received from the shared secret information generation unit 501 is transmitted from the reception unit 505 and whether or not a bit error is included in the reception reply. When a bit error is included in the reception reply, the delivery verification unit 502 judges that the shared secret information was unable to be shared and abandons the shared secret information. On the other hand, when a bit error is not included in the reception reply, the delivery verification unit 502 judges that the shared secret information was able to be shared and transmits the shared secret information to the secret information sharing unit 503. The delivery verification unit 502 transmits a transmission request message to the shared secret information generation unit 501 in order to request transmission of the next packet of shared secret information, on the condition that it was able to judge whether or not the shared secret information was able to be shared. Here, a plurality of transmission request messages may be transmitted to the shared secret information generation unit 501 to request transmission of a plurality of packets of shared secret information before making the judgment as to whether or not each of the respective packets of shared secret information was able to be shared. However, in such a case, it is preferable to configure the reception reply so as to include the identification number of the shared secret information, for example, so that it is possible to identify which packet of shared secret information the reception reply is transmitted for.

The secret information sharing unit 503 receives, from the delivery verification unit 502, the shared secret information that has been judged to be able to be shared. The secret information sharing unit 503 generates secret information from the shared secret information that it has received from the delivery verification unit 502. The generation method is not particularly limited, but the secret information may be generated as a result of performing an exclusive OR operation on all the received packets of shared secret information or may be generated as a result of applying a hash function to all the packets of shared secret information.

The transmission unit 504 delivers the secret information generated from the shared secret information to the reception terminal 506 (described later).

The reception unit 505 receives the reception reply that the reception terminal 506 has transmitted and transmits the reception reply to the delivery verification unit 502.

Figure 19:
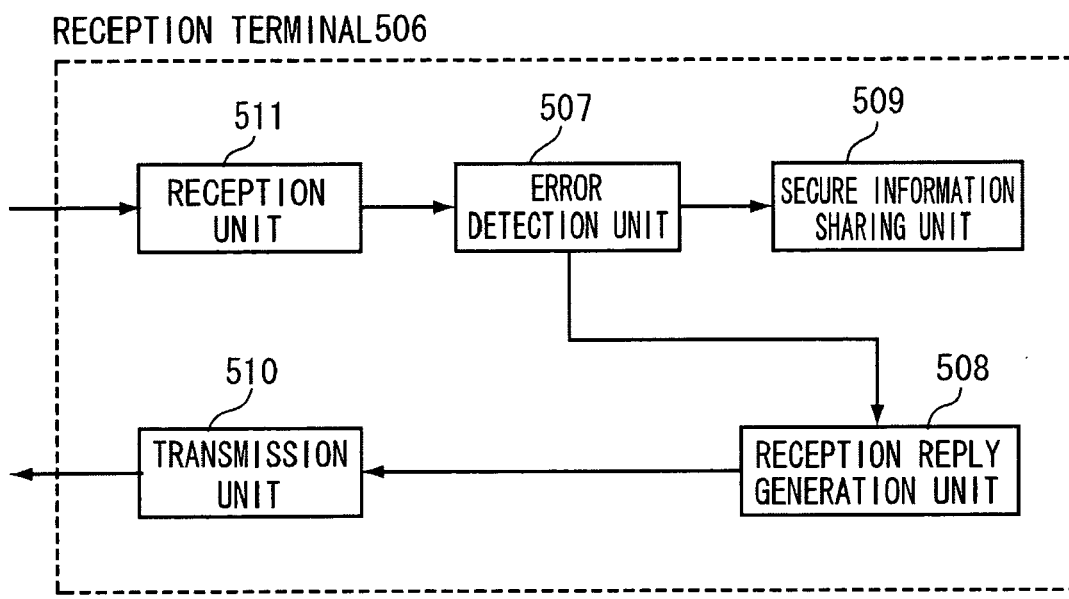
FIG. 19 is a block diagram showing the internal configuration of the reception terminal 506 pertaining to embodiment 6.

FIG. 19 is a block diagram showing the internal configuration of the reception terminal 506 pertaining to embodiment 6.

In FIG. 19, the reception terminal 506 is equipped with an error detection unit 507, a reception reply generation unit 508, a secret information sharing unit 509, a transmission unit 510, and a reception unit 511.

The error detection unit 507 detects whether or not a bit error is included in the shared secret information upon receiving, from the reception unit 511, the shared secret information that the transmission terminal 500 has transmitted. When a bit error is detected in the received shared secret information, the error detection unit 507 judges that the shared secret information was unable to be shared with the transmission terminal 500 and transmits a message of abandonment to the reception reply generation unit 508. When a bit error is not detected in the received shared secret information, the error detection unit 507 judges that the shared secret information was able to be shared with the transmission terminal 500, transmits a message of sharing to the reception reply generation unit 508, and transmits the shared secret information to the secret information sharing unit 509.

Figure 20:
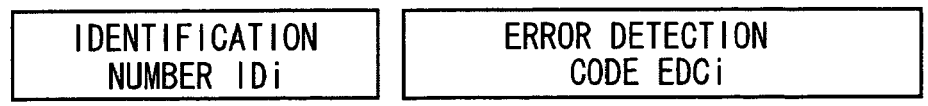
FIG. 20 is a diagram showing the configuration of a reception reply.

The reception reply generation unit 508 generates a reception reply for notifying the transmission terminal 500 of whether or not the shared secret information that the transmission terminal 500 has transmitted was able to be shared. The configuration example of the reception reply is shown in FIG. 20. The reception reply in FIG. 20 is configured to include at least an error detection code $EDC_i$ ($i \geq 1$). The reception reply may contain an identification number for identifying shared secret information, such as, for example, a sequence number that is added to that shared secret information or may contain data that does not have meaning for the reception reply, such as a random number information. As the error detection code, for example, CRC (Cyclic Redundancy Check) can be used, but the error detection code is not limited to this. For example, an error correction code (ECC) with an error detection function may be used. The reception reply generation unit 508 generates a reception reply and transmits the generated reception reply to the transmission unit 510 upon receiving the message of sharing from the error detection unit 507. On the other hand, the reception reply generation unit 508 generates a reception reply including a bit error and transmits the generated reception reply to the transmission unit 510 upon receiving the message of abandonment. Here, the reception reply including a bit error refers to a reception reply in which the bits are reversed in such a form that a bit error is detected in the error detection code. The reception reply generation unit 508 transmits the generated reception reply to the transmission unit 510.

The secret information sharing unit 509 receives, from the error detection unit 507, the shared secret information that has been judged to be able to be shared. The secret information sharing unit 509 generates secret information from the shared secret information that has been received from the delivery verification unit 502. The generation method is not particularly limited, but it is necessary that the generation method used is the same as the generation method used in the secret information sharing unit 503 of the transmission terminal 500.

The transmission unit 510 replies to the transmission terminal 500 with the reception reply that it has received from the reception reply generation unit 508.

The reception unit 511 receives the shared secret information that the transmission terminal 500 has transmitted and transmits the shared secret information to the error detection unit 507.

Figure 21:
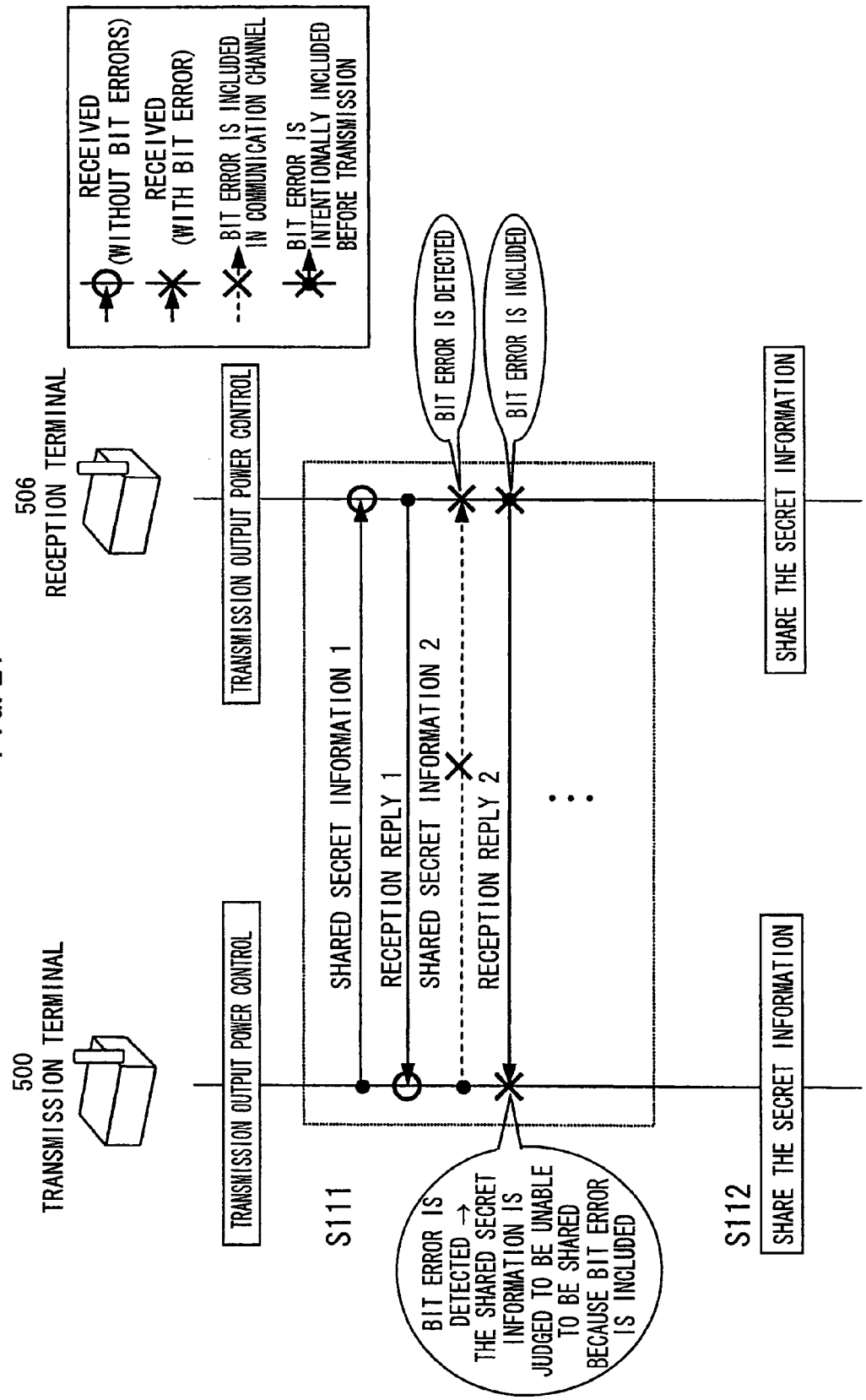
FIGS. 21 and 22 are diagrams showing the operation of a secret information sharing system pertaining to embodiment 6.

Next, the operation of a secret information sharing system pertaining to embodiment 6 will be described with reference to FIG. 21. Here, the operation of the secret information sharing system pertaining to embodiment 6 is mainly composed of two steps of operations (S111 and S112).

(S111: Deliver the Shared Secret Information)

(1) The shared secret information generation unit 501 of the transmission terminal 500 generates or receives shared secret information and transmits the shared secret information to the delivery verification unit 502 and the transmission unit 504.

(2) The shared secret information is transmitted to the reception terminal 506 via the transmission unit 504.

(3) The error detection unit 507 of the reception terminal 506 receives the shared secret information that the transmission terminal 500 has transmitted via the reception unit 511 and verifies whether or not a bit error is included in the shared secret information. When a bit error is not included, the error detection unit 507 judges that the received shared secret information is shared secret information that was able to be shared with the transmission terminal 500, transmits the shared secret information that is judged to be able to be shared to the secret information sharing unit 509 and transmits a message of sharing to the reception reply generation unit 508. On the other hand, when a bit error is included, the error detection unit 507 judges that the received shared secret information is shared secret information that was unable to be shared with the transmission terminal 500 and transmits a message of abandonment to the reception reply generation unit 508.

(4) The reception reply generation unit 508 of the reception terminal 506 generates a reception reply and replies to the transmission terminal 500 with the reception reply via the transmission unit 510 upon receiving the message of sharing or abandonment from the error detection unit 507. Here, when the message of abandonment is received from the error detection unit 507, a bit error is included in the reception reply.

(5) The delivery verification unit 502 of the transmission terminal 500 receives, via the reception unit 505, the reception reply that the reception terminal 506 has replied with respect to the shared secret information that it itself has transmitted and verifies whether or not a bit error is included in the reception reply. When a bit error is not included, the delivery verification unit 502 judges that the shared secret information that it itself has transmitted was able to be shared with the reception terminal 506 and transmits the shared secret information that has been judged to be able to be shared to the secret information sharing unit 503. On the other hand, when a bit error is included, the delivery verification unit 502 judges that the shared secret information that it itself has transmitted was unable to be shared with the reception terminal 506 and abandons the shared secret information. The delivery verification unit 502 transmits a transmission request message to the shared secret information generation unit 501 in order to request transmission of the next packet of shared secret information, on the condition that it was able to judge whether or not the shared secret information that it itself has transmitted was able to be shared with the reception terminal 506.

(6) The shared secret information generation unit 501 of the transmission terminal 500 generates or receives the next packet of shared secret information and transmits the shared secret information to the delivery verification unit 502 and the transmission unit 504 upon receiving the transmission request message from the delivery verification unit 502.

(S112: Share the Secret Information)

(1) The secret information sharing unit 503 of the transmission terminal 500 generates the secret information using more than one packets of the shared secret information that it has received from the delivery verification unit 502.

(2) The secret information sharing unit 509 of the reception terminal 506 generates the secret information using more than one packets of the shared secret information that it has received from the error detection unit 507.

As described above, in embodiment 6, the judgment as to whether or not the shared secret information that the transmission terminal 500 has transmitted is correctly delivered to the reception terminal 506 is made on the basis of the judgment as to whether a bit error is included in the reception reply that the reception terminal 506 replies to the transmission terminal 500.

Figure 22:
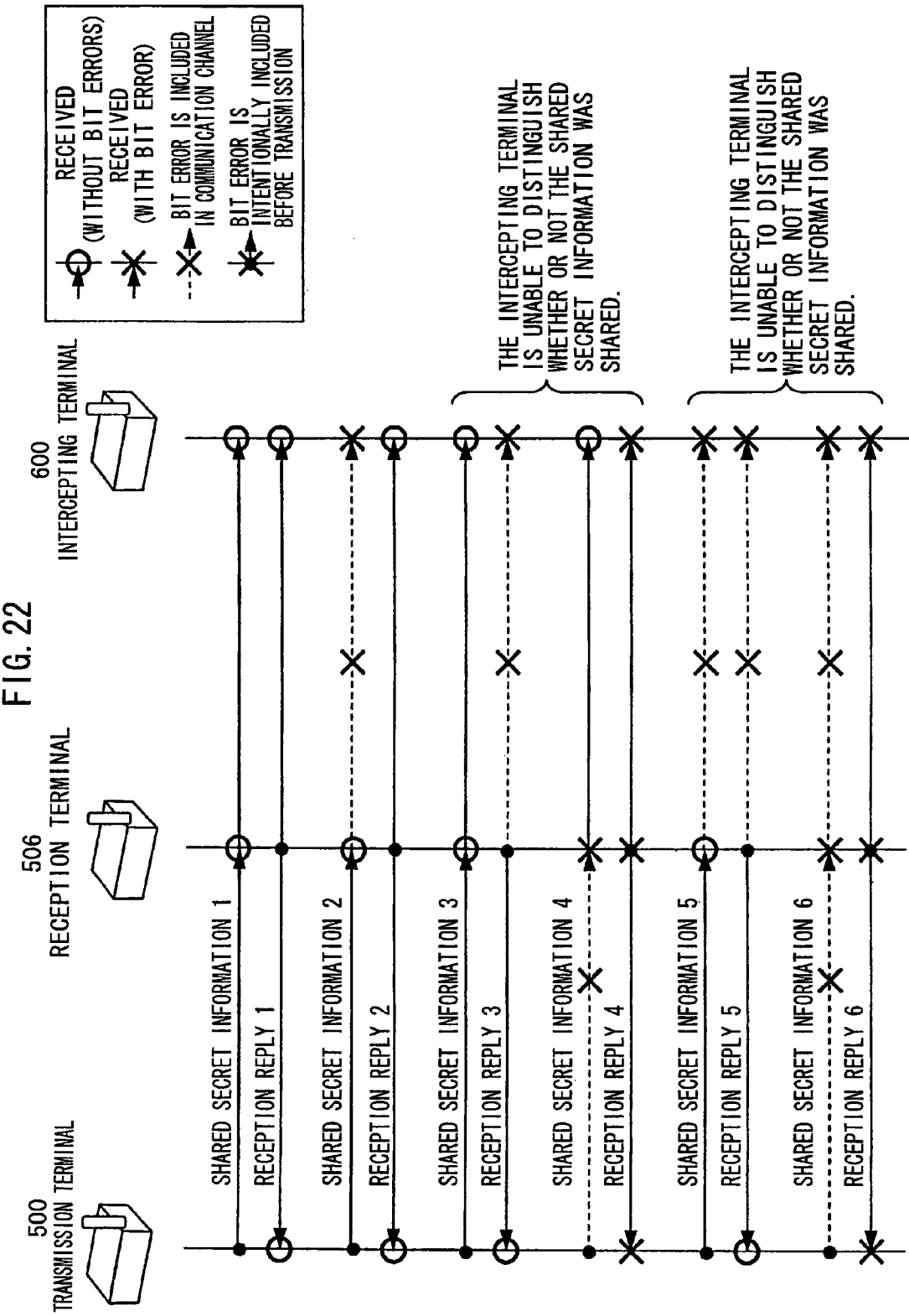

Next, embodiment 6 will be described further with reference to FIG. 22. First, when an intercepting terminal 600 was able to intercept the shared secret information and the reception reply without detection of any bit errors, it can be judged that the shared secret information is shared secret information that was able to be shared with the transmission terminal 500 and the reception terminal 506 (shared secret information 1 and reception reply 1). Next, when the intercepting terminal 600 has received the shared secret information with a bit error and intercepted the reception reply without any bit errors, it can be judged that the transmission terminal 500 and the reception terminal 506 were able to share information in which any of the bits of the shared secret information is reversed (shared secret information 2 and reception reply 2). Next, when the intercepting terminal 600 has intercepted the shared secret information without any bit errors and received the reception reply with a bit error, it is practically impossible to judge whether the bit error included in the reception reply is a bit error that the reception terminal 506 has included intentionally or a bit error that has occurred in the communication channel from the reception terminal 506 to the intercepting terminal 600, and judge whether or not the transmission terminal 500 and the reception terminal 506 were able to share the shared secret information (in other words, it is impossible to distinguish between the example of shared secret information 3 and reception reply 3 and the example of shared secret information 4 and reception reply 4). Finally, when the intercepting terminal 600 has received the shared secret information and the reception reply with a bit error, it is practically impossible to judge whether the bit error included in the reception reply is a bit error that the reception terminal 506 has included intentionally or a bit error that has occurred in the communication channel from the reception terminal 506 to the intercepting terminal 600, and judge whether or not the transmission terminal 500 and the reception terminal 506 were able to share information in which any of the bits of the shared secret information is reversed (in other words, it is impossible to distinguish between the example of shared secret information 5 and reception reply 5 and the example of shared secret information 6 and reception reply 6). However, in FIG. 22, a case is supposed where the bit error rate of the communication channel from the transmission terminal 500 to the reception terminal 506 is sufficiently low. That is to say, the possibility that a bit error is included in the shared secret information in the distribution communication channel between the transmission terminal 500 and the reception terminal 506 is taken into consideration, but the possibility that a bit error is included in the reception reply in the response communication channel (typically having an information amount much smaller than the shared secret information) from the reception terminal 500 to the transmission terminal 506 is not taken into consideration. Moreover, the possibility that a bit error is further included in the course of communication of the reception reply that the reception terminal 506 has transmitted intentionally with a bit error so eventually no bit error is detected at the receiving side is not taken into consideration.

As described above, in embodiment 6, the judgment as to whether or not the shared secret information that the transmission terminal 500 has transmitted is correctly delivered to the reception terminal 506 is made on the basis of the judgment as to whether or not a bit error is included in the reception reply that the reception terminal 506 replies to the transmission terminal 500. When a bit error is detected in the received reception reply, the intercepting terminal 600 is unable to judge whether the bit error has occurred in the communication channel or has been included intentionally by the reception terminal 506. As a result, it is practically impossible to distinguish whether or not the shared secret information corresponding to the reception reply was judged to be able to be shared by the transmission terminal 500 and the reception terminal 506. When the amount of such shared secret information that is difficult to distinguish increases as the amount of the delivered shared secret information increases, it becomes difficult for the intercepting terminal 600 to identify all shared secret information that the transmission terminal 500 and the reception terminal 506 are sharing by a brute force attack. As a result, it is possible to make it difficult to identify the secret information that the transmission terminal 500 and the reception terminal 506 are sharing.

Embodiment 7

A block diagram showing the internal configuration of a transmission terminal pertaining to embodiment 7 is shown in FIG. 17 as in embodiment 6. Here, only the shared secret information generation unit and the delivery verification unit, whose operations differ from those described in embodiment 6, will be described.

The shared secret information generation unit 501 basically has the same operation as that of the shared secret information generation unit 501 of embodiment 6, but in the present embodiment, the shared secret information needs to contain an identification number for identifying the shared secret information, such as, for example, a sequence number. Moreover, the shared secret information that the shared secret information generation unit 501 generates may include a bit error at any chance. Here, the shared secret information including a bit error refers to shared secret information in which the bits are reversed in such a form that a bit error is detected in the error detection code. When a bit error is included in the shared secret information, the shared secret information generation unit 501 transmits a message of abandonment together with the shared secret information to the delivery verification unit 502 and transmits shared secret information to the transmission unit 504. Moreover, when the shared secret information generation unit 501 has received the identification number of the shared secret information together with a transmission request message from the delivery verification unit 502, the shared secret information generation unit 501 may retransmit, to the delivery verification unit 502 and the transmission unit 504, the shared secret information having the identification number that has previously been transmitted to the delivery verification unit 502 and the transmission unit 504 or may transmit shared secret information having an identification number that is newly generated or acquired.

The delivery verification unit 502 basically has the same operation as that of the delivery verification unit 502 of embodiment 6, but only the shared secret information may be received from the shared secret information generation unit 501 and a message of abandonment may be transmitted together with the shared secret information. When the delivery verification unit 502 has received only the shared secret information, the delivery verification unit is able to verify that a bit error is not included in the reception reply that it receives from the reception unit 505, so it judges that the shared secret information was able to be shared. On the other hand, when a bit error is included, the delivery verification unit 502 judges that the shared secret information was unable to be shared and transmits the identification number included in the shared secret information together with a transmission request message to the shared secret information generation unit 501. This is to request the shared secret information generation unit 501 to retransmit, or newly transmit, the shared secret information having the identification number. When the delivery verification unit 502 has received a message of abandonment together with shared secret information, the delivery verification unit 502 judges that the shared secret information was unable to be shared with the reception terminal 506 regardless of whether or not a bit error is included in the reception reply that it has received from the reception unit 505.

The block diagram showing the internal configuration of the reception terminal 506 of embodiment 7 is shown in FIG. 19 as in embodiment 6. Here, only the secret information sharing unit 509, whose operation differs from that described in embodiment 6, will be described.

The secret information sharing unit 509 basically has the same operation as that of the secret information sharing unit 509 of embodiment 6, but in the present embodiment, the secret information sharing unit 509 verifies whether or not the identification number included in the shared secret information is identical to the identification number of the shared secret information that has already been received by the error detection unit 507, upon receiving the shared secret information that was judged to be able to be shared. When the shared secret information having the identical identification number is found, the secret information sharing unit 509 regards the shared secret information that is newly received as the shared secret information that was able to be shared with the transmission terminal 500. This is to eliminate a problem in which, when a second communication terminal judges that it was able to share the shared secret information that is transmitted by a first communication terminal to transmit a reception reply that does not contain a bit error to the first communication terminal and a bit error occurs in the course of the communication, then, the first communication terminal judges that the shared secret information that it has transmitted was unable to be shared so a mismatch occurs in the shared information between the first communication terminal and the second communication terminal.

Figure 23:
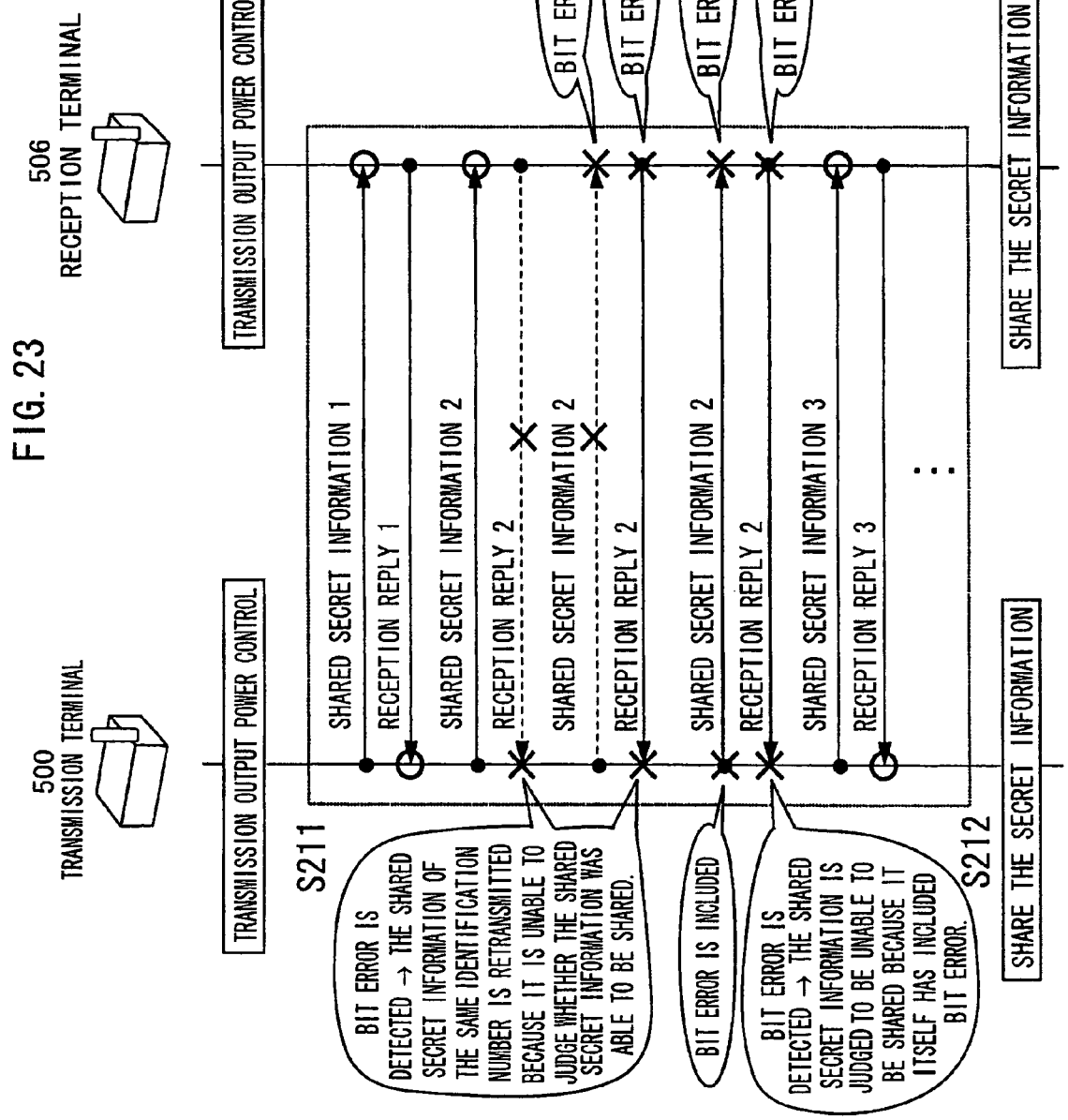
FIGS. 23-25 are diagrams showing the operation of a secret information sharing system pertaining to embodiment 7.

Next, the operation of the secret information sharing system pertaining to embodiment 7 will be described with reference to FIG. 23. Here, the operation of the secret information sharing system pertaining to embodiment 7 is mainly composed of two steps of operations (S211 and S212).

(S211: Deliver the Shared Secret Information)

(1) The shared secret information generation unit 501 of the transmission terminal 500 generates or receives shared secret information and transmits the shared secret information to the delivery verification unit 502 and the transmission unit 504. A bit error is included in the shared secret information at any chance. When a bit error is included, the shared secret information generation unit 501 transmits a message of abandonment together with the shared secret information to the delivery verification unit 502.

(2) The shared secret information is transmitted to the reception terminal 506 via the transmission unit 504.

(3) The error detection unit 507 of the reception terminal 506 receives the shared secret information that the transmission terminal 500 has transmitted via the reception unit 505 and verifies whether or not a bit error is included in the shared secret information. When a bit error is not included, the error detection unit 507 judges that the received shared secret information is shared secret information that was able to be shared with the transmission terminal 500, transmits the shared secret information that is judged to be able to be shared and an identification number thereof to the secret information sharing unit 509 and transmits a message of sharing to the reception reply generation unit 508. On the other hand, when a bit error is included, the error detection unit 507 judges that the received shared secret information is shared secret information that was unable to be shared with the transmission terminal 500 and transmits a message of abandonment to the reception reply generation unit 508.

(4) The reception reply generation unit 508 of the reception terminal 506 generates a reception reply and replies to the transmission terminal 500 with the reception reply via the transmission unit 510 upon receiving the message of sharing or abandonment from the error detection unit 507. Here, when the message of abandonment is received from the error detection unit 507, a bit error is included in the reception reply.

(5) The delivery verification unit 502 of the transmission terminal 500 receives, via the reception unit 505, the reception reply that the reception terminal 506 has replied with respect to the shared secret information that it itself has transmitted and verifies whether or not a bit error is included in the reception reply. When a bit error is not included in the reception reply with respect to the shared secret information for which it itself did not include a bit error, the delivery verification unit 502 judges that the shared secret information that it itself has transmitted was able to be shared with the reception terminal 506 and transmits the shared secret information that has been judged to be able to be shared to the secret information sharing unit 503. Moreover, the delivery verification unit 502 transmits a transmission request message to the shared secret information generation unit 501 in order to request transmission of the next packet of shared secret information. On the other hand, when a bit error is included in the reception reply with respect to the shared secret information for which it itself did not include a bit error, the delivery verification unit 502 judges that the shared secret information that it itself has transmitted was unable to be shared with the reception terminal 506, abandons the shared secret information, and transmits a transmission request message and an identification number to the shared secret information generation unit 501 in order to request transmission of shared secret information having the same identification number as the shared secret information. Finally, upon receiving a reception reply with respect to the shared secret information that it itself has included a bit error, the reception reply being received together with the message of abandonment from the shared secret information generation unit 501, the delivery verification unit 502 judges that the shared secret information that it itself has transmitted was unable to be shared with the reception terminal 506, abandons the shared secret information, and transmits a transmission request message to the shared secret information generation unit 501 in order to request transmission of the next packet of shared secret information.

(6) The shared secret information generation unit 501 of the transmission terminal 500 generates or receives the next packet of shared secret information and transmits the shared secret information to the delivery verification unit 502 and the transmission unit 504 upon receiving the transmission request message from the delivery verification unit 502. Here, when the identification number is also received together with the transmission request message, shared secret information having the identification number is prepared.

(S212: Share the Secret Information)

(1) The secret information sharing unit 503 of the transmission terminal 500 generates the secret information using more than one packets of the shared secret information that it has received from the delivery verification unit 502.

(2) The secret information sharing unit 509 of the reception terminal 506 generates the secret information using more than one packets of the shared secret information that it has received from the error detection unit 507. When the secret information sharing unit 509 has already received the shared secret information having the same identification number as the identification number that it has received together with the shared secret information, the secret information sharing unit 509 abandons the shared secret information that has already been received and judges that the shared secret information that is newly received is shared secret information that is attached to the identification number.

As described above, in addition to embodiment 6, in embodiment 7, the transmission terminal includes a bit error at any chance in the shared secret information that it itself transmits, thereby making it difficult for the intercepting terminal to identify the correct information.

Figure 24:
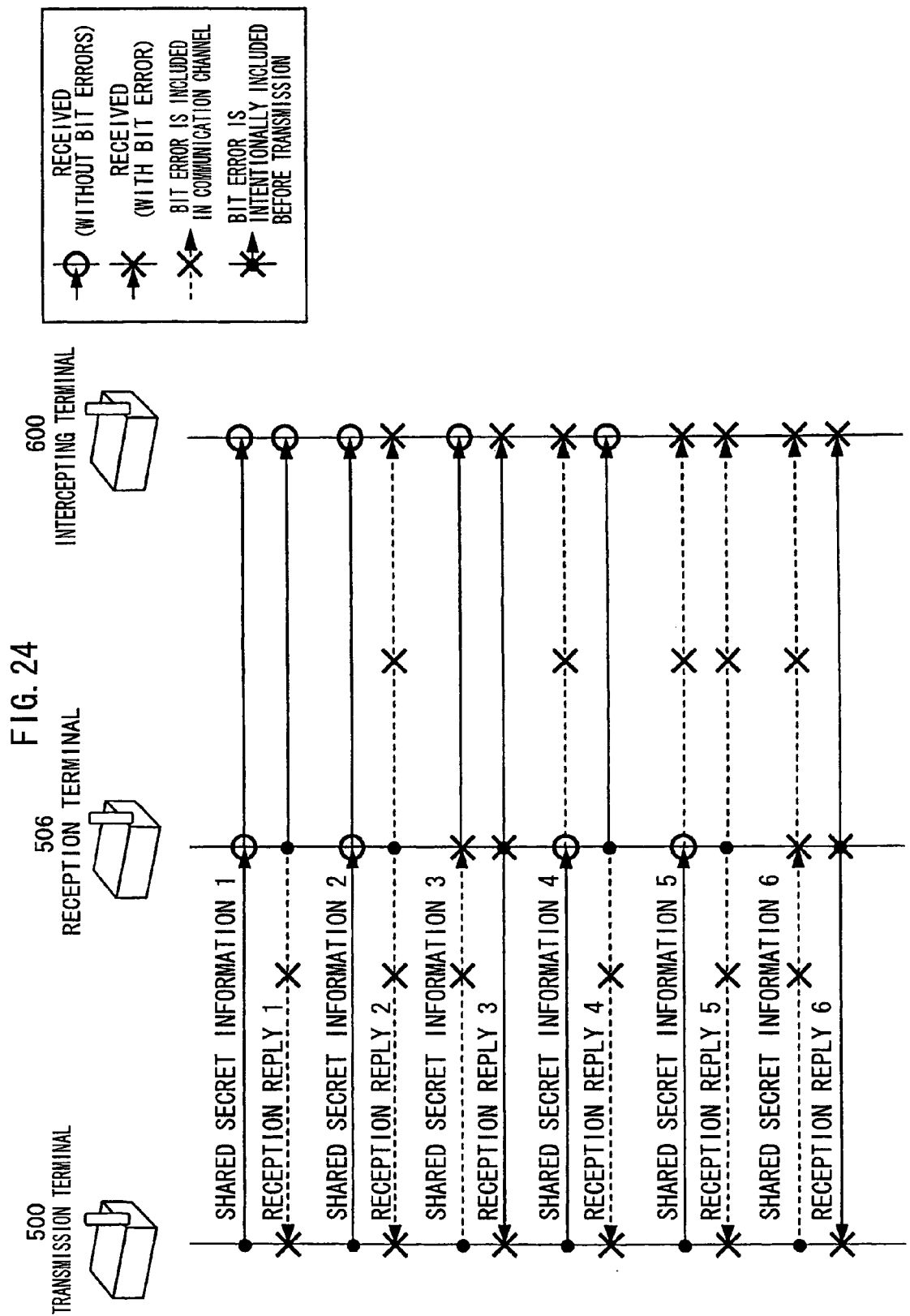
Figure 25:
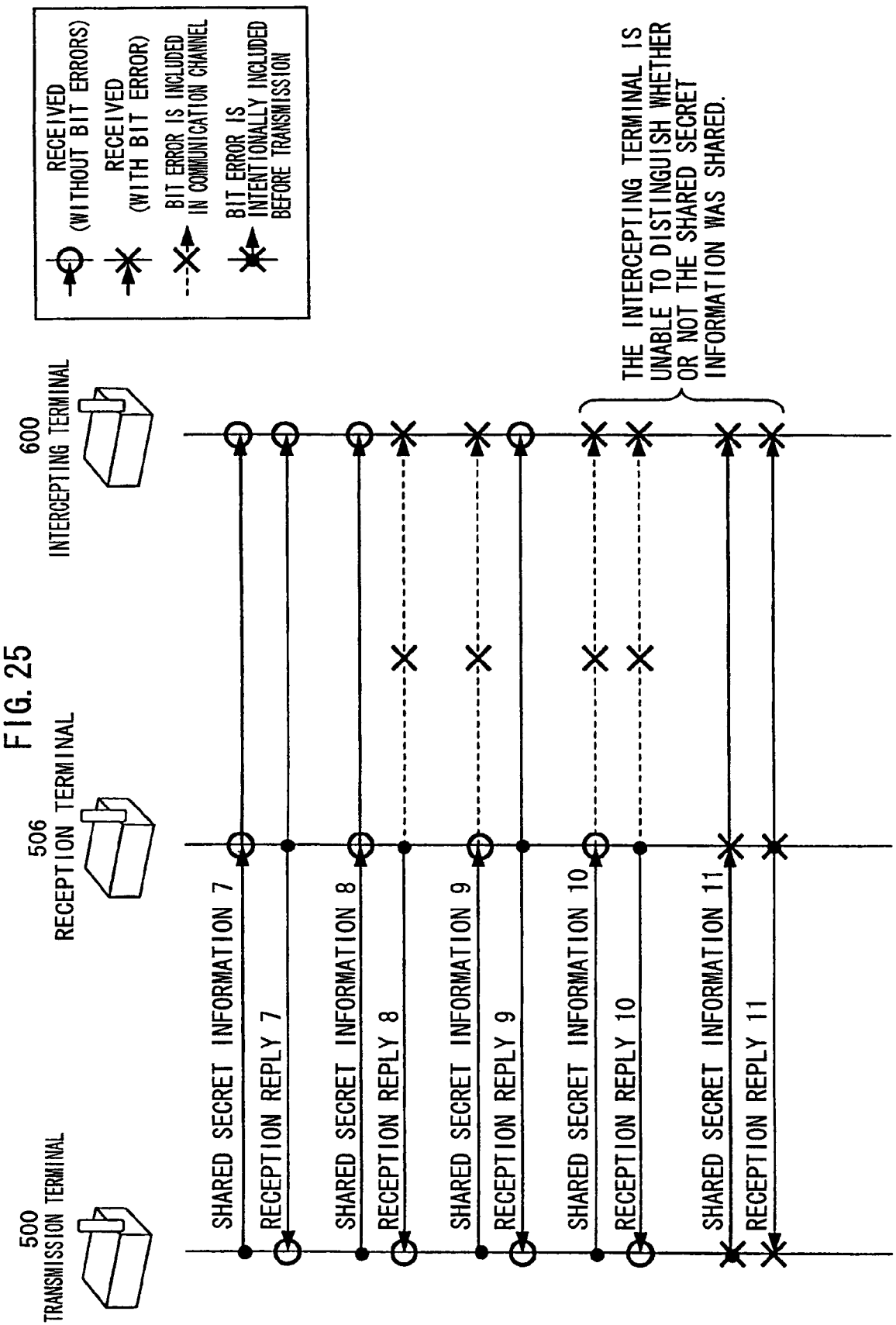

Next, embodiment 7 will be described further with reference to FIGS. 24 and 25. FIG. 24 is an example where a reception reply received from the reception terminal 506 includes a bit error in response to the shared secret information that the transmission terminal 500 has transmitted without bit errors. In the example of FIG. 24, because the transmission terminal 500, regardless of whether or not the reception terminal 506 may have correctly received the shared secret information, receives the reception reply with a bit error, the transmission terminal 500 is unable to judge whether or not the shared secret information was able to be shared with the reception terminal 506. Therefore, the transmission terminal 500 retries transmission of the shared secret information having the identification number without updating the identification number of the shared secret information. On the other hand, FIG. 25 is an example where a reception reply received from the reception terminal 506 does not include bit errors in response to the shared secret information that the transmission terminal 500 has transmitted without bit errors and where the reception terminal 506 replies a reception reply including a bit error in response to the shared secret information that the transmission terminal 506 has transmitted with a bit error. In the example of FIG. 25, because a reception reply without bit errors is replied from the reception terminal 506 in response to the shared secret information that is transmitted to the reception terminal 506 without bit errors, the transmission terminal 500 is able to judge that the shared secret information was able to be shared with the reception terminal 506. Moreover, because the transmission terminal 500 has transmitted the shared secret information with a bit error to the reception terminal 506, it can be judged that the shared secret information was not shared with the reception terminal 506 regardless of whether the transmission terminal 506 has received a reception reply without bit errors or with a bit error. Therefore, the transmission terminal 500 request transmission of the next packet of shared secret information having the updated identification number because it is able to judge whether or not the shared secret information having the identification number was able to be shared with the reception terminal 506. Here, the intercepting terminal 600 is able to identify the shared secret information that was able to be shared by the transmission terminal 500 and the reception terminal 506 by knowing whether or not the identification number was updated. However, when the intercepting terminal 600 has received both the shared secret information having a certain identification number and the reception reply with a bit error, the intercepting terminal 600 is unable to distinguish whether or not the shared secret information is the shared secret information that was judged to be able to be shared by the transmission terminal 500 and the reception terminal 506 (in other words, it is impossible to distinguish between the example of shared secret information 10 and reception reply 10 and the example of shared secret information 11 and reception reply 11 in FIG. 25). As described above, the transmission terminal 500 includes a bit error at any chance in the shared secret information that it itself transmits, and the reception terminal 506 judges whether or not a bit error will be included in the reception reply that it replies to the transmission terminal 500 on the basis of whether or not a bit error is included in the received shared secret information, whereby the intercepting terminal 600 becomes difficult to identify the shared secret information that is shared by the transmission terminal 500 and the reception terminal 506.

Embodiment 8

In embodiment 8, as in embodiment 6, a case is supposed where the bit error rate of the communication channel between the transmission terminal 500 and the reception terminal 506 is sufficiently lower than the delivery information amount. In addition to embodiment 6, in embodiment 8, the transmission terminal 500 includes a bit error at any chance in the shared secret information that it itself transmits, and the reception terminal 506 does not intentionally include a bit error at any chance in a reception reply that it itself replies even when a bit error is detected in the shared secret information that it has received, thereby making it difficult for the intercepting terminal 600 to identify the correct information.

A block diagram showing the internal configuration of a transmission terminal pertaining to embodiment 8 is shown in FIG. 17 as in embodiment 6. Here, only the shared secret information generation unit and the delivery verification unit, whose operations differ from those described in embodiment 6, will be described.

The shared secret information generation unit 501 basically has the same operation as that of the shared secret information generation unit 501 of embodiment 6, but in the present embodiment, a bit error may be included in the shared secret information at any chance. Here, the shared secret information including a bit error refers to the shared secret information in which the bits are reversed in such a form that a bit error is detected in the error detection code. When a bit error is included in the shared secret information, the shared secret information generation unit 501 transmits a message of abandonment together with the shared secret information to the delivery verification unit 502 and transmits shared secret information to the transmission unit 504.

The delivery verification unit 502 basically has the same operation as that of the delivery verification unit 502 of embodiment 6, but in the present embodiment, upon receiving a message of abandonment together with shared secret information from the shared secret information generation unit 501, the delivery verification unit 502 judges that the shared secret information was able to be shared with the reception terminal 506 regardless of whether or not a bit error is included in the reception reply that it has received from the reception unit 505.

The block diagram showing the internal configuration of the reception terminal 506 of embodiment 8 is shown in FIG. 19 as in embodiment 6. Here, only the reception reply generation unit 508, whose operation differs from that described in embodiment 6, will be described.

The reception reply generation unit 508 basically has the same operation as that of the reception reply generation unit 508 of embodiment 6, but in the present embodiment, the reception reply generation unit 508 may not include a bit error in the reception reply at any chance even when a message of abandonment is received from the error detection unit 507.

Figure 26:
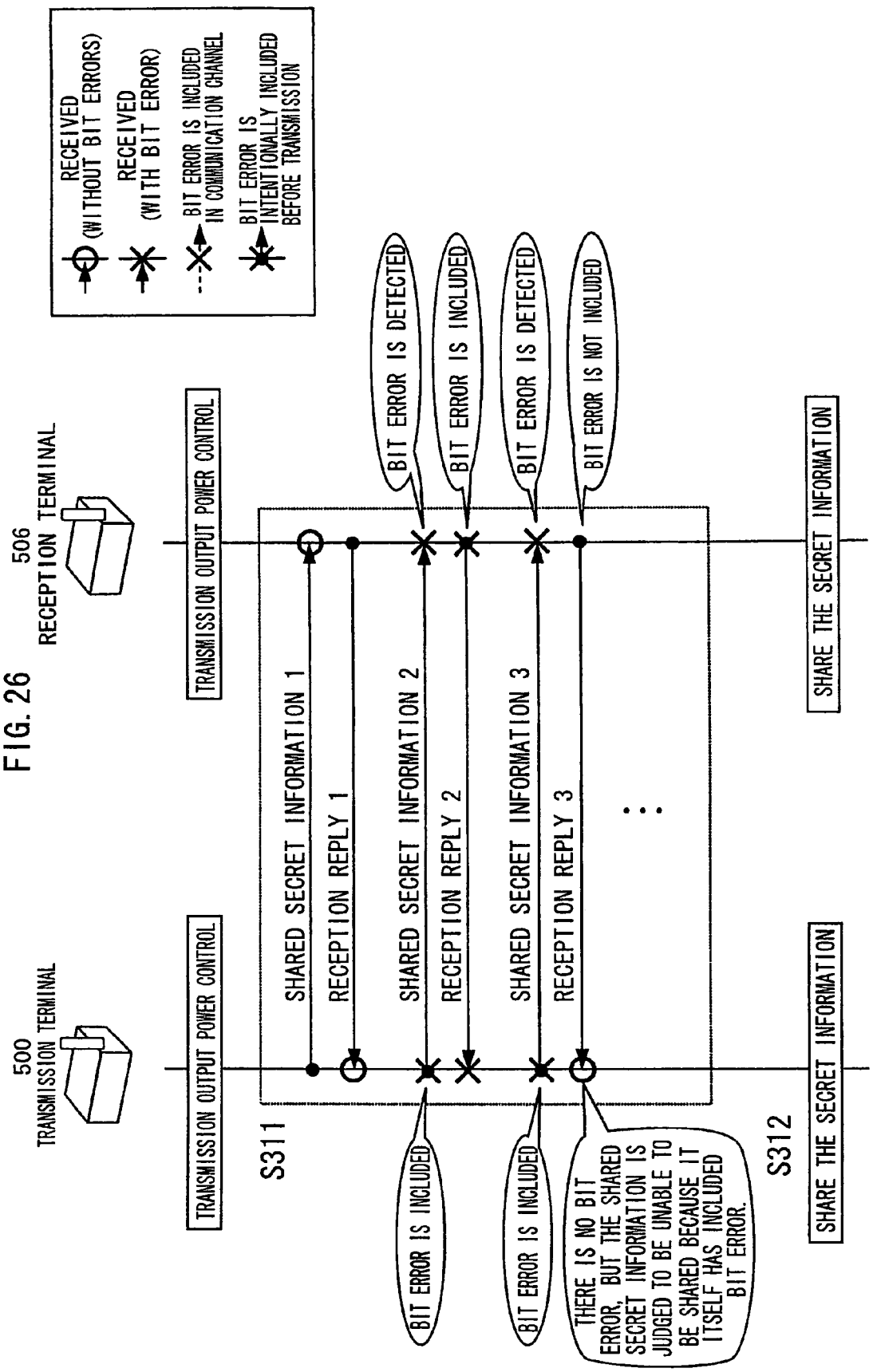
FIGS. 26 and 27 are diagrams showing the operation of a secret information sharing system pertaining to embodiment 8.

Next, the operation of the secret information sharing system pertaining to embodiment 8 will be described with reference to FIG. 26. Here, the operation of the secret information sharing system pertaining to embodiment 8 is mainly composed of two steps of operations (S311 and S312).
(S311: Deliver the Shared Secret Information)

(1) The shared secret information generation unit 501 of the transmission terminal 500 generates or receives shared secret information and transmits the shared secret information to the delivery verification unit 502 and the transmission unit 504. A bit error is included in the shared secret information at any chance. When a bit error is included, the shared secret information generation unit 501 transmits a message of abandonment together with the shared secret information to the delivery verification unit 502.

(2) The shared secret information is transmitted to the reception terminal 506 via the transmission unit 504.

(3) The error detection unit 507 of the reception terminal 506 receives the shared secret information that the transmission terminal 500 has transmitted via the reception unit 505 and verifies whether or not a bit error is included in the shared secret information. When a bit error is not included, the error detection unit 507 judges that the received shared secret information is shared secret information that was able to be shared with the transmission terminal 500, transmits the shared secret information that is judged to be able to be shared to the secret information sharing unit 509 and transmits a message of sharing to the reception reply generation unit 508. On the other hand, when a bit error is included, the error detection unit 507 judges that the received shared secret information is shared secret information that was unable to be shared with the transmission terminal 500 and transmits a message of abandonment to the reception reply generation unit 508.

(4) The reception reply generation unit 508 of the reception terminal 506 generates a reception reply and replies to the transmission terminal 500 with the reception reply via the transmission unit 510 upon receiving the message of sharing or abandonment from the error detection unit 507. Here, when the message of abandonment is received from the error detection unit 507, a bit error is included in the reception reply, but a bit error may not be included at any chance.

(5) The delivery verification unit 502 of the transmission terminal 500 receives, via the reception unit 505, the reception reply that the reception terminal 506 has replied with respect to the shared secret information that it itself has transmitted and verifies whether or not a bit error is included in the reception reply. When a bit error is not included in the reception reply with respect to the shared secret information for which it itself did not include a bit error, the delivery verification unit 502 judges that the shared secret information that it itself has transmitted was able to be shared with the reception terminal 506 and transmits the shared secret information that has been judged to be able to be shared to the secret information sharing unit 503. On the other hand, when a bit error is included or a bit error is included in the reception reply with respect to the shared secret information for which it itself has transmitted with a bit error and which it has received together with the message of abandonment from the shared secret information generation unit 501, the delivery verification unit 502 judges that the shared secret information that it itself has transmitted was unable to be shared with the reception terminal 506 and abandons the shared secret information. The delivery verification unit 502 transmits a transmission request message to the shared secret information generation unit 501 in order to request transmission of the next packet of shared secret information, on the condition that it is able to judge whether or not the shared secret information that it itself has transmitted was able to be shared with the reception terminal 506.

(6) The shared secret information generation unit 501 of the transmission terminal 500 generates or receives the next packet of shared secret information and transmits the shared secret information to the delivery verification unit 502 and the transmission unit 504 upon receiving the transmission request message from the delivery verification unit 502.
(S312: Share the Secret Information)

(1) The secret information sharing unit 503 of the transmission terminal 500 generates the secret information using more than one packets of the shared secret information that it has received from the delivery verification unit 502.

(2) The secret information sharing unit 509 of the reception terminal 506 generates the secret information using more than one packets of the shared secret information that it has received from the error detection unit 507.

As described above, in addition to embodiment 6, in embodiment 8, the transmission terminal includes a bit error at any chance in the shared secret information that it itself transmits, and the reception terminal does not intentionally include a bit error in the reception reply that it itself replies at any chance even when a bit error is detected in the shared secret information that it has received, thereby making it difficult for the intercepting terminal to identify the correct information.

Figure 27:
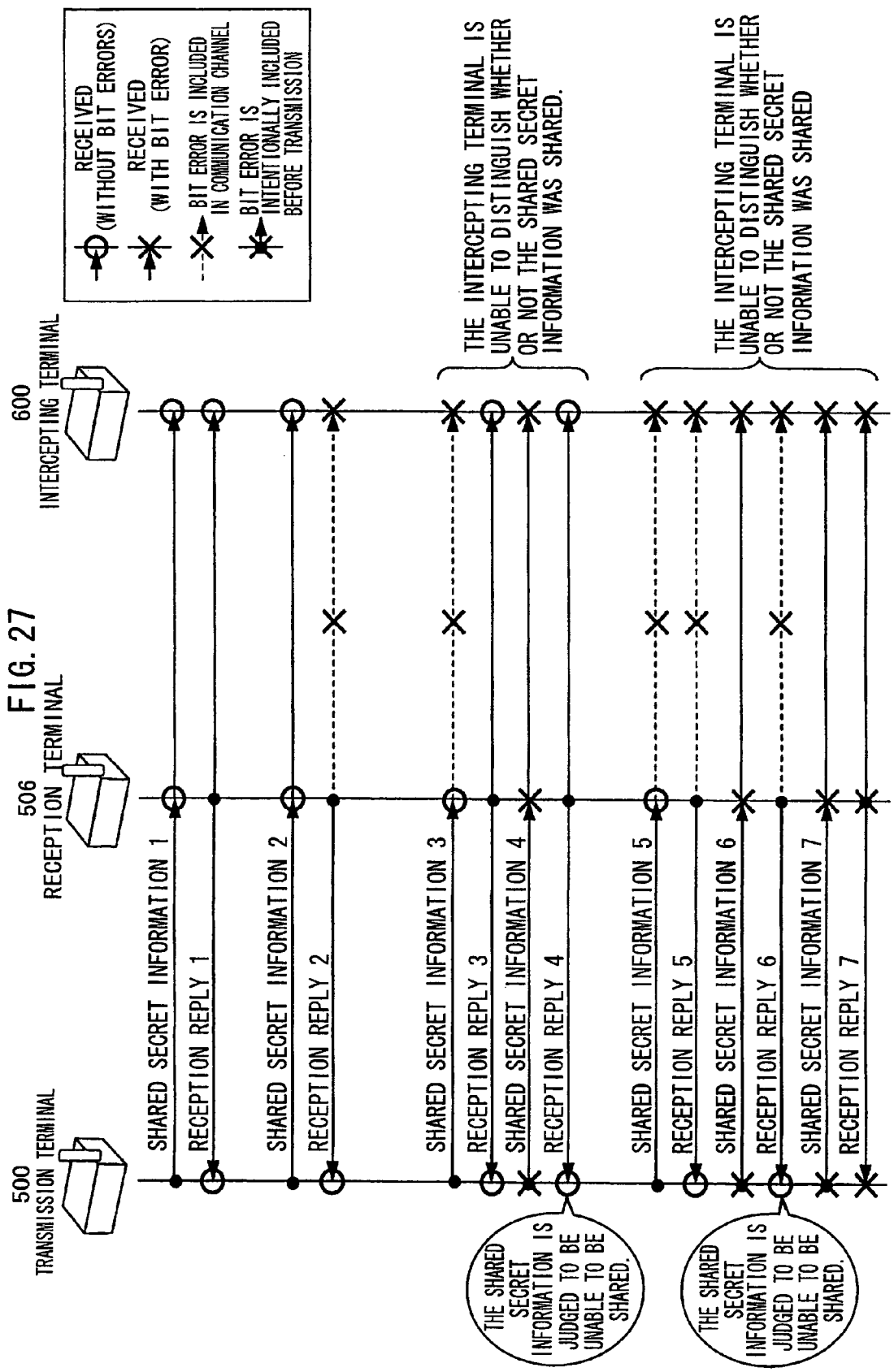

Next, embodiment 8 will be described further with reference to FIG. 27. In FIG. 27, a case is supposed where the bit error rate of a communication channel between the transmission terminal 500 and the reception terminal 506 is sufficiently low. That is to say, the possibility that a bit error occurs in the communication channel between the transmission terminal 500 and the reception terminal 506 is not taken into consideration. Moreover, the possibility that a bit error is further included in the course of communication of the shared secret information or the reception reply that each of the transmission terminal 500 and the reception terminal 506 has transmitted intentionally with a bit error so eventually no bit error is detected at the receiving side is not taken into consideration.

First, when the intercepting terminal 600 was able to intercept the shared secret information without detection of any bit errors, it can be judged that the shared secret information is shared secret information that was able to be shared with the transmission terminal 500 and the reception terminal 506 (shared secret information 1 and reception reply 1, or shared secret information 2 and reception reply 2). Next, when the intercepting terminal 600 has received the shared secret information with a bit error and intercepted the reception reply without any bit errors, it is practically impossible to judge whether the reception terminal 506 has transmitted the reception reply in a state of being able to share the shared secret information without bit errors or the reception terminal 506 has transmitted the reception reply without intentionally including bit errors with respect to the bit error that the transmission terminal 500 has intentionally included, and judge whether or not the transmission terminal 500 and the reception terminal 506 were able to share the shared secret information (in other words, it is impossible to distinguish between the example of shared secret information 3 and reception reply 3 and the example of shared secret information 4 and reception reply 4). Finally, when the intercepting terminal 600 has received the shared secret information and the reception reply with a bit error, although the transmission terminal 500 and the reception terminal 506 are exchanging the shared secret information and a reception reply thereof without bit errors; it is practically impossible to judge whether a bit error has occurred in the communication channel from the transmission terminal 500 and the reception terminal 506 to the intercepting terminal 600 or the bit error has been intentionally included in the shared secret information by the transmission terminal 500 or included in the reception reply by the reception terminal 560, and judge whether or not the transmission terminal 500 and the reception terminal 506 are sharing the shared secret information (in other words, it is impossible to distinguish between the example of shared secret information 5 and reception reply 5, the example of shared secret information 6 and reception reply 6, and the example of shared secret information 7 and reception reply 7).

As described above, when a bit error is detected in the received shared secret information, the intercepting terminal 600 is unable to judge whether the bit error has occurred in the communication channel or is intentionally included by the transmission terminal 500, and is accordingly unable to distinguish whether the shared secret information was shared by the transmission terminal 500 and the reception terminal 506 or was just a dummy. As a result, it is possible to make it difficult for the intercepting terminal 600 to identify the secret information that is shared by the transmission terminal 500 and the reception terminal 506.

Embodiment 9

In embodiment 9, as in embodiments 6 and 8, a case is supposed where the bit error rate of the communication channel between the transmission terminal 500 and the reception terminal 506 is sufficiently lower than the delivery information amount. In embodiment 9, the judgment as to whether or not the information transmitted by the transmission terminal 500 is correctly delivered to the reception terminal 506 is made on the basis of whether or the reception terminal 506 replies to the transmission terminal 500 with a reception reply in the same manner as the successful reception reply explained in embodiments 1 to 3. Here, the transmission terminal 500 intentionally includes a bit error in the shared secret information that it itself transmits, and the reception terminal 506 intentionally replies at any chance even when a bit error is detected in the shared secret information that it has received, thereby making it difficult for the intercepting terminal 600 to identify the correct information.

A block diagram showing the internal configuration of a transmission terminal pertaining to embodiment 9 is shown in FIG. 17 as in embodiment 6. Here, only the shared secret information generation unit and the delivery verification unit, whose operations differ from those described in embodiment 6, will be described.

The shared secret information generation unit 501 basically has the same operation as that of the shared secret information generation unit 501 of embodiment 6, but in the present embodiment, a bit error may be included in the shared secret information at any chance. Here, the shared secret information including a bit error refers to shared secret information in which the bits are reversed in such a form that a bit error is detected in the error detection code. When a bit error is included in the shared secret information, the shared secret information generation unit 501 transmits a message of abandonment together with the shared secret information to the delivery verification unit 502 and transmits shared secret information to the transmission unit 504.

The delivery verification unit 502 differs from the delivery verification unit 502 of embodiment 6 in that the method of verifying whether or not the shared secret information that it itself has transmitted was able to be shared with other communication terminals is different. The delivery verification unit 502 of embodiment 9 verifies whether or not a reception reply with respect to the shared secret information that has been received from the shared secret information generation unit 501 is transmitted from the reception unit 505. In a case where the reception reply is not replied, the delivery verification unit 502 judges that the shared secret information was unable to be shared and abandons the shared secret information. The case where the reception reply is not replied refers to a case, for example, where it is unable to receive a reception reply within a prescribed amount of time. On the other hand, in a case where the reception reply is replied, the delivery verification unit 502 judges that the shared secret information was able to be shared and transmits the shared secret information to the secret information sharing unit 501. When the delivery verification unit 502 has received a message of abandonment together with shared secret information from the shared secret information generation unit 501, the delivery verification unit 502 judges that the shared secret information was unable to be shared with the reception terminal 506 regardless of whether or not a reception reply was received from the reception unit 505.

The block diagram showing the internal configuration of the reception terminal 506 of embodiment 9 is shown in FIG. 19 as in embodiment 6. Here, only the reception reply generation unit 508, whose operation differs from that described in embodiment 6, will be described.

The reception reply generation unit 508 differs from the reception reply generation unit 508 of embodiment 6 in that the method of transmitting information about whether the shared secret information that the transmission terminal 500 has transmitted was shared is different. When the reception reply generation unit 508 has received a message of sharing from the error detection unit 507, the reception reply generation unit 508 generates a reception reply and transmits the reception reply to the transmission unit 510. On the other hand, when the reception reply generation unit 508 has received a message of abandonment from the error detection unit 507, the reception reply generation unit 508 basically does not generate a reception reply. However, even when the reception reply generation unit 508 has received a message of abandonment from the error detection unit 507 at any chance, the reception reply generation unit 508 may generate a reception reply and transmit the reception reply to the transmission unit 510.

Figure 28:
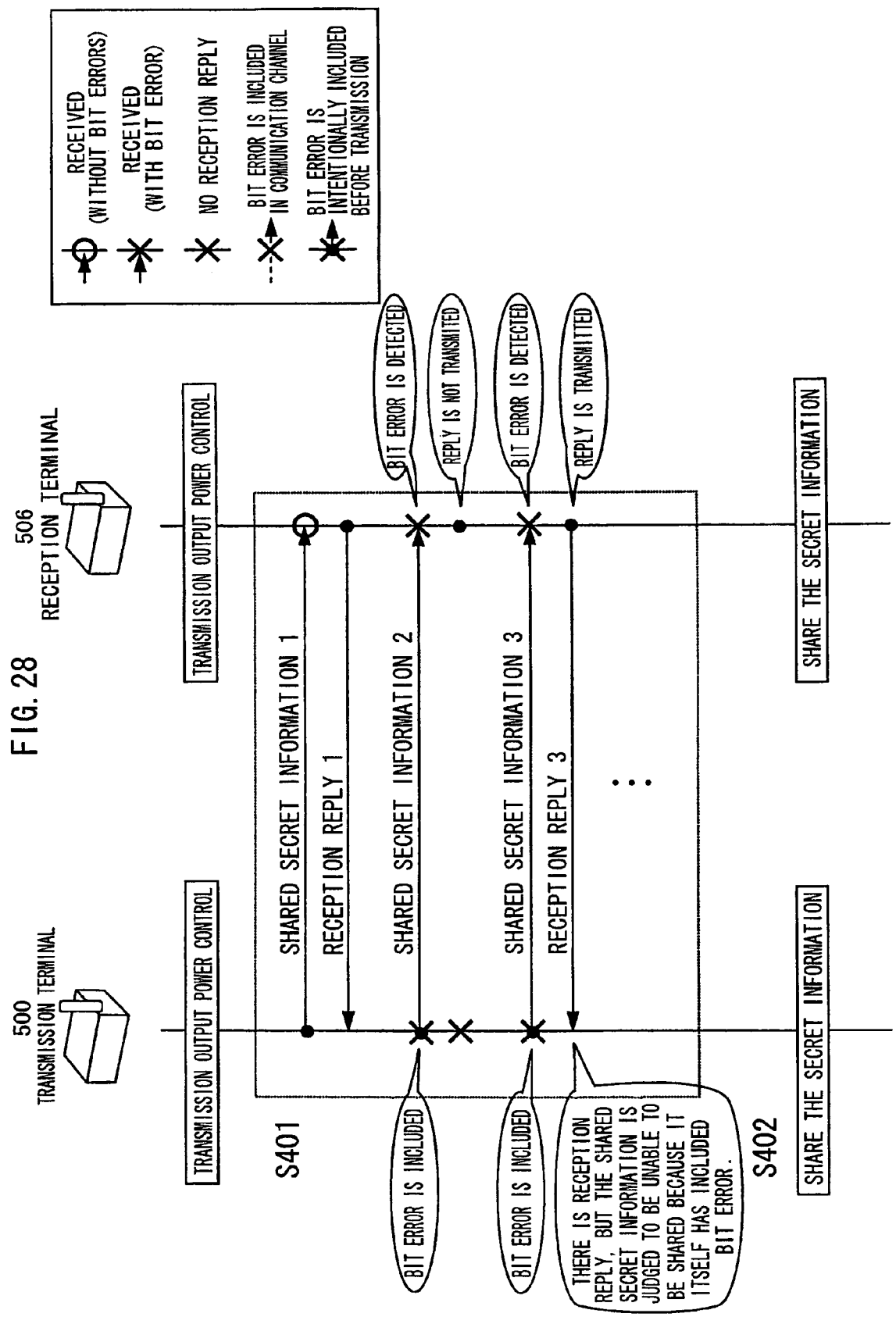
FIGS. 28 and 29 are diagrams showing the operation of a secret information sharing system pertaining to embodiment 9.

Next, the operation of a secret information sharing system pertaining to embodiment 9 will be described with reference to FIG. 28. Here, the operation of the secret information sharing system pertaining to embodiment 9 is mainly composed of two steps of operations (S401 and S402). The operation of the secret information sharing system of embodiment 9 is basically the same as the operation of the secret information sharing system of embodiment 8, except that in the present embodiment, the transmission terminal 500 makes the judgment as to whether or not the shared secret information that it itself has transmitted was able to be shared with the reception terminal 506 on the basis of the judgment as to whether a reception reply is transmitted from the reception terminal 506.

(S401: Deliver the Shared Secret Information)

(1) The shared secret information generation unit 501 of the transmission terminal 500 generates or receives shared secret information and transmits the shared secret information to the delivery verification unit 502 and the transmission unit 504. A bit error is included in the shared secret information at any chance. When a bit error is included, the shared secret information generation unit 501 transmits a message of abandonment together with the shared secret information to the delivery verification unit 502.

(2) The shared secret information is transmitted to the reception terminal 506 via the transmission unit 504.

(3) The error detection unit 507 of the reception terminal 506 receives the shared secret information that the transmission terminal 500 has transmitted via the reception unit 511 and verifies whether or not a bit error is included in the shared secret information. When a bit error is not included, the error detection unit 507 judges that the received shared secret information is shared secret information that was able to be shared with the transmission terminal 500, transmits the shared secret information that is judged to be able to be shared to the secret information sharing unit 509 and transmits a message of sharing to the reception reply generation unit 508. On the other hand, when a bit error is included, the error detection unit 507 judges that the received shared secret information is shared secret information that was unable to be shared with the transmission terminal 500 and transmits a message of abandonment to the reception reply generation unit 508.

(4) The reception reply generation unit 508 of the reception terminal 506 generates a reception reply and replies to the transmission terminal 500 with the reception reply via the transmission unit 510 upon receiving the message of sharing or abandonment from the error detection unit 507. Here, when the message of abandonment is received from the error detection unit 507, the reception reply generation unit 508 generates a reception reply; in some cases, it may generate the reception reply at any chance.

(5) The delivery verification unit 502 of the transmission terminal 500 verifies whether or not a reception reply with respect to the shared secret information that it itself has transmitted was received from the reception terminal 506. When a reception reply was received with respect to the shared secret information that it itself has transmitted without bit errors, the delivery verification unit 502 judges that the shared secret information that it itself has transmitted was able to be shared with the reception terminal 506 and transmits the shared secret information that has been judged to be able to be shared to the secret information sharing unit 503. On the other hand, when the reception reply was not received, or a reception reply was received with respect to the shared secret information for which it itself has transmitted with bit errors and which has been received together with the message of abandonment from the shared secret information generation unit 501, the delivery verification unit 502 judges that the shared secret information that it itself has transmitted was unable to be shared with the reception terminal 506 and abandons the shared secret information. The delivery verification unit 502 transmits a transmission request message to the shared secret information generation unit 501 in order to request transmission of the next packet of shared secret information, on the condition that it is able to judge whether or not the shared secret information that it itself has transmitted was able to be shared with the reception terminal 506.

(6) The shared secret information generation unit 501 of the transmission terminal 500 generates or receives the next packet of shared secret information and transmits the shared secret information to the delivery verification unit 502 and the transmission unit 504 upon receiving the transmission request message from the delivery verification unit 502.

(S402: Share the Secret Information)

(1) The secret information sharing unit 503 of the transmission terminal 500 generates the secret information using more than one packets of the shared secret information that it has received from the delivery verification unit 502.

(2) The secret information sharing unit 509 of the reception terminal 506 generates the secret information using more than one packets of the shared secret information that it has received from the error detection unit 507.

As described above, in embodiment 9, the judgment as to whether or not the information transmitted by the transmission terminal 500 is correctly delivered to the reception terminal 506 is made on the basis of whether or the reception terminal 506 replies to the transmission terminal 500 with a reception reply. Here, the transmission terminal 500 intentionally includes a bit error in the shared secret information that it itself transmits, and the reception terminal 506 intentionally replies with a reception reply at any chance even when a bit error is detected in the shared secret information that it has received, thereby making it difficult for the intercepting terminal 600 to identify the correct information.

Figure 29:
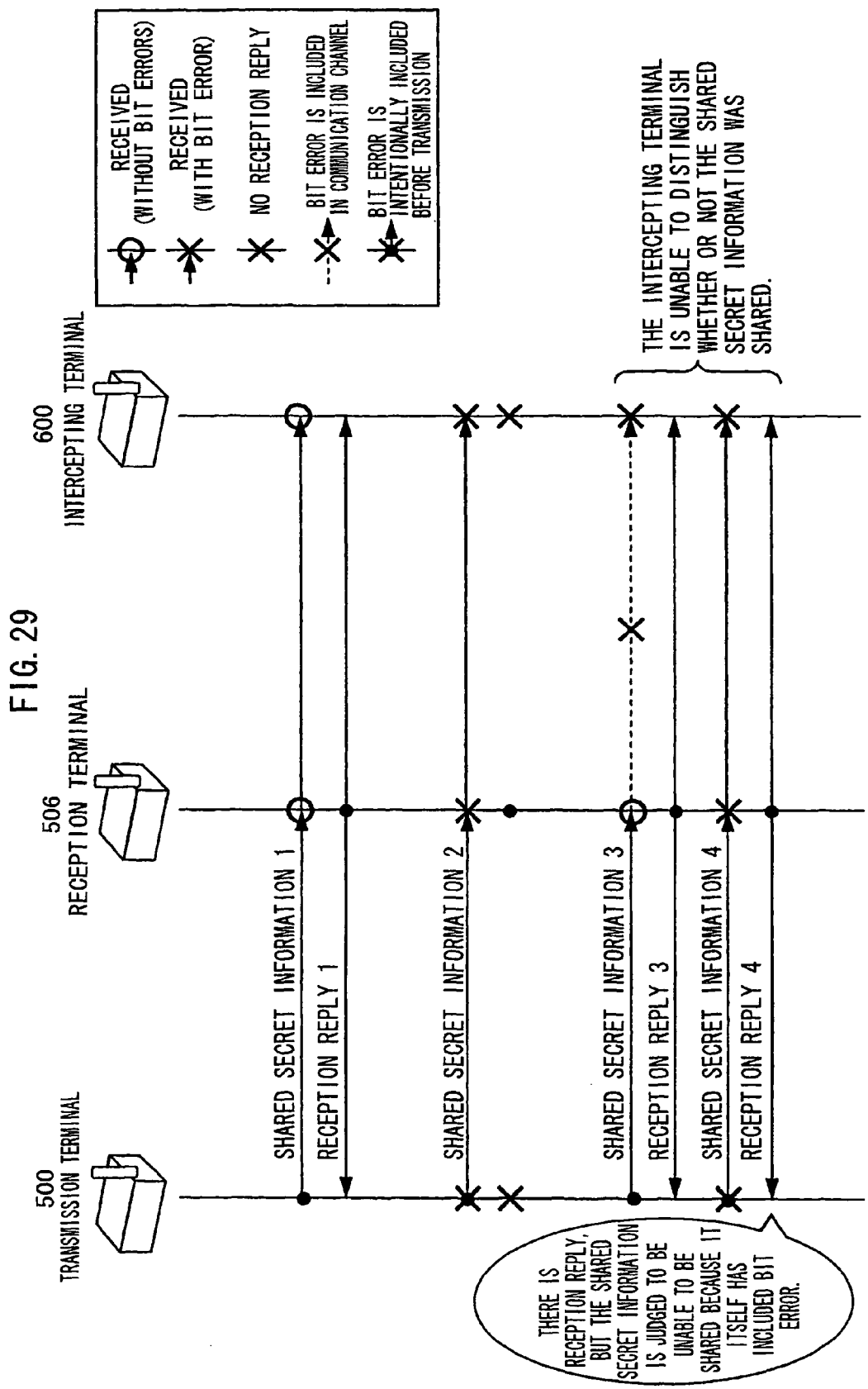

Next, embodiment 9 will be described further with reference to FIG. 29. In FIG. 29, a case is supposed where the bit error rate of a communication channel between the transmission terminal 500 and the reception terminal 506 is sufficiently low. That is to say, the possibility that a bit error occurs in the communication channel between the transmission terminal 500 and the reception terminal 506 is not taken into consideration. Moreover, the possibility that a bit error is further included in the course of communication of the shared secret information that the transmission terminal 500 has transmitted intentionally with a bit error so eventually no bit error is detected at the receiving side is not taken into consideration.

First, when the intercepting terminal 600 was able to intercept the shared secret information without detection of any bit errors to acquire the reception reply with respect to the shared secret information, it can be judged that the shared secret information is shared secret information that was able to be shared by the transmission terminal 500 and the reception terminal 506 (shared secret information 1 and reception reply 1). Next, when the intercepting terminal 600 has received the shared secret information with a bit error and was unable to intercept the reception reply with respect to the shared secret information, it can be judged that the shared secret information is shared secret information that was unable to be shared by the transmission terminal 500 and the reception terminal 506. Finally, when the intercepting terminal 600 has received the shared secret information with a bit error and was able to intercept the reception reply with respect to the shared secret information, it is practically impossible to judge whether the reception terminal 506 has transmitted the reception reply in a state of being able to share the shared secret information without bit errors or the reception terminal 506 has transmitted the reception reply intentionally with respect to the bit error that the transmission terminal 500 has intentionally included, and judge whether or not the transmission terminal 500 and the reception terminal 506 were able to share the shared secret information (in other words, it is impossible to distinguish between the example of shared secret information 3 and reception reply 3 and the example of shared secret information 4 and reception reply 4).

As described above, when a bit error is detected in the received shared secret information and a reception reply with respect to the shared secret information is acquired, the intercepting terminal 600 is unable to judge whether the reception terminal 506 has transmitted the reception reply in a state of being able to receive the shared secret information without bit errors or intentionally transmitted, and is accordingly unable to distinguish whether the shared secret information was shared by the transmission terminal 500 and the reception terminal 506 or was just a dummy. As a result, it is possible to make it difficult for the intercepting terminal 600 to identify the secret information that is shared by the transmission terminal 500 and the reception terminal 506.

Embodiment 10

In embodiments 1 to 9, an example has been described where the transmission terminal transmits the shared secret information (or the redundant transmission information) to the reception terminal so that secret information is shared by them. Here, for example, when the transmission terminal wishes to share predetermined secret information with the reception terminal, if the CPU processing ability or the memory capacity of the transmission terminal is much smaller than that of the reception terminal, it may be preferable that the cost (calculation amount or use memory amount) necessary for generating random numbers included in the shared secret information is imposed on the reception terminal. The present embodiment differs from the above-described embodiments in that the transmission terminal of the shared secret information is different from a terminal possessing secret information that is to be shared.

Figure 30:
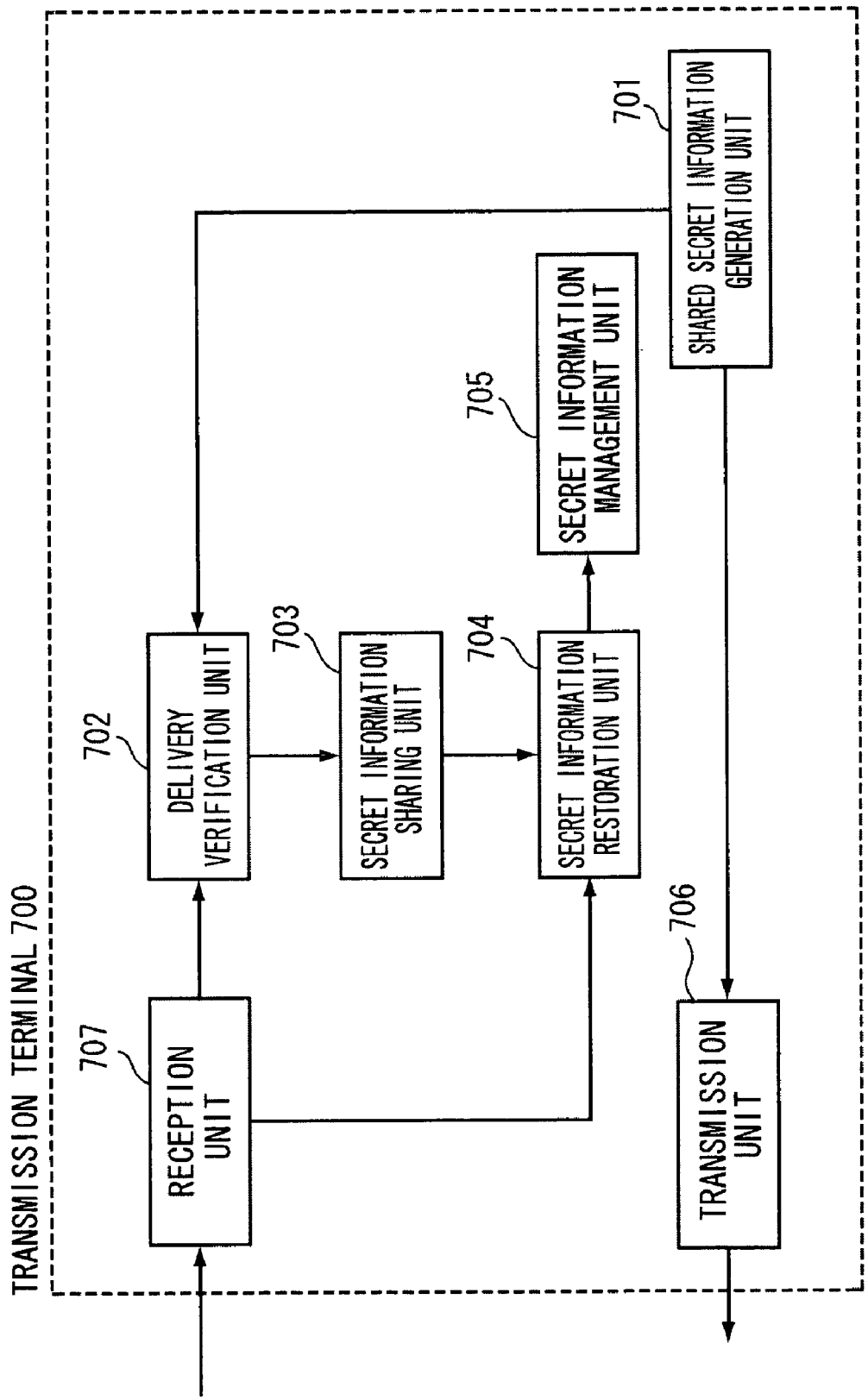
FIG. 30 is a block diagram showing the internal configuration of a transmission terminal pertaining to embodiment 10.

A block diagram showing the internal configuration of a transmission terminal pertaining to embodiment 10 is shown in FIG. 30.

In FIG. 30, a transmission terminal 700 is equipped with a shared secret information generation unit 701, a delivery verification unit 702, a secret information sharing unit 703, a secret information restoration unit 704, a secret information management unit 705, a transmission unit 706, and a reception unit 707.

Here, only the shared secret sharing unit, the secret information restoration unit, the secret information management unit, and the reception unit, whose operations differ from those described in embodiments 6 to 9, will be described.

The secret information sharing unit 703 basically has the same operation as that of the shared secret information generation unit 501 of embodiments 6 to 9, but it is different in that it transmits the generated secret information to the secret information restoration unit 704.

The secret information restoration unit 704 restores original secret information from the converted secret information that it receives from the reception unit 707 and that the reception terminal 780 (see FIG 31) has transmitted, using the secret information that it receives from the secret information sharing unit 703. As a method of restoring the original secret information from the converted secret information received from the reception unit 707 using the secret information received from the secret information sharing unit 703, an exclusive OR operation that restores the original secret information by performing an exclusive OR operation on both of the secret information packets or a decoding operation that uses the secret information received from the secret information sharing unit 703 as key information may be used. However, the decoding method needs to correspond to the conversion method in the secret information conversion unit of the reception terminal 780. However, the decoding method is not necessarily paired with the conversion method. The secret information restoration unit 704 transmits the decoded secret information to the secret information management unit 705.

The secret information management unit 705 manages the secret information that it receives from the secret information restoration unit 704 and that it itself wishes to share with the reception terminal 780.

The reception unit 707 basically has the same operation as that of the reception unit of embodiments 6 to 9, but it transmits the converted secret information to the secret information restoration unit 704 upon receiving the converted secret information transmitted by the reception terminal 780.

Figure 31:
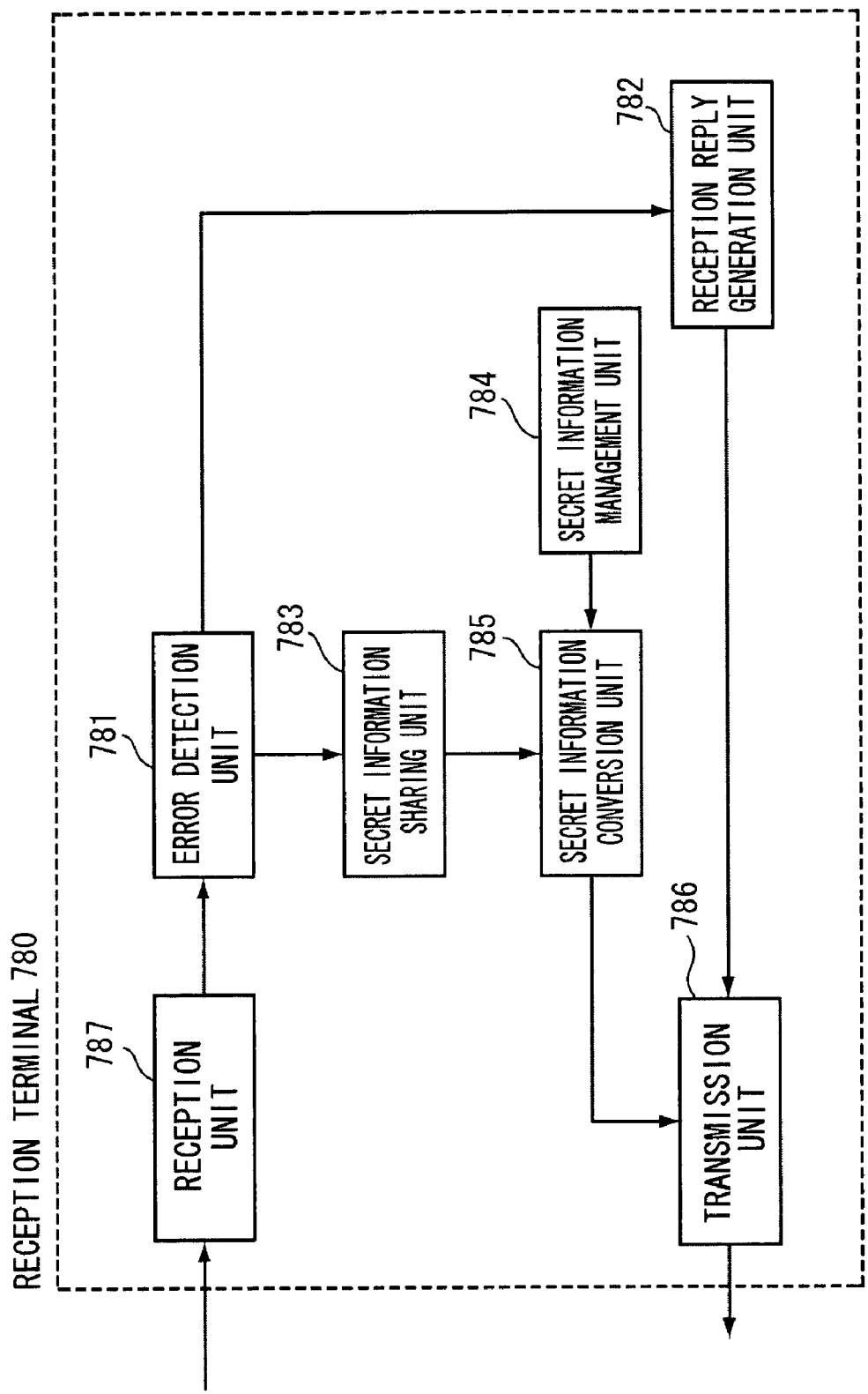
FIG. 31 is a block diagram showing the internal configuration of the reception terminal 780 pertaining to embodiment 10.

FIG. 31 is a block diagram showing the internal configuration of the reception terminal 780 pertaining to embodiment 10.

In FIG. 31, the reception terminal 780 is equipped with an error detection unit 781, a reception reply generation unit 782, a secret information sharing unit 783, a secret information management unit 784, a secret information conversion unit 785, a transmission unit 786, and a reception unit 787.

Here, only the shared secret sharing unit, the secret information management unit, and the secret information conversion unit, and the transmission unit, whose operations differ from those described in embodiments 6 to 9, will be described.

The secret information sharing unit 783 basically has the same operation as that of the secret information sharing unit of embodiments 6 to 9, but it is different in that it transmits the generated secret information to the secret information conversion unit 785.

The secret information management unit 784 manages the secret information that it itself wishes to share with the transmission terminal 700. The secret information as referred herein is not particularly limited, and the secret information may be key information that is used for encryption and authentication of data transmission/reception between the reception terminal 780 and the transmission terminal 700. The secret information management unit 784 transmits the secret information that it itself manages to the secret information conversion unit 785.

The secret information conversion unit 785 converts the secret information that is received from the secret information management unit 784 and that it itself wishes to share with the transmission terminal 700 into a form that can be restored only using the secret information that is received from the secret information sharing unit 783. The conversion method is not particularly limited, but the method may be an exclusive OR operation that restores the original secret information by performing an exclusive OR operation on both of the secret information packets or a decoding operation that uses the secret information received from the secret information sharing unit 783 as key information may be used. The secret information conversion unit 785 transmits the converted secret information to the transmission unit 786.

The transmission unit 786 basically has the same operation as that of the shared secret information generation unit of embodiments 6 to 9, but it transmits further the converted secret information that is received from the secret information conversion unit 785 to the transmission terminal 700.

Figure 32:
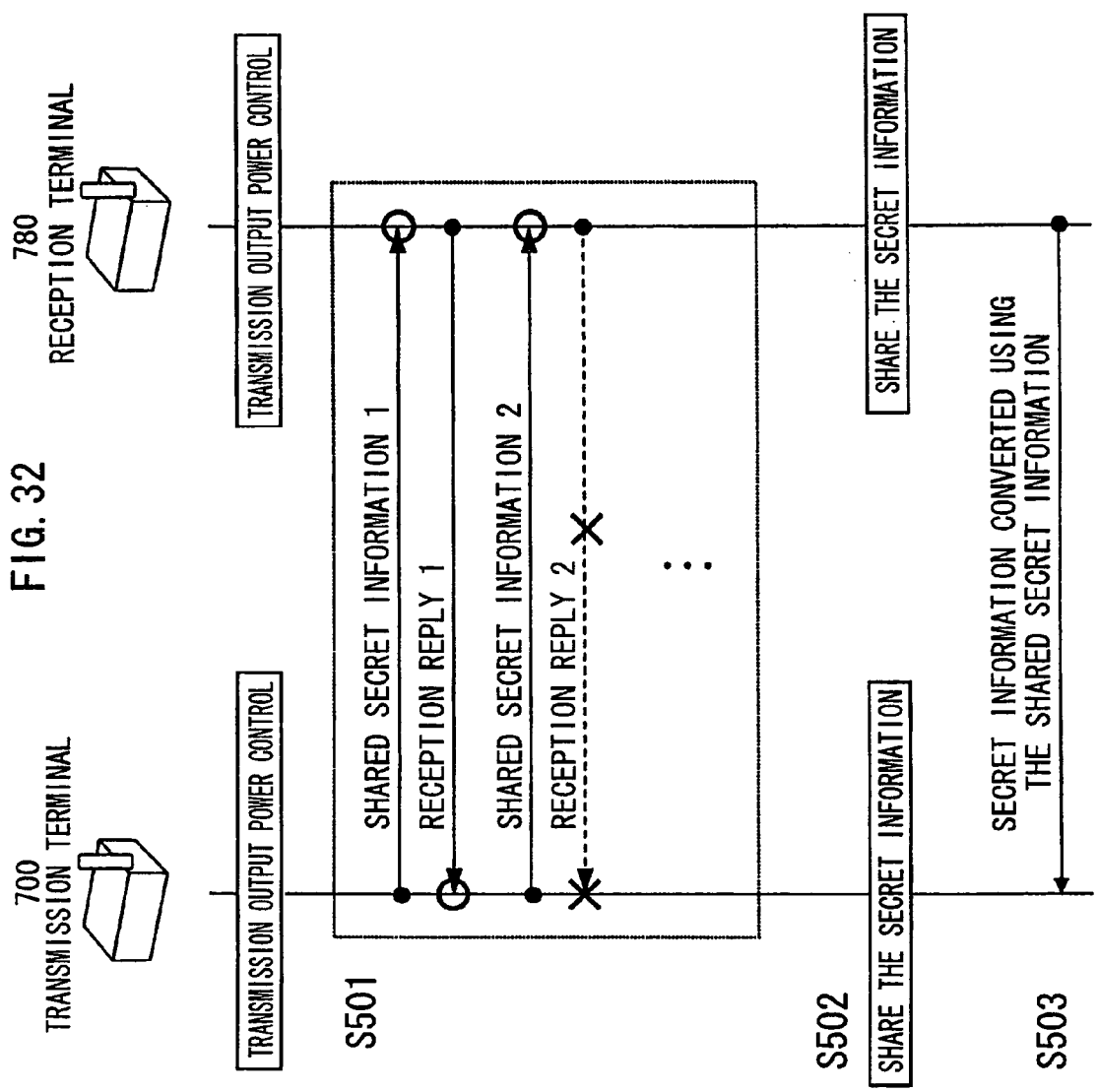
FIG. 32 is a diagram showing the operation of a secret information sharing system pertaining to embodiment 10.

Next, the operation of a secret information sharing system pertaining to embodiment 10 will be described with reference to FIG. 32. Here, the operation of the secret information sharing system pertaining to embodiment 10 is mainly composed of three steps of operations (S501, S502, and S503).

The operations of step S501 (deliver the shared secret information) and step S502 (share the secret information) in the secret information sharing system of embodiment 10 are basically the same as those of the first step (deliver the shared secret information) and the second step (share the secret information) in the secret information sharing system of embodiments 6 to 9. Here, only the operation of the third step (deliver the secret information), which is a new operation, will be described.

(S503: Deliver the Secret Information)

(1) The secret information conversion unit 785 of the reception terminal 780 converts the secret information that is received from the secret information management unit 784 and that it itself wishes to share with the transmission terminal 700 into a form that can be restored only using the secret information that is received from the secret information sharing unit 783 and transmits the converted secret information to the transmission terminal 700 via the transmission unit 786.

(2) The secret information restoration unit 704 of the transmission terminal 700 restores the original secret information from the converted secret information that is received from the reception unit 707 and that the reception terminal 780 has transmitted, using the secret information that is received from the secret information sharing unit 783.

(3) The secret information management unit 705 of the transmission terminal 700 receives the secret information that the reception terminal 780 wishes to share with the transmission terminal 700, so that the secret information is shared by the transmission terminal 700 and the reception terminal 780.

In embodiment 10, the transmission terminal 700 and the reception terminal 780 exchange new secret information using the shared secret information. In embodiments 6 to 9, an example has been described where the transmission terminal transmits shared secret information to the reception terminal and secret information is shared by them. Here, for example, when the transmission terminal wishes to share predetermined secret information with the reception terminal, if the CPU processing ability or the memory capacity of the transmission terminal is much smaller than that of the reception terminal, it may be preferable that the cost (calculation amount or use memory amount) necessary for generating random numbers included in the shared secret information is imposed on the reception terminal. As described above, in embodiment 10, when the CPU processing ability or the memory capacity of a terminal possessing the secret information that is to be shared is much smaller than that of a terminal that is not possessing the secret information, it is possible to securely deliver the secret information without imposing the random number generation cost (calculation amount or use memory amount) necessary for generating the shared secret information on the terminal possessing the secret information that is to be shared.

Embodiment 11

In embodiments 1 to 10, either one of the transmission terminal or the reception terminal transmits the shared secret information. Here, a situation can be conceived where the intercepting terminal receives information transmitted by one terminal with a bit error rate much higher than that of information transmitted by another terminal. In such a case, it is preferable that the terminal transmitting the shared secret information appears to the intercepting terminal as a terminal providing a poor reception environment. In the present embodiment, all communication terminals sharing information together carries out delivery of shared secret information thereby, making it difficult for the intercepting terminal to identify the correct information.

Figure 33:
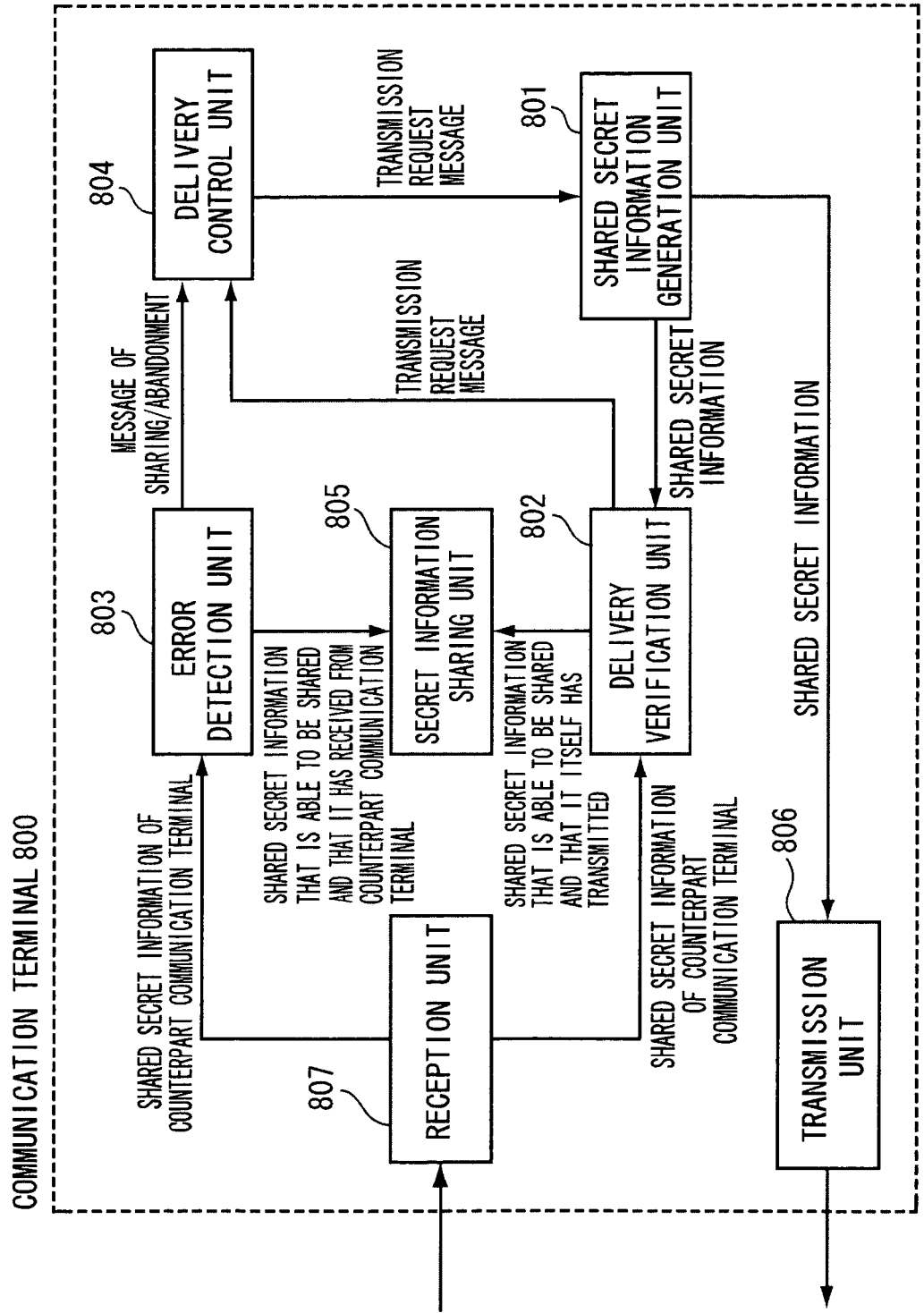
FIG. 33 is a block diagram showing the internal configuration of a communication terminal 800 pertaining to embodiment 11.

A secret information sharing system of embodiment 11 is configured by a plurality of communication terminals. FIG. 33 is a block diagram showing the internal configuration of a communication terminal 800 pertaining to embodiment 11.

In FIG. 33, the communication terminal 800 is equipped with a shared secret information generation unit 801, a delivery verification unit 802, an error detection unit 803, a delivery control unit 804, a secret information sharing unit 805, a transmission unit 806, and reception unit 807.

The shared secret information generation unit 801 basically has the same operation as that of the shared secret information generation unit in the transmission terminal of embodiments 6 to 10, but it is different in that it receives a transmission request message from the delivery control unit 804. Moreover, since the shared secret information of the present embodiment also has the function of the reception reply in embodiments 6 to 10, the generated shared secret information may include not only an identification number for identifying itself but also an identification number of the shared secret information that is received from a counterpart communication terminal. Furthermore, for example, the shared secret information generation unit 801 per se may generate a reception reply in lieu of the shared secret information when it has finished delivering the shared secret information to the counterpart communication terminal.

The delivery verification unit 802 basically has the same operation as that of the delivery verification unit of the transmission terminal of embodiment 9, but it receives shared secret information that the counterpart communication terminal has transmitted, in lieu of the reception reply, from the reception unit 807. Here, the delivery verification unit 802 is able to know which packet of the shared secret information that it itself has transmitted the received shared secret information is replied for. For example, the shared secret information that the counterpart communication terminal has transmitted may include an identification number indicating which packet of the shared secret information that it itself has transmitted the received shared secret information is replied for. The delivery verification unit 802 judges whether or not the shared secret information that it itself has transmitted was able to be shared with the counterpart communication terminal on the basis of whether the shared secret information is received from the counterpart communication terminal and transmits the shared secret information that was judged to be able to be shared to the secret information sharing unit 805. Moreover, for example, the delivery verification unit 802 transmits a transmission request message to the delivery control unit 804 on the condition that it was able to judge whether or not the shared secret information that it itself has transmitted was able to be shared on the basis of whether or not a reply was received with respect to the shared secret information within a prescribed time-out period. However, the delivery verification unit 802 may transmit the transmission request message to the shared secret information generation unit 801 on the condition that it itself has not yet transmitted the shared secret information from the shared secret information generation unit, except that it itself is the receiver of the shared secret information that is delivered the earliest. Furthermore, for example, when the counterpart communication terminal has finished delivering the shared secret information, the delivery verification unit 802 may transmit a reception reply in lieu of the shared secret information.

The error detection unit 803 basically has the same operation as that of the error detection unit of the reception terminal of embodiments 6 to 10, but it is different in that it transmits a message of sharing or abandonment to the delivery control unit 804.

The delivery control unit 804 controls whether or not to allow the shared secret information generation unit 801 to generate the next packet of shared secret information. The delivery control unit 804 receives the transmission request message from the delivery verification unit 802 and receives the message of abandonment/sharing from the error detection unit 803. Upon receiving the transmission request message from the delivery verification unit 802, the delivery control unit 804 transmits the transmission request message to the shared secret information generation unit 801. However, when the delivery control unit 804 receives a message of abandonment from the error detection unit 803 with respect to the transmission request message transmitted from the delivery verification unit 802, the delivery control unit 804 does not transmit the transmission request message to the shared secret information generation unit 801 but waits. This is to let the counterpart communication terminal be informed of the fact that it was unable to share the shared secret information transmitted from the counterpart communication terminal, by not replying to the counterpart communication terminal with the next packet of shared secret information. Moreover, if it itself has already finished delivering the shared secret information, the delivery control unit 804 may generate the transmission request message and transmit the generated transmission request message to the shared secret information generation unit 801 upon receiving a message of sharing/abandonment from the error detection unit 803.

The secret information sharing unit 805 basically has the same operation as that of the secret information sharing unit of the transmission terminal and the reception terminal of embodiments 6 to 10, but it is different in that it receives the shared secret information that was judged to be unable to be shared with the counterpart communication terminal, from two units, the delivery verification unit 802 and the error detection unit 803.

The transmission unit 806 transmits the shared secret information or the reception reply that is received from the shared secret information generation unit 801 to the counterpart communication terminal.

The reception unit 807 transmits the shared secret information transmitted from the counterpart communication terminal to the error detection unit 803 and the delivery verification unit 802 and transmits the reception reply transmitted from the counterpart communication terminal to the delivery verification unit 802.

Figure 34:
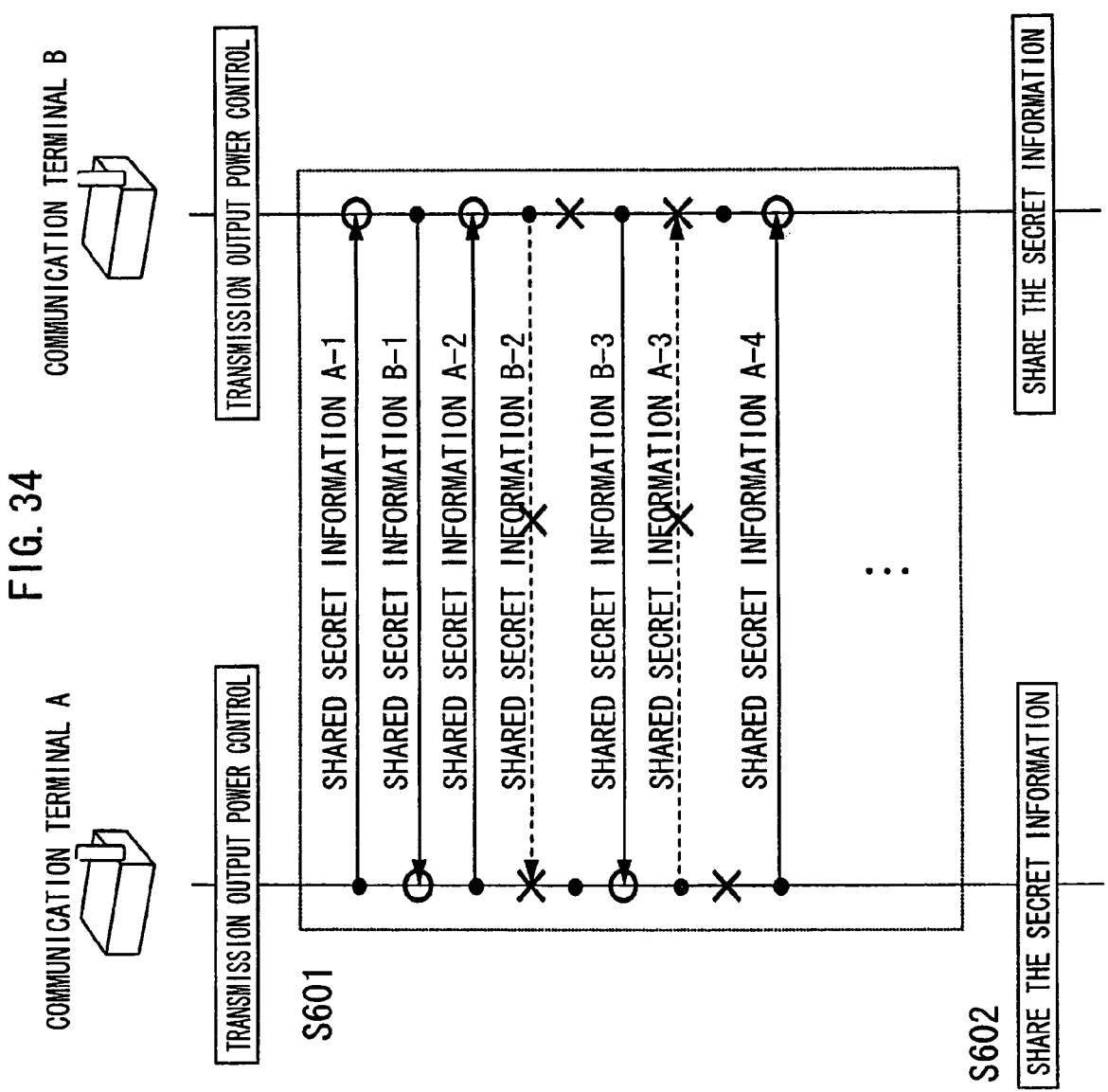
FIGS. 34 and 35 are diagrams showing the operation of a secret information sharing system pertaining to embodiment 11.

Next, the operation of the secret information sharing system pertaining to embodiment 11 will be described with reference to FIG. 34. Here, the operation of the secret information sharing system of embodiment 11 is mainly composed of two steps of operations (S601 and S602).

(S601: Deliver the Shared Secret Information)

(1) The shared secret information generation unit of a communication terminal A generates or receives shared secret information and transmits the shared secret information to the delivery verification unit and the transmission unit.

(2) The shared secret information is transmitted to a communication terminal B via the transmission unit.

(3) The delivery verification unit of the communication terminal B receives the shared secret information transmitted by the communication terminal A via the reception unit, judges that it has received the shared secret information delivered the earliest, on the condition that it itself has not yet transmitted the shared secret information from the shared secret information generation unit, and transmits a transmission request message to the delivery control unit.

(4) The error detection unit of the communication terminal B receives the shared secret information transmitted by the communication terminal A via the reception unit and verifies whether or not a bit error is included in the shared secret information. When a bit error is not included, the error detection unit judges that the received shared secret information is shared secret information that was able to be shared with the communication terminal A, transmits the shared secret information that was judged to be able to be shared to the secret information sharing unit, and transmits a message for sharing to the delivery control unit. On the other hand, when a bit error is included, the error detection unit judges that the received shared secret information is shared secret information that was unable to be shared with the communication terminal A and transmits a message of abandonment to the delivery control unit.

(5) The delivery control unit of the communication terminal B judges whether or not to transmit its own shared secret information on the basis of whether a message of sharing or abandonment is received from the error detection unit with respect to the transmission request message transmitted from the delivery verification unit. When a message of abandonment is received from the error detection unit, the delivery control unit does not transmit the transmission request message to the shared secret information generation unit. In other cases, the delivery control unit generates a transmission request message in order to request transmission of the shared secret information and transmits the transmission request message to the shared secret information generation unit.

(6) The shared secret information generation unit of the communication terminal B generates the shared secret information and replies to the communication terminal A with the shared secret information via the transmission unit upon receiving the transmission request message from the delivery control unit.

(7) The delivery verification unit of the communication terminal A verifies whether or not a reply with respect to the shared secret information that it itself has transmitted is received from the communication terminal B. When a reply was received, the delivery verification unit judges that the shared secret information that it itself has transmitted was able to be shared with the communication terminal B and transmits the shared secret information that was judged to be able to be shared to the secret information sharing unit. On the other hand, when a reply was not received, the delivery verification unit judges that the shared secret information that it itself has transmitted is shared secret information that was unable to be shared with the communication terminal B and abandons the shared secret information. The delivery verification unit transmits a transmission request message to the shared secret information generation unit in order to request transmission of the next packet of shared secret information, on the condition that it was able to judge whether or not the shared secret information that it itself has transmitted was able to be shared with the communication terminal B.

(8) The error detection unit of the communication terminal A receives the shared secret information that the communication terminal B has transmitted via the reception unit and verifies whether or not a bit error is included in the shared secret information. When a bit error is not included, the error detection unit judges that the received shared secret information is shared secret information that was able to be shared with the communication terminal B, transmits the shared secret information that is judged to be able to be shared to the secret information sharing unit and transmits a message of sharing to the delivery control unit. On the other hand, when a bit error is included, the error detection unit judges that the received shared secret information is shared secret information that was unable to be shared with the communication terminal B and transmits a message of abandonment to the delivery control unit.

(9) The delivery control unit of the communication terminal A judges whether or not to transmit the next packet of shared secret information on the basis of whether a message of sharing or abandonment is received from the error detection unit with respect to the transmission request message transmitted from the delivery verification unit. When a message of abandonment is received from the error detection unit, the delivery control unit does not transmit the transmission request message to the shared secret information generation unit. In other cases, the delivery control unit generates a transmission request message in order to request transmission of the shared secret information and transmits the transmission request message to the shared secret information generation unit.

(10) The shared secret information generation unit of the communication terminal A generates shared secret information and transmits the shared secret information to the communication terminal A via the transmission unit upon receiving the transmission request message from the delivery verification unit.

The above-described operations are repeated as long as the delivery of the shared secret information continues.

Below, a case will be described where the communication terminal A stops delivering the shared secret information. (S602: Share the Secret Information)

(1) The secret information sharing unit of the transmission terminal generates the secret information using more than one packets of the shared secret information that it has received from the delivery verification unit.

(2) The secret information sharing unit of the reception terminal generates the secret information using more than one packets of the shared secret information that it has received from the error detection unit.

Figure 35:
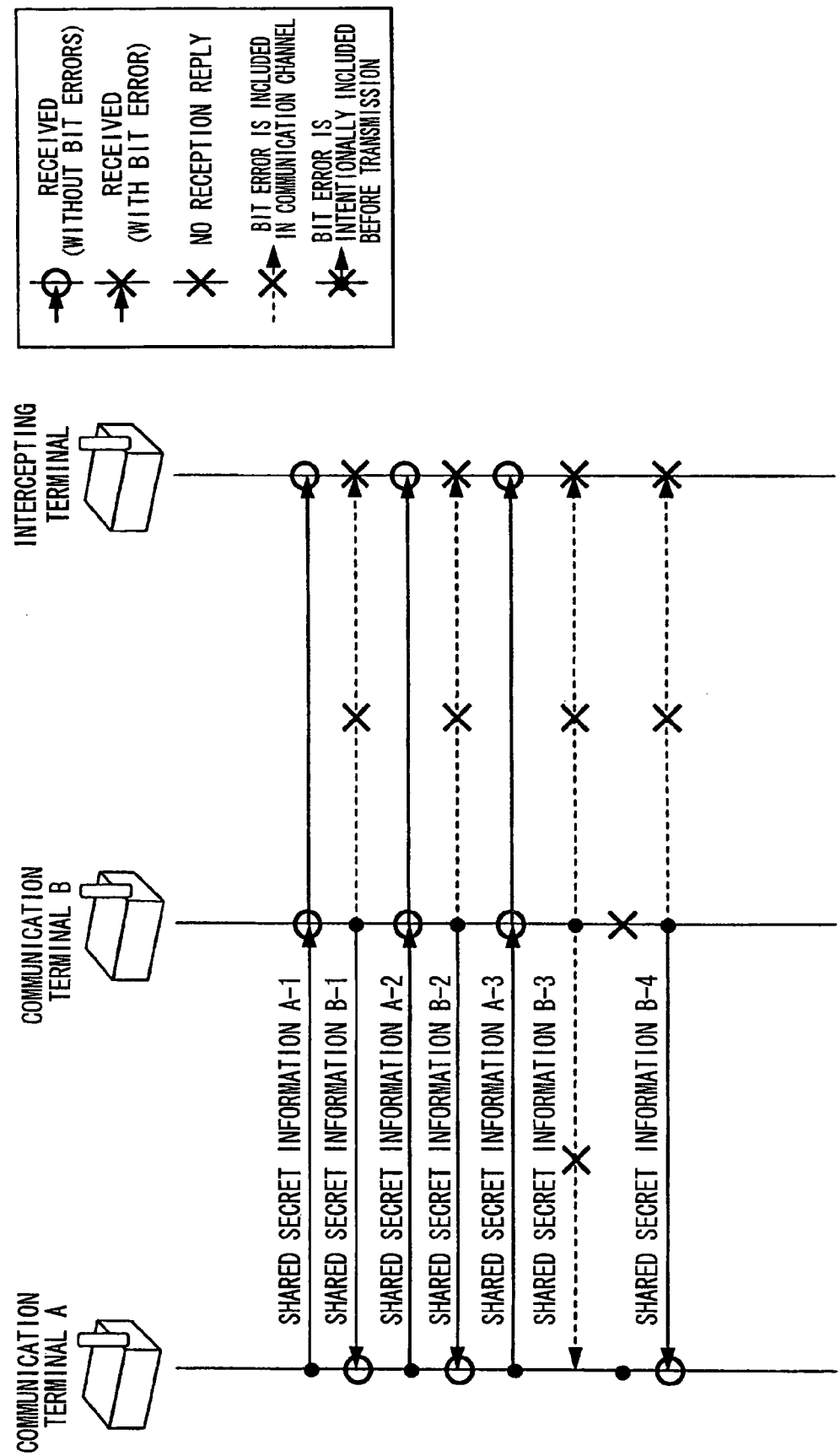

In embodiment 11, all communication terminals sharing information together carries out the delivery of shared secret information, thereby making it difficult for the intercepting terminal to identify the correct information. The present embodiment will be described further with reference to FIG. 35. It is supposed that the intercepting terminal receives information transmitted by the communication terminal A with a low bit error rate but receives information transmitted by the communication terminal B with a high bit error rate. In such a case, in the configuration where the communication terminal A delivers all the packets of shared secret information, it is highly likely for the intercepting terminal to receive the shared secret information without bit errors. In embodiment 11, since transmission of the shared secret information is carried out by both the communication terminal A and the communication terminal B, it is possible to decrease the possibility of the intercepting terminal to be able to receive the shared secret information without bit errors without having to know which communication terminal transmits information with a higher bit error rate even in a situation where the intercepting terminal receives information transmitted by one terminal with a higher bit error rate than that of information transmitted by another terminal.

Other Embodiments

In the descriptions of the respective embodiments, various modifications have been described; however, more modifications as described below are possible.

In the respective embodiments, only one transmission terminal has been described; however, the invention can be applied to a case where there is a plurality of transmission terminals. In this case, a terminal that wishes to share secret information with a reception terminal may have a structure capable of securely gathering shared secret information delivered by a plurality of transmission terminals.

In the respective embodiments, only one reception terminal has been described; however, the invention can be applied to a case where there is a plurality of reception terminals. In this case, secret information that is common to a transmission terminal and all reception terminals may be generated by generating secret information using shared secret information that was judged to be able to be shared by all of a plurality of reception terminals, or secret information may be generated using shared secret information that was judged to be able to be shared with each reception terminal.

Moreover, the data size of the shared secret information and the secret information is not particularly limited. Furthermore, the data size of the error detection code is not particularly limited.

In the respective embodiments, the wireless communication terminal has been described as an example; however, the terminal is not limited to one performing wireless communication. Moreover, the wireless communication method is not particularly limited.

In the respective embodiments, the example has been described where the reception reply is replied with respect to the respective packets of shared secret information, received by the reception terminal; however, the invention is not particularly limited to this configuration. The reception reply may be collectively replied with respect to a plurality of packets of shared secret information.

The secret information may be shared by repeating several times the embodiment described in the respective embodiments.

The delivery verification unit verifies whether or not information has been successfully received on the basis of whether a reception reply is received from the reception terminal, the method for verifying the successful reception is not limited to this. For example, the reception terminal may transmit a reply indicating that it was unable to receive the shared secret information, thereby letting the transmission terminal of the shared secret information be notified of the failure in sharing.

In embodiments 6 to 8, the judgment as to whether or not the transmission terminal was able to share the shared secret information on the basis of whether a bit error is included in the reception reply; however, in addition to the above judgment, the secret information may be judged to be unable to be shared, on the condition that there is no reception reply, similar to the delivery verification method described in embodiment 9.

The delivery and the delivery verification of the respective packets of shared secret information may be realized by combining a plurality of the methods described in embodiments 1 to 11 together.

In embodiment 11, the example has been described where the shared secret information is replied in lieu of the reception reply, thereby making it difficult for the intercepting terminal to identify the shared secret information even when only one communication terminal has a high bit error rate; however, the same effects can be realized by performing the operations of embodiments 1 to 9 and redoing the operations with the respective roles of the transmission terminal and the reception terminal changed.

What is claimed is:

1. A first communication terminal, comprising:
an information generation unit configured to convert secret information to redundant information, the redundant information being transmittable to a second communication terminal, and being useable by the second communication terminal to restore the secret information;
a transmission unit configured to transmit the redundant information;
a delivery management unit configured to manage transmission of the redundant information; and
a reception unit configured to receive information transmitted from the second communication terminal, wherein:
the delivery management unit is configured to cause the information generation unit to convert the secret information to higher redundant information that has a higher information amount and a higher bit error rate than the redundant information previously transmitted by the transmission unit and corresponding to the secret information, and to cause the transmission unit to transmit the higher redundant information to the second communication terminal, when a reply to the previously transmitted redundant information is not received by the reception unit from the second communication terminal.

2. The first communication terminal according to claim 1, further comprising a bit error rate determination unit that estimates, on the basis of reception status of the second communication terminal, the bit error rate of information that the second communication terminal receives.

3. The first communication terminal according to claim 1, further comprising a dummy information judgment unit that judges whether or not information that the reception unit has received is dummy information,
wherein the reception unit receives dummy information that the second communication terminal has transmitted, and the dummy information judgment unit judges, when dummy information that the reception unit has received is not included in information that the information generation unit has generated, that the generated information is dummy information.

4. The second communication terminal that receives the redundant information according to claim 1, comprising:
a reception unit that receives the redundant information; and
an information restoration unit that restores the secret information from the received redundant information, by applying each packet of the received redundant information to a predetermined operation expression.

5. The first communication terminal according to claim 1, wherein:
the first communication terminal is included in a secret information sharing system in which the first communication terminal shares the secret information with the second communication terminal;
the secret information comprises one or more packets of shared secret information;
the delivery management unit comprises a delivery verification unit that verifies whether or not the transmitted shared secret information has been shared with the second communication terminal; and
the first communication terminal further comprises a secret information sharing unit that shares information with the second communication terminal using the one or more packets of shared secret information which has been verified as being shared.

6. The first communication terminal of claim 1, wherein the information generation unit converts the secret information to the redundant information and the higher redundant information by combining the secret information with information that is generated independently from the secret information.

7. The first communication terminal of claim 1, wherein the information generation unit converts the secret information to the redundant information and the higher redundant information by combining the secret information with random information.

8. The first communication terminal according to claim 2, further comprising a redundant information amount determination unit that determines an amount of the redundant information on the basis of the bit error rate that the bit error rate determination unit has determined.

9. The first communication terminal according to claim 2, wherein the bit error rate determination unit estimates the bit error rate of the second communication terminal on the basis of a propagation status of the information and, when an estimated value is less than a predetermined threshold value, the bit error rate determination unit uses, instead of the estimated value, a prescribed bit error rate as an estimated value.

10. The first communication terminal according to claim 2, wherein the bit error rate determination unit receives a number of packets of information that the second communication terminal has failed to receive, and measures, on the basis of the number, the bit error rate of information that the second communication terminal receives.

11. The first communication terminal according to claim 3, wherein the information generation unit assigns transmission sequence numbers and generates a plurality of packets of the redundant information, and
when the dummy information judgment unit has judged that information that the reception unit has received is dummy information, the information generation unit skips the transmission sequence number of that dummy information, assigns the next transmission sequence number, and generates the redundant information that follows.

12. The second communication terminal that receives the redundant information transmitted by the first communication terminal according to claim 3, comprising:
a reception unit that receives the redundant information;
an information restoration unit that restores the secret information from the received redundant information;
a dummy information generation unit that generates dummy information of the secret information; and
a transmission unit that transmits the dummy information, wherein the information restoration unit restores the secret information by applying each packet of the received redundant information to a predetermined operation expression, and the dummy information generation unit generates, and transmits via the transmission unit, the dummy information irregularly.

13. The second communication terminal according to claim 4, further comprising an error detection unit that detects bit errors of information that the reception unit has received.

14. The first communication terminal according to claim 5, wherein the delivery verification unit comprises an error detection means that detects errors in the reception reply received from the second communication terminal, and determines that the transmitted shared secret information has been shared with the second communication terminal if an error is detected, and determines that the transmitted shared secret information has not been shared with the second communication terminal if an error is not detected.

15. The first communication terminal according to claim 5, wherein the information generation unit is configured to include a bit error in the shared secret information to be transmitted to the second communication terminal, and if a bit error is included in the reception reply with respect to the shared secret information that has been transmitted without including a bit error, the delivery verification unit causes the transmission unit to retransmit the shared secret information that has been transmitted, or causes the information generation unit to generate Previously presented shared secret information that has a same identification number as the shared secret information that has been transmitted.

16. The first communication terminal according to claim 5, wherein the information generation unit is configured to include a bit error in the shared secret information to be transmitted to the second communication terminal, and the delivery verification unit comprises an error detection means that detects bit errors in the reception reply received from the second communication terminal, and determines that the transmitted shared secret information has been shared with the second communication terminal if a bit error is detected in the reception reply with respect to the shared secret information that has been transmitted without including a bit error, and determines that the transmitted shared secret information has not been shared with the second communication terminal if an error is not detected in the reception reply with respect to the shared secret information that has been transmitted including a bit error.

17. The first communication terminal according to claim 5, wherein the delivery verification unit comprises a reception reply detection means that detects the reception reply from the second communication terminal, and determines that the transmitted shared secret information has not been shared with the second communication terminal if the reception reply is not detected.

18. The first communication terminal according to claim 5, wherein the information generation unit is configured to include a bit error in the shared secret information to be transmitted to the second communication terminal, and the delivery verification unit comprises a reception reply detection means that detects the reception reply from the second communication terminal, and determines that the transmitted shared secret information has been shared with the second communication terminal if the reception reply is detected with respect to the shared secret information that has been transmitted without including a bit error, and determines that the transmitted shared secret information has not been shared with the second communication terminal if the reception reply is detected with respect to the shared secret information that has been transmitted including a bit error.

19. The first communication terminal according to claim 5, further comprising a secret information conversion unit that converts Previously presented secret information to be shared with the second communication terminal in a form that can be restored only using the secret information shared with the second communication terminal in the secret information sharing unit, the transmission unit transmitting the converted secret information to the second communication terminal.

20. The first communication terminal according to claim 5, further comprising:

a reception unit that receives one or more packets of shared secret information transmitted from the second communication terminal;

an error detection unit that detects errors in the shared secret information received from the second communication terminal; and a delivery control unit that controls transmission of the shared secret information based on whether or not the shared secret information received from the second communication terminal includes an error, wherein the delivery verification unit determines that the shared secret information transmitted thereby has been shared with the second communication terminal if next shared secret information is received from the second communication terminal, and determines that the shared secret information transmitted thereby has not been shared with the second communication terminal if the next shared secret information is not received from the second communication terminal, and the delivery control unit effects control such that the shared secret information is transmitted only if an error is not detected by the error detection unit.

21. The second communication terminal according to claim 12, wherein the dummy information generation unit assigns transmission sequence numbers where 1 is added to a transmission sequence number of information that the reception unit has received immediately before, generates the dummy information, and irregularly transmits the dummy information via the transmission unit.

22. The second communication terminal according to claim 12, wherein:

the dummy information generation unit disguises a transmission destination terminal of the dummy information as the second communication terminal and disguises a transmission source terminal as the first communication terminal; and the transmission unit transmits, to the first communication terminal, the dummy information in which the transmission destination terminal and the transmission source terminal are disguised.

23. The second communication terminal according to claim 13, further comprising a reception replying unit that replies, on the basis of a detection result of the error detection unit, to the first communication terminal as to whether or not the second communication terminal has successfully received information.

24. The first communication terminal according to claim 19, wherein
the reception unit receives the converted secret information transmitted from the first communication terminal, and
the first communication terminal further comprises a secret information restoration unit that restores the secret information from the received converted secret information using the secret information shared with the second communication terminal.

25. The second communication terminal according to claim 12, further comprising a dummy information replying unit that transmits, in combination with transmission of the dummy information, a dummy reception reply indicating that the second communication terminal has successfully received the dummy information.

26. The second communication terminal that receives the secret information transmitted from the first communication terminal of claim 23, comprising:
a reception unit that receives one or more packets of shared secret information transmitted from the first communication terminal;
an error detection unit that detects errors in the shared secret information received from the first communication terminal;
a reception reply generation unit that generates a reception reply indicating whether or not the shared secret information has been able to be shared;
a transmission unit that transmits the generated reception reply to the first communication terminal; and
a shared secret information sharing unit that shares information with the first communication terminal using the one or more packets of shared secret information which has been shared with the first communication terminal.

27. The second communication terminal according to claim 26, wherein the reception reply generation unit includes a bit error in the generated reception reply when an error is detected at least by the error detection unit.

28. The second communication terminal according to claim 26, wherein the reception reply generation unit does not include a bit error in the reception reply generated with respect to the shared secret information from which an error has not been detected at least by the error detection unit and has been determined to be shared.

29. The second communication terminal according to claim 26, wherein the reception reply generation unit does not generate the reception reply if an error is detected by the error detection unit.

30. The second communication terminal according to claim 26, wherein the reception reply generation unit generates the reception reply with respect to the shared secret information from which an error has not been detected at least by the error detection unit and has been determined to be shared.

31. A communication terminal comprising the first communication terminal of claim 23 and the second communication terminal of claim 26.

32. An information distribution system, comprising:
a first communication terminal that includes:
an information generation unit configured to convert secret information to redundant information, the redundant information being transmittable to a second communication terminal, and being useable by the second communication terminal to restore the secret information;
a transmission unit configured to transmit the redundant information;
a delivery management unit configured to manage transmission of the redundant information; and
a reception unit configured to receive information transmitted from the second communication terminal, wherein:
the delivery management unit is configured to cause the information generation unit to convert the secret information to higher redundant information that has a higher information amount and a higher bit error rate than the redundant information previously transmitted by the transmission unit and corresponding to the secret information, and to cause the transmission unit to transmit the higher redundant information to the second communication terminal, when a reply to the previously transmitted redundant information is not received by the reception unit from the second communication terminal; and
a second communication terminal that receives the redundant information and includes:
a reception unit that receives the redundant information, and
an information restoration unit that restores the secret information from the received redundant information, by applying each packet of the received redundant information to a predetermined operation expression.

33. The information distribution system of claim 32, wherein the information generation unit of the first communication terminal converts the secret information to the redundant information and the higher redundant information by combining the secret information with information that is generated independently from the secret information.

34. The information distribution system of claim 32, wherein the information generation unit of the first communication terminal converts the secret information to the redundant information and the higher redundant information by combining the secret information with random information.

35. An information distribution system, comprising:
a first communication terminal that includes:
an information generation unit configured to convert secret information to redundant information, the redundant information being transmittable to a second communication terminal, and being useable by the second communication terminal to restore the secret information,
a transmission unit configured to transmit the redundant information ;
a delivery management unit configured to manage transmission of the redundant information; and
a reception unit configured to receive information transmitted from the second communication terminal, and
a dummy information judgment unit that judges whether or not information that the reception unit received is dummy information, wherein
the delivery management unit is configured to cause the information generation unit to convert the secret information to higher redundant information that has a higher information amount and a higher bit error rate than the redundant information previously transmitted by the transmission unit and corresponding to the secret information, and to cause the transmission unit to transmit the higher redundant information to the second communication terminal, when a reply to the previously transmitted redundant information is not received by the reception unit from the second communication terminal, the reception unit receives dummy information that the second communication terminal has transmitted, and the dummy information judgment unit judges, when dummy information that the reception unit has received is not included in information that the information generation unit has generated, that the generated information is dummy information; and a second communication terminal that receives the redundant information transmitted by the first communication terminal, and includes:

a reception unit that receives the redundant information, an information restoration unit that restores the secret information from the received redundant information, a dummy information generation unit that generates dummy information of the secret information, and a transmission unit that transmits the dummy information, wherein the information restoration unit restores the secret information by applying each packet of the received redundant information to a predetermined operation expression, and the dummy information generation unit generates, and transmits via the transmission unit, the dummy information irregularly.

36. The information distribution system of claim 35, wherein the information generation unit of the first communication terminal converts the secret information to the redundant information and the higher redundant information by combining the secret information with information that is generated independently from the secret information.

37. The information distribution system of claim 35, wherein the information generation unit of the first communication terminal converts the secret information to the redundant information and the higher redundant information by combining the secret information with random information.

* * * * *